United States Patent
Boardman et al.

(10) Patent No.: US 11,741,618 B2
(45) Date of Patent: Aug. 29, 2023

(54) PERFORMING OBJECT MODELING BY COMBINING VISUAL DATA FROM IMAGES WITH MOTION DATA OF THE IMAGE ACQUISITION DEVICE

(71) Applicant: EveryPoint, Inc., Redmond, WA (US)

(72) Inventors: David B. Boardman, Redmond, WA (US); Jared S. Heinly, Durham, NC (US); Srinivas Kapaganty, Suwanee, GA (US)

(73) Assignee: EveryPoint, Inc., Redmond, WA (US)

( * ) Notice: Subject to any disclaimer, the term of this patent is extended or adjusted under 35 U.S.C. 154(b) by 236 days.

(21) Appl. No.: 17/209,039

(22) Filed: Mar. 22, 2021

(65) Prior Publication Data

US 2022/0301192 A1  Sep. 22, 2022

(51) Int. Cl.
  *G06T 7/00* (2017.01)
  *G06T 7/246* (2017.01)
  (Continued)

(52) U.S. Cl.
  CPC ............... *G06T 7/251* (2017.01); *G06T 7/75* (2017.01); *G06T 17/205* (2013.01); *G06T 19/20* (2013.01);
  (Continued)

(58) Field of Classification Search
  CPC ....... H04N 5/23238; G06T 17/05; G06T 7/55; G06T 7/30; G06T 7/50;
  (Continued)

(56) References Cited

U.S. PATENT DOCUMENTS 5,831,621 A    11/1998  Pito
7,359,563 B1*  4/2008   Dua ........................ G06T 5/003
                                                  382/254
(Continued)

FOREIGN PATENT DOCUMENTS

WO    2012/061945 A1    5/2012

OTHER PUBLICATIONS

Reinhard Koch, et al., "Realistic Surface Reconstruction of 3D Scenes from Uncalibrated Image Sequences," 2000, The Journal of Visualization and Computer Animation, 13 pages.
(Continued)

*Primary Examiner* — Phuoc H Doan
(74) *Attorney, Agent, or Firm* — VLP Law Group LLP; James A. D. White

(57) ABSTRACT

Techniques are described for automated analysis and use of images acquired of an object and of associated image acquisition metadata, such as for manmade largescale objects at fixed locations in outdoor environments, and to automatically generate a 3D computer model of the object (e.g., the 3D shape of the object exterior's surface) from visual data in the acquired images and from image acquisition device motion data during the image acquisition, to use the computer model to automatically determine measurements for object attribute(s), and to display or otherwise provide information about the generated computer model and/or determined object attributes. The image acquisition metadata may include motion data from IMU (inertial measurement unit) sensors on the image acquisition device, and include additional related data that is determined based at least in part on that motion data (e.g., acquisition pose data for particular acquired images, 3D positions on object exterior, etc.).

31 Claims, 30 Drawing Sheets

(51) Int. Cl.
*G06T 7/73* (2017.01)
*G06T 17/20* (2006.01)
*G06T 19/20* (2011.01)

(52) U.S. Cl.
CPC ............... *G06T 2207/10016* (2013.01); *G06T 2207/30241* (2013.01); *G06T 2207/30244* (2013.01); *G06T 2219/2004* (2013.01)

(58) Field of Classification Search
CPC ........... G06T 2207/30244; G06T 2207/10016; G06N 3/08; A47K 3/10
See application file for complete search history.

(56) References Cited

U.S. PATENT DOCUMENTS

| | | |
|---|---|---|
| 7,944,547 B2 | 5/2011 | Wang |
| 8,384,714 B2 | 2/2013 | De Aguiar et al. |
| 8,594,375 B1 | 11/2013 | Padwick |
| 9,196,084 B2 | 11/2015 | Boardman et al. |
| 9,495,764 B1 | 11/2016 | Boardman et al. |
| 10,186,049 B1 | 1/2019 | Boardman et al. |
| 10,403,037 B1 | 9/2019 | Boardman et al. |
| 10,467,810 B1 * | 11/2019 | Yang ................... G06T 19/003 |
| 2002/0145607 A1 | 10/2002 | Dimsdale |
| 2002/0180865 A1 | 12/2002 | Lee et al. |
| 2002/0190982 A1 | 12/2002 | Kotcheff et al. |
| 2003/0218607 A1 | 11/2003 | Baumberg |
| 2007/0132874 A1 | 6/2007 | Forman et al. |
| 2007/0263907 A1 | 11/2007 | McMakin et al. |
| 2008/0031512 A1 | 2/2008 | Mundermann et al. |
| 2008/0100622 A1 | 5/2008 | Gordon |
| 2008/0180448 A1 | 7/2008 | Anguelov et al. |
| 2010/0074483 A1 | 3/2010 | Janes |
| 2011/0221936 A1 | 9/2011 | Steinberg et al. |
| 2012/0044247 A1 | 2/2012 | Naimark |
| 2012/0133665 A1 | 5/2012 | Wexler et al. |
| 2012/0321171 A1 | 12/2012 | Ito et al. |
| 2013/0002832 A1 | 1/2013 | Lasenby et al. |
| 2013/0048722 A1 | 2/2013 | Davis et al. |
| 2013/0060540 A1 | 3/2013 | Frahm et al. |
| 2013/0294667 A1 | 11/2013 | Zheng et al. |
| 2014/0049535 A1 | 2/2014 | Wang et al. |
| 2015/0262359 A1 | 11/2015 | Fujiwara et al. |

OTHER PUBLICATIONS

Lynx A Camera by Lynx Laboratories—Kickstarter, retrieved on Mar. 13, 2013, from http://www.kickstarter.com/projects/915328713/lynx-a-camera, 16 pages.
Lynx Laboratories, retrieved on Mar. 13, 2013, from http://lynxlaboratories.com/object.php, 4 pages.
Lynx Laboratories, retrieved on Mar. 13, 2013, from http://lynxlaboratories.com/aboutLynxA.php, 2 pages.
Wolfgang Niem, et al., "Automatic Reconstruction of 3D Objects Using a Mobile Monoscopic Camera," 1997, IEEE, 8 pages.
Stockpile Reports, "Stockpile Reports for Logistics Generates Inventory Levels From Low-Cost Fixed Cameras", Feb. 19, 2019, 3 pages.
Stockpile Reports, "Instant Measurements: Unlock Incredible Value for Your Business With This Industry-First Tech", Aug. 6, 2020, 4 pages.
Stockpile Reports, "Stockpile Reports Announces Instant Stockpile Measurements for iPhone", May 26, 2020, 4 pages.
Stockpile Reports, "The Future of Inventory is Instant and Autonomous", Apr. 23, 2020, 6 pages.

* cited by examiner

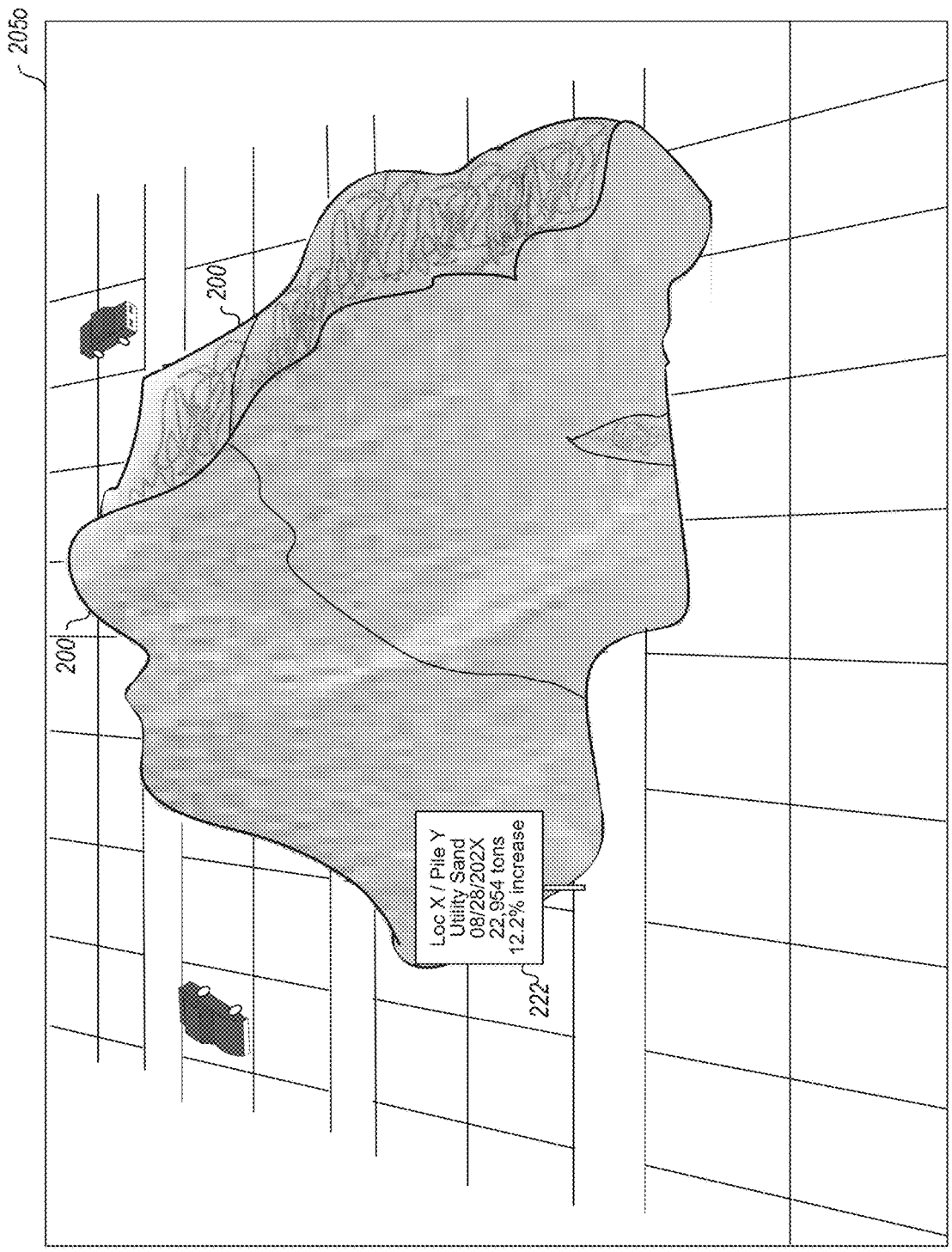
Fig. 2-O

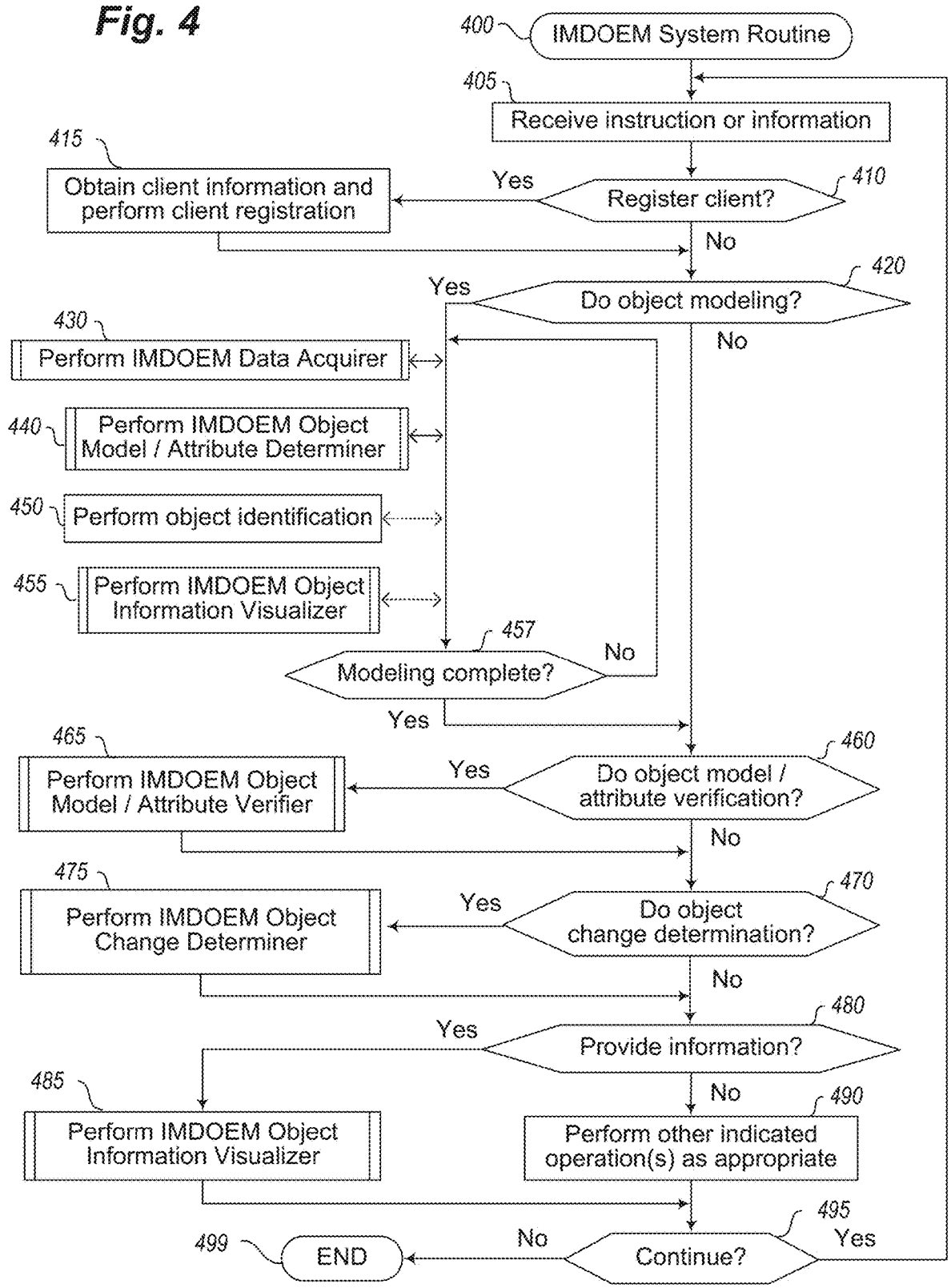

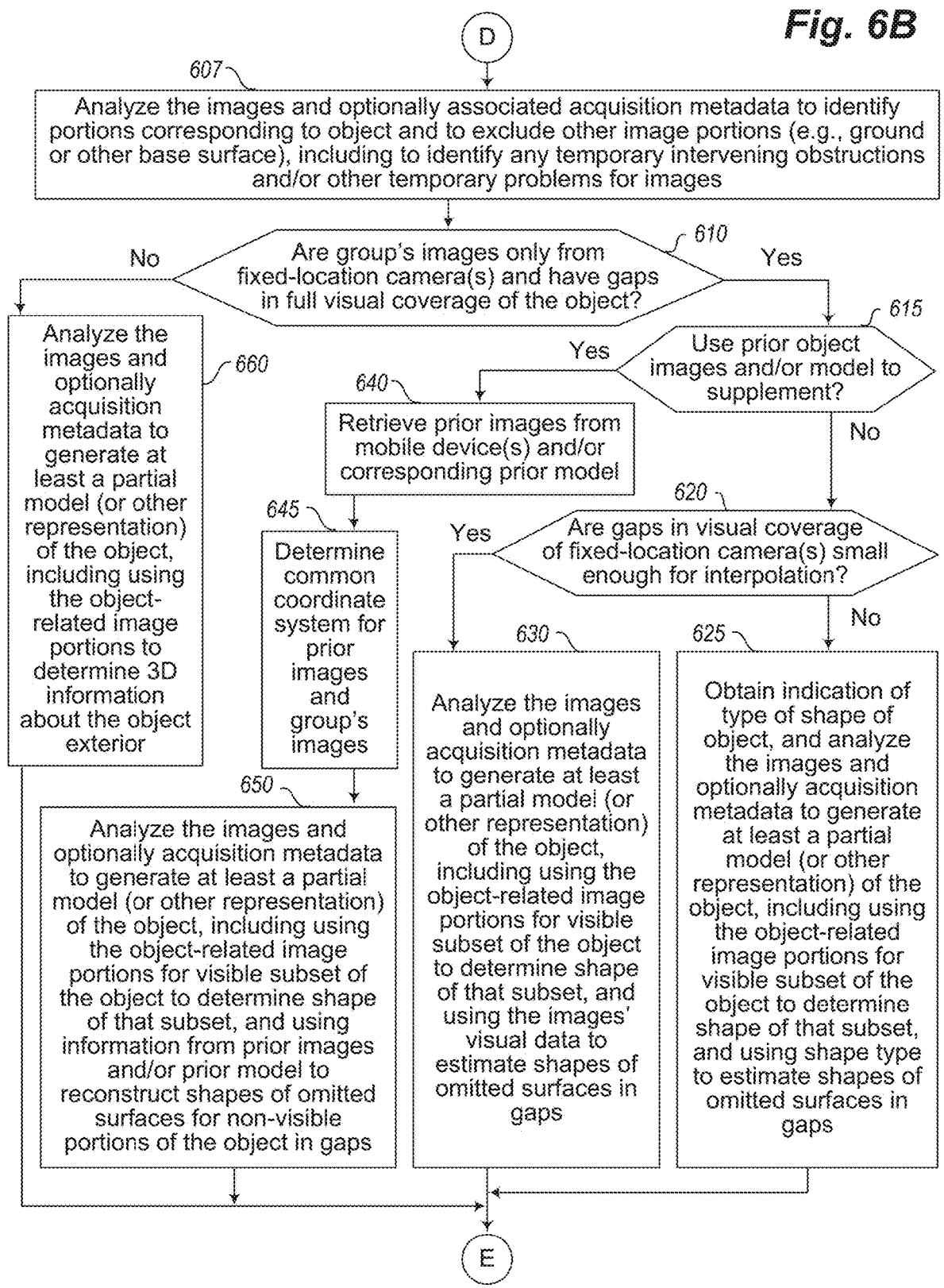

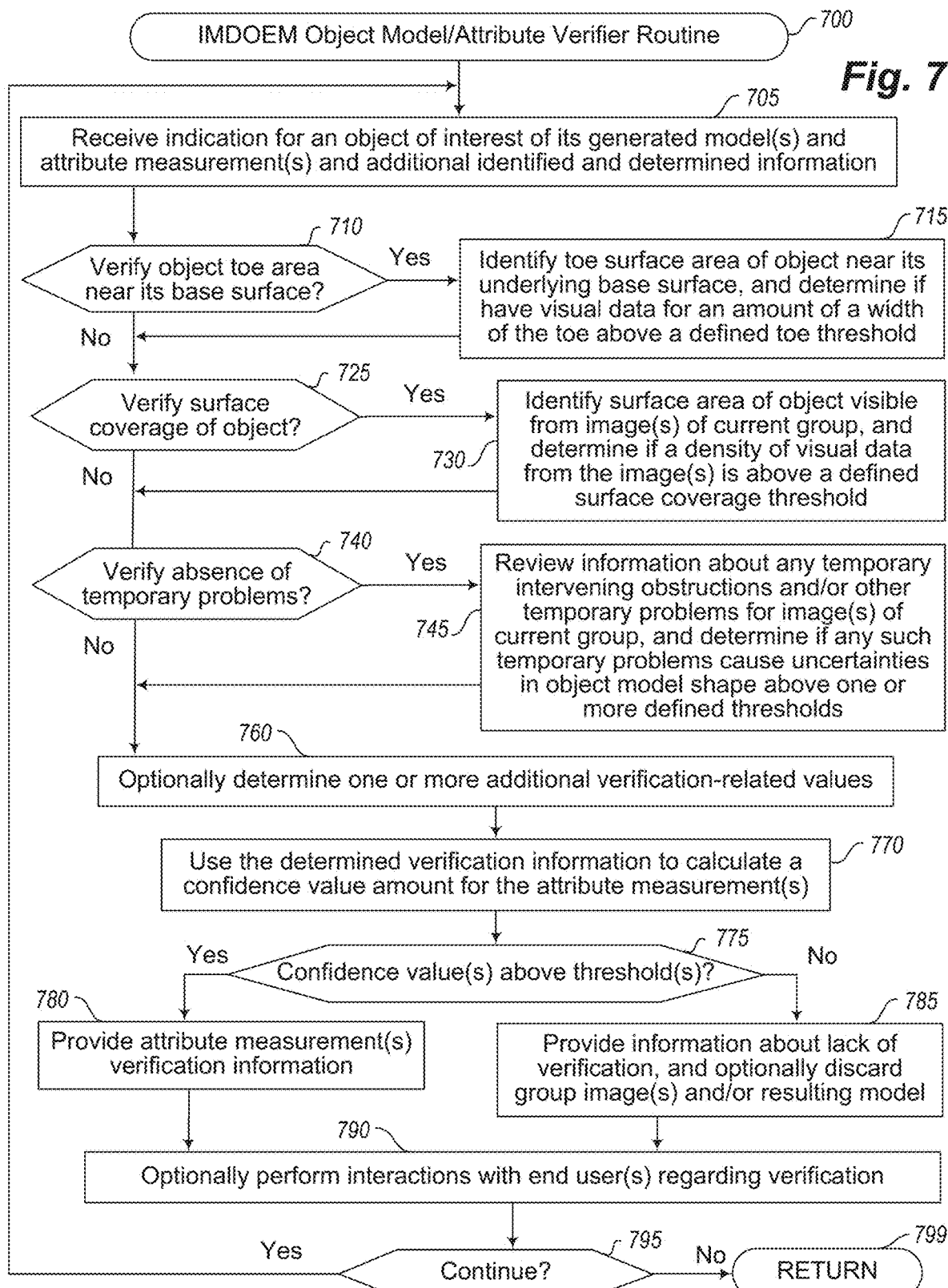

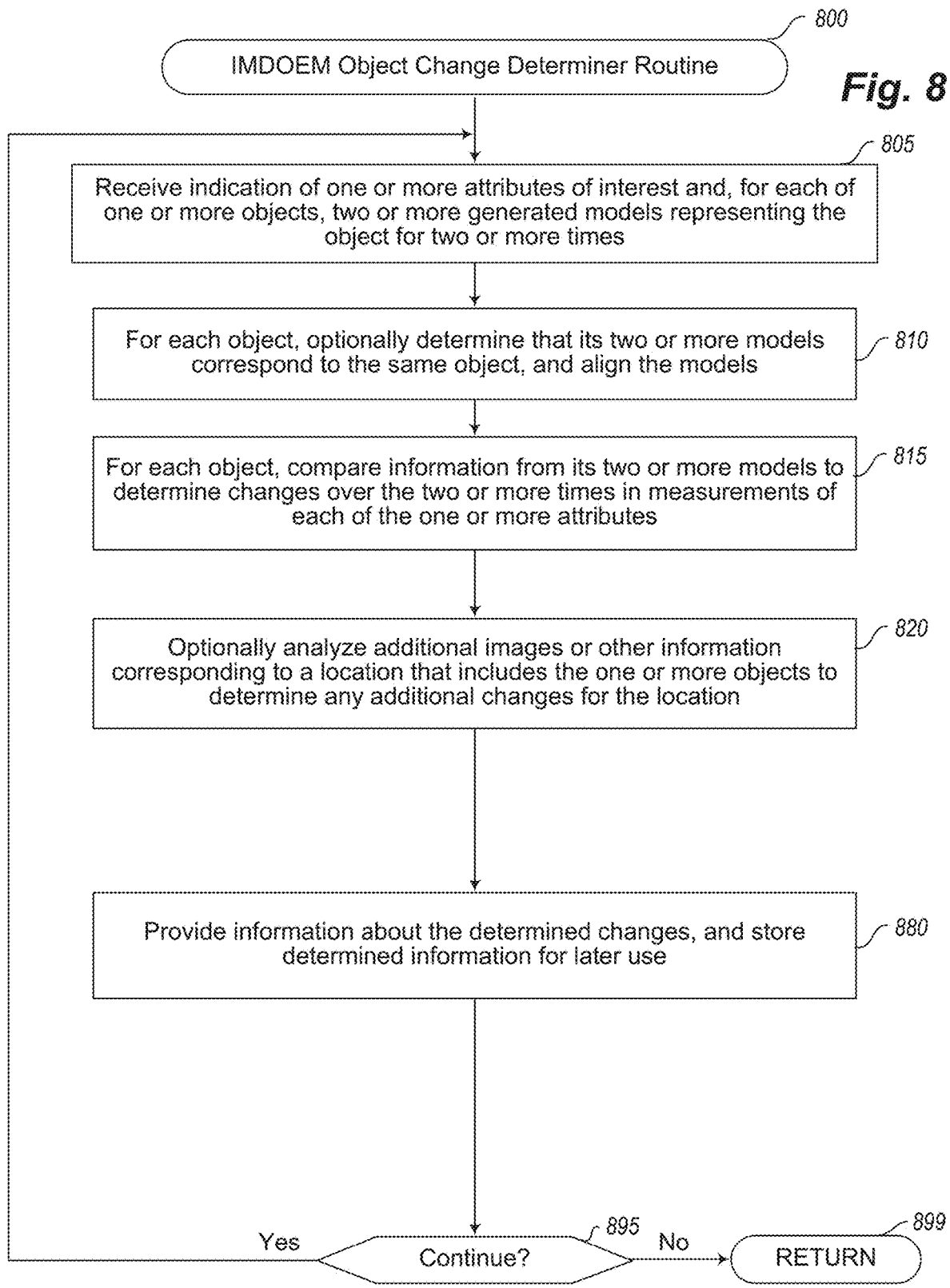

PERFORMING OBJECT MODELING BY COMBINING VISUAL DATA FROM IMAGES WITH MOTION DATA OF THE IMAGE ACQUISITION DEVICE

TECHNICAL FIELD

The following disclosure relates generally to automated techniques for generating a computer model of an exterior of a large object using a combination of visual data from images acquired as an image acquisition device moves around the object exterior and of motion data of the image acquisition device during the acquiring of the images, as well as for using the generated computer model in specified manners, such as to generate a three-dimensional computer model for a stockpile of material that is deposited on an outside surface, and to asses volume or other attributes of the stockpile from the computer model, and to display information from the computer model in specified manners.

BACKGROUND

A variety of techniques exist to identify and measure attributes of physical objects from locations separate from those objects, including for man-made and naturally occurring objects in outdoors environments. Such identification and measurement techniques may, for example, use various types of specialized measurement equipment (e.g., rangefinders, radar, lidar, sonar, 3D scanners, theodolites, etc.). However, such techniques have various problems, including that the specialized measurement equipment may be expensive and/or difficult to use, and that some types of object attributes are difficult to measure. In addition, while commercially available camera devices are becoming increasingly inexpensive, such devices do not typically include specialized or dedicated measurement equipment to identify and measure various attributes of physical objects.

BRIEF DESCRIPTION OF THE DRAWINGS

FIG. 4 is an example flow diagram of an illustrated embodiment of an Image and Motion Data-based Object Exterior Modeling (IMDOEM) System routine.

FIGS. 6A-6B are an example flow diagram of an illustrated embodiment of an IMDOEM Object Model/Attribute Determiner routine.

FIG. 7 is an example flow diagram of an illustrated embodiment of an IMDOEM Object Model/Attribute Verifier routine.

FIG. 8 is an example flow diagram of an illustrated embodiment of an IMDOEM Object Change Determiner routine.

DETAILED DESCRIPTION

Figure 1:
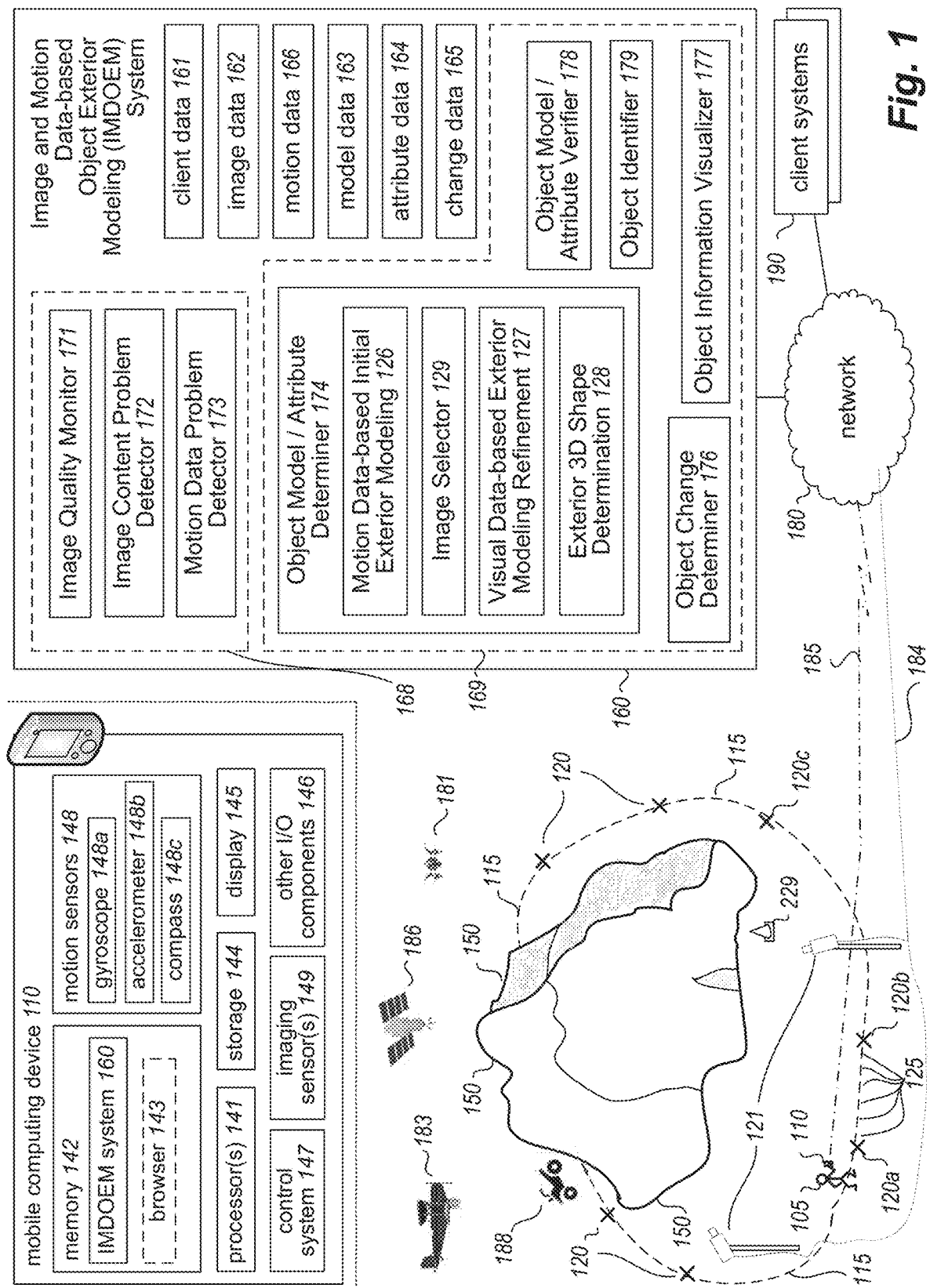
FIG. 1 is a network diagram illustrating an example embodiment of using described techniques to acquire images with visual data of a stockpile object and to acquire other image acquisition metadata for those images, and to analyze the acquired data to assess volume and other attributes of the object.

Techniques are described for automated analysis and use of images acquired of one or more objects and of associated image acquisition metadata, such as for human-constructed objects at fixed locations in outdoor environments and having sizes at large scales (e.g., significantly larger than humans), and including to automatically generate computer models of the object(s) from visual data included in the acquired images and from additional metadata (e.g., image acquisition device motion data) associated with the image acquisition, to use the generated computer models to automatically determine measurements for one or more attributes of the object(s), and to display or otherwise provide information about the generated computer models. The image acquisition metadata may include, for example, data about motion of the camera device or other image acquisition device (e.g., a mobile computing device, such as a smart phone, that includes computing capabilities and one or more imaging sensors, as well as various other sensors), such as by using data from IMU (inertial measurement unit) sensors on the image acquisition device (e.g., one or more accelerometers, gyroscopes, magnetometers or compasses, etc.), and may further include additional related data that is determined based at least in part on that motion data. The determination of object volume and/or other object attribute values for an object may be performed in various manners in various embodiments, including to generate a 3D (three-dimensional) computer model of the object (e.g., of the shape of the surface of the object, such as via a 3D modeled surface of the exterior) from visual data of the acquired images and the additional image acquisition metadata, and to perform various types of manipulations and/or analyses of the generated computer model. Additional details related to acquiring and analyzing such images and associated image acquisition metadata and to generating and using resulting computer models in particular manners are described below, and some or all of the described techniques are performed in at least some embodiments by automated operations of an Image and Motion Data-based Object Exterior Modeling ("IMDOEM") system.

As one non-exclusive example, the described techniques may in some embodiments be used to measure the volume of an outdoors pile of material (e.g., a stockpile of construction aggregate, such as sand, gravel, crushed stone, etc.) on the ground (or other underlying surface), based on images and associated image acquisition metadata acquired via a mobile computing device that is acting as an image acquisition device and that traverses some or all of the stockpile's exterior (e.g., carried around some or all of the exterior by a human user or by a device or vehicle that moves under its own power), although other embodiments may be performed for other types of objects and/or for other types of attributes and/or may use other types of devices to capture or otherwise acquire images, as discussed further below. As noted above, the image acquisition metadata may include data about acceleration and other motion of the image acquisition device, and may further include additional related data that is determined based at least in part on that motion data, such as part of performing a SLAM (Simultaneous Localization And Mapping) and/or SfM (Structure from Motion) analysis, as discussed further below—such additional related determined metadata may include, for example, determining the acquisition location of the image acquisition device when acquiring a particular image (such as in three dimensions or degrees of freedom, and sometimes represented in a three-dimensional grid as an X, Y, Z tuple) and the orientation of the image acquisition device when acquiring that particular image (such as in three additional dimensions or degrees of freedom, and sometimes represented as a three-dimensional rotational tuple or other directional vector), with such a device location and orientation for acquiring an image also referred to at times herein as an 'acquisition pose' data point or merely 'pose' of the image acquisition device for that image.

In at least some embodiments, the automated operations of the IMDOEM system include combining visual data of images acquired of an object together with additional information about the object and/or the image acquisition process that is based on image acquisition metadata acquired during the acquiring of those images. As one non-exclusive example, image acquisition metadata for acquired images of an object may be used to estimate acquisition pose metadata for the image acquisition device(s) during the acquiring of those images, and at least some of the estimated acquisition pose metadata for the various acquired images may be used as part of initial trajectory information for the image acquisition device(s), such as to assist in constraining drift in the estimated acquisition pose data points, and with that initial trajectory information being subsequently refined or otherwise updated based at least in part on visual data of the acquired images, so that the final determined trajectory information may be used as part of determining 3D positions of points on the object exterior surface. As another non-exclusive example, image acquisition metadata for acquired images of an object may be used to estimate locations of features (e.g., 2D features) on the object's exterior across multiple acquired images and/or to estimate 3D positions or shapes for portions of the object's exterior, as well as to estimate overall object scale and/or to estimate image acquisition device focal length, and some or all of the estimated information may be subsequently refined or otherwise updated based at least in part on visual data of the acquired images, with the final versions of the updated information used as part of determining 3D positions of points on the object exterior surface. As part of the use of the visual data of the acquired images, a group of the acquired images (e.g., a subset of the acquired images) may be selected for further analysis of the visual data of those images of the group, such as to form a sequence of acquired images in the group that each has a defined amount of visual overlap with one or more adjacent images in the sequence (e.g., that satisfies one or more defined visual overlap criteria), and to align visual data of the images of the group (e.g., based at least in part on triangulating positions of features visible in multiple images of the group), as discussed in greater detail below. Additional details related to automated operations of the IMDOEM system for combining visual data of images acquired of an object together with additional information from associated image acquisition metadata are included below.

In some embodiments, at least some of the automated operations of the IMDOEM system to generate a 3D computer model of an object's exterior are performed during an image acquisition session that involves acquiring the images of the object and the associated image acquisition metadata, such as to generate a partial computer model of part of the object exterior's surface that is visible in a partial set of the images that have already been captured during a not-yet-completed image acquisition session (e.g., in which only a partial subset of the object's exterior has been traversed by the one or more image acquisition devices), and in at least some such embodiments the 3D computer model generation is done in a real-time or near-real-time manner (e.g., within minutes or seconds or milliseconds of the acquisition of those images and their associated image acquisition metadata). In such embodiments, one or more additional computer models may be further generated as the image acquisition session continues and additional images and associated image acquisition metadata are acquired (e.g., by adding on to an existing partial computer model, or generating a new additional computer model from all of the data captured up to that time during that image acquisition session), until a final 3D computer model of the object's exterior is generated after the image acquisition session is completed. In at least some such embodiments, the images and associated image acquisition metadata may be acquired by a mobile computing device with one or more imaging sensors and one or more motion sensors, and some or all of the automated operations of the IMDOEM system to generate one or more such 3D computer models are performed on the mobile computing device—in such embodiments, various types of information from the image acquisition metadata may be used to accelerate subsequent analysis by the mobile computing device of visual data from the acquired images, such as to use information from the image acquisition metadata as initial values that are subsequently refined or otherwise updated from analysis of visual data, and/or to use information from the image acquisition metadata as constraints and/or as prior probabilities for later determination of information from analysis of visual data. Additional details are included below related to automated operations of the IMDOEM system for generation of partial 3D computer models and for performing some or all of the automated operations on the mobile computing device that is acquiring the images and associated image acquisition metadata.

In some embodiments, at least some of the automated operations of the IMDOEM system to generate a 3D computer model of an object's exterior are performed after an image acquisition session is completed (e.g., after acquiring images and associated image acquisition metadata around all or substantially all of the object's exterior), such as to generate a final or completed 3D computer model of the object. In at least some such embodiments, the images and associated image acquisition metadata may be acquired by one or more image acquisition devices proximate to the object (e.g., at a site where one or more such objects are co-located), and some or all of the automated operations of the IMDOEM system to generate the 3D computer model are performed on one or more computing devices remote from the object's location (e.g., one or more server computing systems at one or more other locations), such as after some or all of the acquired images and associated image acquisition metadata are transmitted or otherwise provided from the image acquisition device(s) to the remote computing device(s). In at least some such embodiments, the generation of the 3D computer model by the remote computing device(s) is not performed during the acquisition of the images, such as to use all or substantially all of the acquired images (e.g., to consider all or substantially all of the acquired images when selecting, for further detailed analysis, a group of images that are a subset of the acquired images), and/or to enable more elaborate analyses to be performed that are not consistent with generating a 3D computer model in real-time. In addition, in some such embodiments, some initial 3D computer model generation activities may be performed on a mobile computing device that is acquiring the images and associated image acquisition metadata for the object (e.g., to generate a partial 3D computer model; to generate some additional types of metadata, such as estimated acquisition pose information and/or estimated 2D feature locations and/or estimated partial 3D object exterior shapes; etc.), with the results of and/or the underlying information used in those initial 3D computer model generation activities by the mobile computing device being transferred to one or more remote computing devices (whether concurrently with those generation activities or later) that perform additional 3D computer model generation activities on the remote computing device(s) to generate a complete or final 3D computer model of the object. Additional details related to automated operations of the IMDOEM system for performing some or all of the automated operations on one or more remote computing devices are included below.

In at least some embodiments in which some or all of the automated operations of the IMDOEM system to generate one or more 3D computer models (e.g., partial 3D computer models) are performed during an image acquisition session on the mobile computing device that is acquiring the images and associated image acquisition metadata, the automated operations of the IMDOEM system may further include displaying a GUI to one or more users involved in the image acquisition session (e.g., operator users of the IMDOEM system) to assist in further activities during that image acquisition session, such as by displaying the GUI on a mobile computing device that is being used as an image acquisition device to acquire some or all of the images and associated image acquisition metadata for the image acquisition session. As one non-exclusive example, once a partial 3D computer model of the object has been generated (e.g., a 3D point cloud or other modeled 3D surface of a portion of the object's exterior), the GUI that is displayed on the mobile computing device being used to acquire additional images and image acquisition metadata for the current image acquisition session may include a current image of the object, with some or all of the partial 3D computer model overlaid on corresponding portions of the object exterior that are visible in the current image—such a displayed overlaid partial 3D computer model may assist in providing information to the user(s) about portions of the object exterior that have been modeled and other portions of the object exterior for which additional images and associated image acquisition metadata have not yet been acquired. In addition, in at least some such embodiments, additional information may be virtually determined and displayed to the user via such a GUI, whether instead of or in addition to such a displayed overlaid partial 3D computer model, such as one or more of the following non-exclusive examples: if a partial 3D computer model is displayed as an overlay on the object's exterior, using different colors or other visual indications to indicate different types of information about that computer model and/or its underlying data, such as an amount and/or quality of the underlying data for a particular area or section of the computer model 3D surface, a confidence or uncertainty associated with a particular area or section of the computer model 3D surface, etc.; textual instructions to the user(s), such as where to start or stop an image acquisition session, to change how additional images are captured (e.g., with respect to lighting, focus, device orientation, etc.), to re-acquire images and/or associated image acquisition metadata for one or more parts of the object exterior that were previously traversed but not sufficiently represented in the acquired data (e.g., due to one or more temporary obstructions), etc.; textual information about a previous computer model generated for the object based on an earlier image acquisition session (e.g., one or more previous object attributes) and/or based on a current partial 3D computer model being generated, such as on one or more virtual signs that are overlaid on a display of a current image (and optionally overlaid on a display of that partial 3D computer model that is overlaid on the current image), optionally at one or more predefined locations and/or dynamically determined locations (e.g., on the ground beside the object, on top of part of the object, etc.); one or more visual indicators of a path for the user to follow for the acquisition of additional images during the image acquisition session; one or more visual indicators of a previous path that the user has already traversed during the acquisition of previous images during the image acquisition session; etc. In other embodiments, some or all such information may be provided to one or more users in other manners, such as to one or more remote users at other locations (e.g., a remote user operating an unmanned vehicle carrying an image acquisition device around at least some of the object exterior), on one or more devices other than the image acquisition device (e.g., for a user at the location of the object to use one device for image acquisition, and a separate device to display the GUI), etc. Additional details related to automated operations of the IMDOEM system for displaying, during an image acquisition session, a GUI to one or more users involved in the image acquisition session are included below.

In addition, in at least some embodiments, the automated operations of the IMDOEM system may further include displaying a GUI to one or more end users to provide information about a 3D computer model of an object (e.g., after an image acquisition session for the object is completed and a corresponding completed 3D computer model of the object is generated), such as by displaying the GUI on a client computing device or other client device (e.g., a head-mounted display, augmented reality glasses, etc.), and with the client device optionally being at a location remote from the object's location. As one non-exclusive example, the GUI that is displayed on the client device may include a current image of an environment of the client device (e.g., acquired with one or more imaging sensors of the client device), with some or all of the completed 3D computer model overlaid on an area of the current image (e.g., an area selected by the end user, an area automatically determined by the IMDOEM system, etc.)—such a displayed overlaid 3D computer model may assist in providing information to the end user(s) about the size and/or shape of the object, as well as additional information about the object's attributes and/or the image acquisition session corresponding to the displayed computer model (e.g., a date and/or time of that image acquisition session). For example, in at least some such embodiments, additional information may be virtually determined and displayed to the user via such a GUI, such as one or more of the following non-exclusive examples: for the 3D computer model that is displayed as an overlay on a current image of the environment of the client device, using different colors or other visual indications to indicate different types of information about that computer model and/or its underlying data, such as an amount and/or quality of the underlying data for a particular area or section of the computer model 3D surface, a confidence or uncertainty associated with a particular area or section of the computer model 3D surface, areas of the object such as a 'toe' area of the object just above the ground or other underlying surface on which the object sits, etc.; textual information about a current 3D computer model (e.g., one or more attributes of the object determined from the computer model) and/or about a previous computer model generated for the object based on an earlier image acquisition session (e.g., one or more differences or changes from previous object attributes), such as on one or more virtual signs that are overlaid on a display of a current image (and optionally overlaid on a display of that 3D computer model that is overlaid on the current image), optionally at one or more predefined locations and/or dynamically determined locations (e.g., on the ground beside the object, on top of part of the object, etc.); a name or other identifier of the object; location data for the object (e.g., GPS data, a site name, etc.); one or more visual indicators of a path that was traversed during the acquisition of images for the image acquisition session used to generate the 3D computer model; etc. Additional details related to automated operations of the IMDOEM system for displaying a GUI to one or more end users about a generated 3D computer model are included below.

In addition, automated activities of the IMDOEM system may be performed in at least some embodiments to verify the accuracy or other sufficiency of the image acquisition metadata that is associated with acquired images of an object's exterior surface, such as to provide a level or degree of confidence in a resulting generated computer model and/or in attributes of the object determined from such a computer model, or in some cases to determine to not use at least some such image acquisition metadata if the sufficiency is not verified (e.g., if the level or degree of confidence is below one or more threshold amounts). As one non-exclusive example, image acquisition metadata for an acquired image may be used to estimate acquisition pose metadata for the image acquisition device during the acquiring of that image, and the estimated acquisition pose metadata for the various acquired images may be analyzed to determine which estimated acquisition pose data points are used as part of initial trajectory information for the image acquisition device and/or as initial acquisition pose data points for particular acquired images—such analysis may include looking for deviations between adjacent estimated acquisition pose data points that are larger than one or more defined thresholds, and/or for differences between estimated acquisition pose data points and other expected acquisition pose data point values that are identified in one or more other manners, as discussed in greater detail elsewhere herein. As another non-exclusive example, image acquisition metadata for an acquired image may be used to estimate locations of features (e.g., 2D features) on the object's exterior across multiple acquired images and/or 3D shapes of portions of the object's exterior, as well as to estimate overall object scale and/or to estimate image acquisition device focal length and/or to constrain drift in estimated acquisition pose data points, and some or all of the estimated information may be analyzed to determine which of the estimated information is used as initial values and/or constraints for later further determination based on visual data from acquired images, as discussed in greater detail elsewhere herein.

The described techniques provide various benefits in various embodiments, including to address problems that can occur when only using visual data of images or when only using image acquisition metadata to determine object exterior 3D shape information, to address problems associated with use of only SLAM analyses (e.g., with respect to long-term drift, temporary instabilities, trajectory discontinuities, etc.), to address problems associated with use of only SfM analyses (e.g., with respect to an inability to determine object exterior 3D shape information during acquisition of images and associated image acquisition metadata, such as in a real-time manner, as well as to leverage some types of image acquisition metadata), etc. Such described techniques further provide benefits in allowing improved automated navigation of an environment having one or more such objects by mobile devices (e.g., semi-autonomous or fully-autonomous vehicles), based at least in part on the computer model generation and object attribute determination, including to significantly reduce computing power and time used to attempt to otherwise learn a layout of the environment. In addition, in some embodiments the described techniques may be used to provide an improved graphical user interface ("GUI") in which an end user may more accurately and quickly obtain information about one or more objects and/or an environment in which they are located (e.g., for use in navigating that environment and/or tracking changes to the objects), including in response to requests. In some embodiments, the described techniques may be used to provide an improved GUI for a user who is participating in the acquisition of images and associated image acquisition metadata for an object, such as an operator user of the IMDOEM system, and to provide instructions to the operator user regarding additional image acquisition, etc. Various other benefits are also provided by the described techniques, some of which are further described elsewhere herein.

As noted above, in at least some embodiments, after a group of images to represent an object at a given time has been acquired by one or more image acquisition devices along with associated image acquisition metadata, automated operations are performed by one or more modules of the IMDOEM system (e.g., one or more IMDOEM system object model/attribute determiner modules that execute as part of a software application on one or more computing devices) to analyze those images in the group and associated image acquisition metadata and to generate a 3D computer model of the object at that given time based at least in part on the visual data of those images, as well as to use the 3D computer model to estimate a volume of the object at that given time and/or to determine one or more other attributes of the object at that given time. As part of those automated model generation and usage operations, various automated activities may be performed in at least some such embodiments by one or more modules of the IMDOEM system (e.g., one or more IMDOEM system object model/attribute verifier modules that execute as part of a software application on one or more computing devices) to assist in the process by verifying aspects of interest, such as to verify the sufficiency of the visual data that is acquired in images at a given time about the object's exterior surface and that temporary problems do not exist with the images that introduce excessive uncertainty in the shape of the object's exterior, to verify the accuracy of the image acquisition metadata that is acquired for images at a given time about the object's exterior surface, to predict or otherwise estimate shapes of subsets of the object's exterior surface at that given time that are not visible in the one or more acquired images (referred to at times herein as "omitted surfaces" of the object's exterior), etc., as discussed in greater detail below. A generated 3D computer model may, for example, be one or more of the following: a 3D point cloud model with numerous individual 3D data points; a 3D polygon mesh model or other object surface models (e.g., based on piecewise planar functions, collections of triangles, meshes, non-uniform rational B-splines (NURBS), T-Splines, or other curved representations of surface topology) or other solid models; a 2.5D representation; optionally a bare earth model; etc. In addition, the object attributes determined from a generated 3D computer model may include one or more of the following: volume, surface area, height (e.g., maximum height, an average height, etc.), length (e.g., maximum length along a longest identified radial axis, average length in one or more directions, etc.), width (e.g., maximum width along a radial axis perpendicular to the longest identified radial axis in the x-y plane, average width in one or more directions, etc.), weight (e.g., based on volume and a unit weight for a specified amount of a determined material for the object), density, radioactivity (e.g., based on volume and a unit radioactivity for a specified amount of a determined material for the object), temperature, water content or other moisture content, monetary value or cost (e.g., based on volume and a unit value/cost for a specified amount of a determined material for the object), etc., and the determination of object attributes may further include, for example, one or more of the following: determining contour lines for the object surface and otherwise identify surface attributes; determining a type and/or class of material of the object; determining color information and/or other surface feature information (and to optionally modify one or more of the generated models to include and display such information); etc. Additional details are included below related to automated operations of the IMDOEM system for generating computer models of objects and using the models to determine object attributes.

As is noted above, automated activities of the IMDOEM system may be performed in at least some embodiments to verify the sufficiency of the visual data that is acquired in images at a given time about an object's exterior surface, such as to provide a level or degree of confidence in a resulting generated computer model and/or in attributes of the object determined from such a computer model, or in some cases to determine to not use such images and/or a resulting computer model if the sufficiency is not verified (e.g., if the level or degree of confidence is below one or more threshold amounts). As one non-exclusive example, a degree of confidence in the completeness and accuracy of an object's computer model that is generated using images acquired at a given time may be automatically determined in some embodiments by assessing a density of data points (e.g., 3D data points, such as in a 3D point cloud) representing at least some of the object's exterior surface area that are available from the visual data of the images of the object acquired at the given time (rather than, for example, from interpolation or other prediction or estimation), and determining if the assessed density amount(s) satisfy one or more first defined model surface coverage thresholds—the assessed density may, for example, be an average density for some or all of the subset of the object's exterior that is visible in the images. As another non-exclusive example, a degree of confidence in the boundary between the object and its underlying surface and in the accuracy and completeness of a corresponding computer model that is generated using images acquired at a given time may be automatically determined in some embodiments by identifying a portion of the object's surface that is at or near the 'toe' of the object just above the ground or other underlying surface on which the object sits (e.g., identifying a horizontal strip of the object's surface that is proximate to the underlying surface, such as within a defined distance above the underlying surface) and that stretches across the width of the object's exterior visible in the images, and determining if data points that are available from the visual data of the images cover a horizontal amount of the strip that satisfies one or more second defined model toe thresholds.

In addition, automated verification activities by the IMDOEM system may in at least some embodiments include verifying, for images acquired at a given time about an object's exterior surface, that temporary problems do not exist in the visual contents of the images that cause excessive uncertainty in the shape of the object's exterior, such as by identifying and in some situations ameliorating any such temporary problems, or in some cases to determine to not use such images and/or a resulting computer model if the temporary problems exist and are not ameliorated (e.g., if a level or degree of uncertainty in the resulting computer model is above one or more shape uncertainty threshold amounts). As one non-exclusive example, a type of verification that may be performed in some embodiments includes analyzing acquired images of an object to determine if one or more obstructions are temporarily present between the image acquisition device(s) and the object, such as by identifying intervening elements such as vehicles or other equipment, people, animals, dust, fog, vegetation or other extraneous materials on the object surface, water or other materials (e.g., snow, ice, leaves, vegetation, etc.) at the boundary of the object toe and underlying surface, parts of one or more other objects, etc., and if so whether an amount (e.g., a percentage) of the subset of the object exterior that would otherwise be visible and is blocked by the obstruction(s) exceeds one or more defined obstruction thresholds—if so, the automated operations may include determining to not use such images and/or a resulting computer model, or to instead replace some or all of the blocked parts of the object surface area with other estimated shape data, as discussed in greater detail below. As another non-exclusive example, a type of verification that may be performed in some embodiments includes analyzing acquired images of an object to determine if the visual contents have quality problems, such as blurring, warping, skew, wobble, spatial aliasing, excessive or insufficient contrast, and/or other distortions or deformations, such as from one or more of rolling shutter problems, camera vibration (e.g., from wind, earth movement, etc.), lighting or other environmental conditions, etc.—if so, the automated operations may include assessing an amount of the quality problems and whether that amount exceeds one or more defined content quality thresholds, and determining to not use such images and/or a resulting computer model if the threshold(s) are exceeded, as discussed in greater detail below.

Such automated verification techniques and/or various additional automated verification techniques may be used together in any combination or alone, and in some embodiments may be performed before completing an automated determination of volume and/or other attributes from the computer model (e.g., as part of attempting to determine attributes that satisfy one or more specified verification criteria). Additional details are included below related to automated operations of the IMDOEM system for verifying the sufficiency of the data that is acquired in images and/or associated image acquisition metadata at a given time about an object's exterior surface and for verifying that temporary problems do not exist in the contents of one or more acquired images at a given time about an object's exterior surface that cause excessive uncertainty in the shape of the object's exterior.

As noted above, automated activities of the IMDOEM system may be performed in at least some embodiments to, as part of analyzing images and associated image acquisition metadata for an object at a given time and generating a 3D computer model of the object at that given time based on the visual data of those images and/or the associated image acquisition metadata, further predict or otherwise estimate shapes of omitted surface subsets (if any) of the object's exterior surface at that given time that are not visible in the images. As one non-exclusive example, if visual data is available in the acquired image(s) at a given time for some or all of an area around an omitted surface (e.g., for an omitted surface caused by a temporary obstruction, for an omitted surface caused by a bunker or other wall that is part of an enclosure on one or more sides of the object, etc., and for at least a percentage or other determined amount of the surrounding area with visual data that satisfies one or more shape estimation thresholds), a shape of the omitted surface may be extrapolated and/or interpolated from the available visual data, such as by fitting a flat surface or regular curved surface to the omitted surface. As another non-exclusive example, if the visual data of image(s) acquired at a given time on one side of an object creates an omitted surface corresponding to some or all of a backside or adjacent sides of the object relative to those image position(s), a shape of the backside and/or adjacent sides may be predicted by one or more of the following: estimating a slope of the backside and/or adjacent sides from a ridgeline or other top of the object that is shown in the visual data and generating the estimated shape using the estimated slope; using a predicted or provided type of object shape (e.g., conical, rectangular, etc.) and fitting the shape type to the visual data; using a shape of one or more walls or other things that constrict the backside and/or adjacent sides of the object to estimate the shape of one or more corresponding omitted surfaces in contact with those walls or other things; using a prior computer model and/or corresponding prior images from an earlier time before the given time that have visual data for an omitted surface (e.g., from one or more mobile camera devices that moved to locations with visual coverage of some or all of the backside and/or adjacent sides relative to fixed-location camera positions used to acquired current images) to estimate a current shape of the omitted surface, such as by fitting the prior shape data to current available object shape information; etc. Additional details are included below related to automated operations of the IMDOEM system for predicting or otherwise estimating shapes of omitted surface subsets of the object's exterior surface at a given time that are not visible in the images acquired at that given time.

In addition, automated activities by the IMDOEM system to use multiple images together to model an object for a given time may in at least some embodiments include performing automated operations to align the visual data of the multiple images, such as to determine a common coordinate system in which to position the visual data of the multiple images—the multiple images may, for example, be one or more of the following: multiple images acquired at the given time from one or more mobile camera devices; multiple images acquired at the given time from multiple fixed-location camera devices; one or more images acquired at the given time from one or more fixed-location camera devices and one or more additional images acquired at the given time from one or more mobile camera devices at one or more locations; one or more images acquired at the given time from one or more fixed-location camera devices and one or more further images acquired at an earlier time from one or more mobile camera devices at one or more locations; etc. As part of the automated operations to align the visual data of the multiple images, an acquisition pose (or location in 3D space, and orientation in three dimensions at that 3D location) may be determined for the acquisition of each image by an image acquisition device, and used in the determination of the common coordinate system for the images from the image acquisition device(s). Such alignment operations may be performed in various manners in various embodiments, including using one or more of the following non-exclusive list: doing 2D feature matching between the visual contents of two or image images, and identifying relative locations and orientations of features that are visible in those images to determine an aggregate location and orientation translation between the visual contents of those images; doing whole-image alignment between two or more images, to identify an overall location and orientation translation between the visual contents of those images; doing matching of one or more known control points in the 3D environment that are visible in two or more images (e.g., signs; structural features, such as tops or ends or corners of one or more walls; etc.), and identifying relative locations and orientations of such control points that are visible in those images to determine an aggregate location and orientation translation between the visual contents of those images; etc. Additional details are included below related to automated operations of the IMDOEM system for performing automated operations to align the visual data of multiple images acquired from one or more image acquisition devices, including to determine an acquisition pose of the image acquisition device(s) for each acquired image.

The IMDOEM system may perform further automated operations in at least some embodiments to assist in the analysis of images at a given time of an object to generate a 3D computer model of the object. As one non-exclusive example, the acquisition of images at a given time of an object by an image acquisition device may include capturing multiple images or other separate sets of visual data simultaneously or in rapid succession, such as multiple images at a given pose using different exposures and/or other imaging settings, one or more HDR (high dynamic range) images that provide visual data over an extended luminosity range, etc.—if so, information from the multiple images or other visual data sets may be used to improve the visual data in the images of a group that are used for the analysis activities, such as to select one or more 'best' images or visual data sets to use in the group (e.g., that satisfy one or more specified criteria), to blend or otherwise combine visual data from multiple images or visual data sets to use in the group, etc. As another non-exclusive example in which images of an object are acquired at given times from one or more image acquisition devices and used to generate computer models of the object for each of those given times, the automated operations of the IMDOEM system may further include capturing additional images of the object at one or more later times after the given times (e.g., once, periodically, occasionally, upon request, etc.) and using visual data from the additional images to assist in subsequent modeling of the object at the later time(s), such as, for portions of the object's surface that are not visible in images acquired at one or more of the times, to combine visual data from other images of those object portions at other times with the visual data from the images acquired at the one or more times. Additional details are included below related to automated operations of the IMDOEM system for performing further automated operations of these and other types.

In addition, the automated operations of the IMDOEM system to acquire such images of an object and associated image acquisition metadata and/or to analyze those images and metadata to model the object and its attributes may be initiated in various manners at various times. For example, in at least some embodiments, one or more triggering conditions may be defined and used to initiate the acquisition of images and associated image acquisition metadata of an object and/or to initiate an object model generation and usage process using acquired images and metadata (e.g., using concurrently acquired images/metadata and/or a most recent set of previously acquired images/metadata), such as one or more of the following non-exclusive list: a change in an environment around the object of a defined type, such as a detection of movement at or near the object (e.g., to potentially reflect changes to the surface of the object, such as material being added, removed or otherwise moved), a defined type of change in the amount of lighting (e.g., to reach a minimum amount of lighting needed for acquisition of desired visual data for the images), etc.; an expiration of a timer since a prior image acquisition, or otherwise reaching a scheduled acquisition time; etc. In addition, in at least some embodiments, the performance of image/metadata acquisition and/or a model generation and usage process may be performed dynamically in response to a request received from an end-user and/or another software system, such as to acquire images/metadata and generate a corresponding object model and determine one or more object attributes from the model to use in providing response information to the request, such as in a real-time or near-real-time manner (e.g., within second or minutes of the request) to enable monitoring of a current status of the object. Additional details are included below related to automated operations of the IMDOEM system for initiating the acquisition of images and metadata of an object and/or an object model generation and usage process.

As noted above, in addition to generating 3D computer models of objects by analyzing visual data in acquired images and associated image acquisition metadata in order to determine resulting object attributes, the IMDOEM system may perform further automated operations in at least some embodiments. For example, such further automated operations may include determining changes over time in one or more objects and their attribute values in various manners and may be performed by one or more modules of the IMDOEM system (e.g., an IMDOEM system Object Change Determiner module, as discussed in greater detail below with respect to FIGS. 1 and 8 and elsewhere), such as based on comparing and otherwise analyzing multiple computer models generated to represent an object at different times and/or other visual data obtained from images acquired at the different times and their associated image acquisition metadata. For example, one or more computer model(s) may be generated to represent one or more objects at each of multiple times (e.g., based on different image acquisition sessions that take place at each of those times), and differences between those computer models may be determined and used to identify changes in the one or more objects over time, such as with respect to one or more object attribute values of interest (e.g., volume, surface area, material type, etc.). Additional details are included below regarding such automated operations to determine changes over time in one or more objects and their attribute values, including with respect to FIG. 8 and FIGS. 10A-10D.

In addition, information may be presented or otherwise provided to users regarding various types of determined information, including information about generated computer models and resulting determined attribute values for one or more times. For example, one or more modules of the IMDOEM system (e.g., an IMDOEM system Object Information Visualizer module, as discussed in greater detail below with respect to FIGS. 1 and 9 and elsewhere) may generate and provide information for display in a GUI that provides user-selectable controls and other options to allow an end user to interactively request or specify types of information to display and to visually review information about one or more objects, such as determined object attribute values at one or more times, and/or information about changes in such object attribute values and the underlying objects. Such information may in some embodiments and situations be presented along with one or more acquired images of the one or more objects at one or more times and/or visual representations of the one or more objects rendered from created computer models, such as to overlay information on the image(s) or other visual representations to highlight one or more types of determined information that is being presented. The user-selectable controls or other information may further allow the end user to control what information is presented and/or how it is presented in various manners in various embodiments. In addition, when the analysis of an object is performed by the IMDOEM system on behalf of a client of the IMDOEM system, the IMDOEM system may generate one or more reports for the client or otherwise provide corresponding information to the client in manners other than via a GUI—such reports or other information may, for example, be provided in a manner specified by a client, and may be delivered to the client in various manners (e.g., sent to a computing device of an authorized end user representative of the client from one or more server computing systems of the IMDOEM system; printed or otherwise distributed in non-electronic manners; etc.). Additional details are included below regarding such automated operations to present or otherwise provide information via a GUI or in other manners, and to allow the user(s) to modify or otherwise control the information presentation, including with respect to FIGS. 9 and 10A-10D.

The automated operations described herein may in at least some embodiments include various additional interactions with one or more users (e.g., clients of the IMDOEM system or their representatives), such as users who have or will receive information about the attribute values. Such interactions may include, for example, receiving additional input from the user to supplement information used to generate the computer model(s), such as one or more of the following: information about portions of the object, such as based on specialized knowledge of the user about portions of the object that are not visible or otherwise not covered in the acquired images (e.g., a shape of a top of an object that is higher than a level of the camera during image acquisition and not covered in the acquired images, a shape of a back and/or side of an object that is not visible from one or more fixed-location cameras and not covered in the acquired images, valleys or other lower areas of the object's surface that are blocked by higher closer portions of the object or other intervening objects (e.g., a wall surrounding at least some of the object), interior holes or other external objects that are within the object being modeled but not visible from the images being acquired, etc.), based on information that the user may identify in images (e.g., by providing user input on a touch-sensitive screen or using other input techniques for one or more displayed images of an object to specify particular types of information of interest, such as a boundary of the object, areas of vegetation or other extraneous materials on the surface of the pile, areas of other objects or materials between the camera and the object that are blocking portions of the object, areas of water or other extraneous materials on the surface adjacent to or near the object, areas of adjacent or overlapping other objects that may obscure portions of the object being modeled, etc.), etc.; information about portions of the underlying surface on which the object being modeled is situated that are not visible under the object (e.g., holes or other depressions in the surface, hills or bulges or other protrusions in the surface, etc.); etc. Such information from the user may then be used to modify the generated computer model (e.g., to supplement and/or override image-acquired data) and/or to assess the accuracy of corresponding portions of the computer model. Such user interactions may further include, for example, receiving instructions from the user to override an automated volume value and/or other attribute measurements and/or to override an automated verification (or lack thereof) of such a measurement or to otherwise specify such a verification or lack thereof, such as based on specialized knowledge of the user—such receiving of user input may include, for example, receiving and accepting one or more alternative user-specified attribute value(s) to use instead of or in addition to automatically determined attribute value(s), accepting a verification or lack of verification by the user of the attribute value(s), receiving a determination by the user of a verification or lack of verification of the attribute value(s) to use (e.g., instead of an automated determination from the verification activities), etc. In addition, to assist the user in providing such input, various types of computer-generated information may be displayed or otherwise provided to the user, such as a 3D rendering of an object showing one or more of the following: contour lines; a determined object boundary, and optionally areas of adjacent object toe with a slope that is too high or too low; an object surface, and optionally corresponding image-acquired data, as well as areas in which there is not sufficient data coverage for volume and/or surface area values; etc. Additional details are included herein related to techniques for interacting with users, including adjusting automated determination activities by the IMDOEM system and/or automatically determined information from the IMDOEM system based on corresponding input from a user.

In addition, the information that is determined for one or more objects may in some embodiments and situations be used in manners other than to provide corresponding information to a client of the IMDOEM system, such as to provide information about particular objects and/or aggregated information about multiple objects (e.g., objects together at a single site controlled by a particular operator who creates or manages the objects, objects in a geographic area, objects of a particular type, etc.) to one or more external entities that do not own the objects being modeled or initiate the modeling of the objects. Additional details are included below related to techniques for generating and providing information about objects of interest to clients and/or other entities.

While some of the example embodiments discussed herein include a stockpile or other pile of material, other types of objects may be assessed in a similar manner in at least some embodiments, including holes or pits or other cavities in the ground (e.g., material extraction from strip mining) or other negative spaces, etc. Furthermore, an object of interest being assessed may be of various types of materials, such as for a stockpile or other pile to include materials of various types and sizes (e.g., construction aggregates, grain or other product, sawdust, logs, tires, trash, recyclable materials, etc.). In addition, images that are acquired may be of various types and resolutions, including still images and/or video image frames, and may capture various types of light or other energy (e.g., visible light, infrared, ultraviolet, radioactivity, etc.). Similarly, images may be acquired using image acquisition capabilities of various types of image acquisition devices in various embodiments, including one or more of the following: a mobile device that is carried by a human user as he or she passes around some or all of an object (e.g., a digital camera that takes individual digital photo images and/or digital video consisting of successive frames of digital images, including a camera that is carried by a human user or a body-mounted camera; a device with computing capabilities and image acquisition capabilities, such as a smart phone, a tablet computer, a pad computer, a slate computer, etc.); a vehicle-mounted camera, such as on a ground or aerial drone that is partially or wholly autonomous, or on a ground or aerial vehicle driven or piloted or guided by a human (e.g., an airplane, a truck, an ATV, etc.); a satellite; one or more fixed-location camera devices (whether with or without their own computing capabilities), etc. Furthermore, while images of an exterior surface of an above-ground object are acquired in some embodiments from beside (e.g., ground-level) or above the object, in other embodiments the images may be acquired in other manners, including acquiring an interior surface of an object from within the object (e.g., from within a hole or pit or other cavity; etc.) or above the object (e.g., ground level outside a hole or pit or other cavity, etc.), and including from a device that moves along an exterior or interior surface of an object (e.g., a ground-based drone that drives on top of a pile or within a hole).

Furthermore, while some of the example embodiments discussed herein include analyzing a single object at a single time, the described techniques may be used in other manners in some embodiments. For example, a single object may be analyzed at different times, such as to further enable relative information for the object to be determined over time (e.g., to determine how a stockpile object grows and/or shrinks over time with respect to volume or one or more other attributes), with corresponding information made available to a client and/or used for further automated determination of related information. In addition, in at least some embodiments, multiple objects (e.g., nearby, on top of each other in whole or in part, behind or in front of each other in whole or in part, etc.) may be analyzed together in one or more images that are acquired simultaneously or at different times. Additional details are included below regarding determining changes in one or more objects and their attribute values over time, such as by using images acquired at different times, as well as presenting corresponding information in various ways.

For illustrative purposes, some embodiments are described below in which specific types of images and associated image acquisition metadata are acquired for specific types of objects in specific manners (e.g., for outdoors piles of materials using particular types of image acquisition devices, to generate 3D computer models of the piles and determine their volumes and surface area and other attributes), and in which specific types of object attributes are estimated in particular manners—however, it will be understood that such described techniques may be used with other types of objects and images and image acquisition metadata and for other types of object attributes in other manners in other embodiments, and that the invention is thus not limited to the exemplary details provided. As one non-exclusive example, while generated computer models for objects and/or resulting determined object attributes may be used for display to assist viewers in monitoring changes to the objects and/or their environment, generated and determined information of these types may be used in other manners in other embodiments. The term "acquire" or "capture" as used herein with reference to an object and/or its environment may refer to (unless context clearly indicates otherwise) any recording, storage, or logging of media, sensor data, and/or other information related to spatial and/or visual characteristics and/or otherwise perceivable characteristics of the objects or subsets thereof, such as by a recording device or by another device that receives information from the recording device. In addition, various details are provided in the drawings and text for exemplary purposes, but are not intended to limit the scope of the invention. For example, sizes and relative positions of elements in the drawings are not necessarily drawn to scale, with some details omitted and/or provided with greater prominence (e.g., via size and positioning) to enhance legibility and/or clarity. Furthermore, identical reference numbers may be used in the drawings to identify similar elements or acts.

FIG. 1 is a diagram illustrating an example embodiment of an IMDOEM ("Image and Motion Data-based Object Exterior Modeling") System 160 that may be used to provide automated functionality related to the analysis of images of one or more objects and associated image acquisition metadata, such as to calculate volume or otherwise measure attributes of interest, as well as to optionally perform further automated operations (e.g., to display information from a partial or completed 3d computer model; to determine changes over time in one or more objects, such as with respect to one or more attributes of the one or more objects; etc.). The IMDOEM system 160 may be provided via one or more network-accessible configured devices, whether via one or more server computing devices (not shown) that are remote from a user 105, and/or based on use of one or more mobile computing devices 110 used by the user 105. A computing device in such an example may include any device or system that may receive data and/or requests, and take corresponding actions (e.g., store the data, respond to the request, etc.) to perform the described automated operations, as discussed in greater detail elsewhere herein.

In particular, in this example, a user 105 is carrying a mobile computing device 110 that includes image acquisition capabilities (e.g., one or more imaging sensors) and includes computing capabilities, as well as communication capabilities to enable a transmission 185 of information from the mobile device 110 to other systems (e.g., other remote server computing systems providing at least some of the IMDOEM System 160), such as via a cellular telephone network or other transmission method—in this example, the mobile device 110 is moved along a path 115 that traverses some or all of the exterior of a stockpile object 150 of material and captures images of the stockpile exterior from a ground view that is significantly below the height of the stockpile top. In other embodiments, the image data that is captured by such a mobile device 110 may be provided to other systems in other manners, such as via a physical cable or dock or other physical connection (e.g., after the image acquisition for an object in an environment is completed). In addition, in some embodiments, some or all of the image data captured by a mobile device 110 may be first transmitted to another nearby computing device (not shown), such as another nearby computing device carried by the user or located in a nearby location (e.g., a nearby vehicle or building), and then transmitted from the nearby computing device to one or more remote server computing systems or other remote systems—such a transmission from the mobile device to the nearby computing device may occur, for example, via a physical connection (e.g., a cable, wire or other connector), via a wireless transmission (e.g., Bluetooth, infrared, near field communications, a wireless transmission mechanism with a limited transmission range, etc.), etc. Furthermore, while the mobile device acquiring images is in this example carried by a human user, in other embodiments some or all of the acquired images may be captured in other manners, whether in addition to or instead of such a human user, such as via one or more mobile devices that are carried by or otherwise part of one or more of automated aerial drone(s) 181, human-piloted aircraft(s) 183, ground vehicle(s) 188 (whether automated drone or with human pilots), satellite(s) 186, etc. In addition, in some embodiments, one or more fixed-location camera devices 121 may be present at locations that provide a partial view of a subset of the stockpile 150 of material, may capture images continuously or at specific times of the pile 150 and some of its surrounding environment, with those images not including visual coverage of one or more omitted surfaces of the object's exterior, and may be optionally transmitted (e.g., via wire or cable 184; via wireless transmission, not shown; etc.) to one or more other computing devices for use by an embodiment of the IMDOEM system (e.g., copy 160 of the IMDOEM system on the mobile device 160, and/or on one or more remote server computing systems via one or more networks 180).

The actions of the user and/or the mobile device may be controlled or facilitated via use of one or more software programs executing on the mobile device, such as IMDOEM system 160 and/or optional browser 143, control system 147 to manage I/O (input/output) and/or communications and/or networking for the device (e.g., to receive instructions from and present information to the user), etc. While the mobile device of the user may include various hardware components, such as one or more cameras or other imaging sensors 149, one or more motion sensors 148 (e.g., a gyroscope 148a, an accelerometer 148b, a compass or other magnetometer 148c, etc., such as part of one or more IMUs, or inertial measurement units, of the mobile device), one or more hardware processors 141, memory 142, storage 144, a display 145 (e.g., touch-sensitive) and other I/O components 146 (e.g., a microphone; a physical keyboard; physical buttons or other controls; a virtual keyboard and/or other virtual buttons or controls, such as on a touch-sensitive display; etc.), and other sensors and components that are not illustrated (e.g., an altimeter, light detector, GPS receiver, one or more external lights, etc.), the mobile device does not in at least some embodiments have access to or use equipment to measure the depth of objects relative to a location of the mobile device, such that relationships between images and the object(s) in the images' visual data may be determined in part or in whole based on matching elements in different images and/or by using information from other of the listed hardware components, but without using any data from any such depth sensors.

In this example, the stockpile object 150 (e.g., consisting of construction aggregate material) is shown in an outdoors environment, with a human-constructed object 229 (e.g., a traffic cone) placed on the underlying surface near the stockpile object 150 (e.g., to provide scale using an object of known size; as a control point for the IMDOEM system to identify, such as near the start and/or end of the traversal path 115; etc.), and the traversal path 115 around the exterior of the object may be selected wholly by the user or instead based at least in part on user feedback or instructions provided by the IMDOEM system 160 to the user. The user and/or the mobile device may further acquire a variety of images to encompass the exterior of the object during the traveling of the path. As one example, the user may occasionally manually activate the image acquisition capabilities of the mobile device 110, such as at a variety of locations 120 around the exterior along the traversal path 115. As another example, the user may travel the path 115 and the mobile device may automatically acquire such images at such locations, such as based on a period of time elapsing since the last image, a distance traveled by the user since the last image, or other information related to the images that have been previously captured. Alternatively, the mobile device may acquire image data in a continuous or substantially continuous manner, such as to shoot video that includes successive image frames in rapid succession (e.g., 60 frames a second, 30 frames a second, 1 frame a second, 1 frame every 5 seconds, 1000 frames a second, etc.). Thus, for example, various of the images acquired may instead occur at relatively close intervals, such as those illustrated with respect to locations 125 (while the locations 125 are not illustrated throughout the entire exterior of the object, it will be appreciated that such substantially continuous image acquisition may be performed at the same rate for some or all of the traversal of the object exterior).

After a group of one or more images (e.g., some or all images acquired during an image acquisition session at a given time by the mobile device 110 and/or by one or both of the fixed-location camera devices 121) have been selected to represent the stockpile object for that given time, the IMDOEM system 160 may further store image data 162 for those images and associated image acquisition metadata 166 (e.g., motion data from IMU sensors and/or additional related metadata that is generated based at least in part on that motion data) from that image acquisition session (e.g., on storage 144 of the mobile device 110 and/or on storage, not shown, of one or more remote computing devices), perform processing to generate one or more models or other representations to represent the object (e.g., a 3D point cloud model, a surface model, etc.), and optionally may generate one or more additional models of at least some of a surrounding environment (e.g., a bare earth model of ground or other underlying surface on which the object sits; a model of one or more walls or other things enclosing at least some of the object, not shown in this example; etc.), and may store corresponding information in model data 163 (e.g., on storage 144 of the mobile device 110 and/or on storage, not shown, of one or more remote computing devices). After the one or more models have been generated, the IMDOEM system 160 may further estimate or otherwise measure one or more attribute values for the object 150, and store such information with attribute data 164 (e.g., on storage 144 of the mobile device 110 and/or on storage, not shown, of one or more remote computing devices), as well as optionally determine changes over time for one or more attributes and/or objects (e.g., with respect to a changing shape of the object 150 as material is added and/or removed) and store such information with change data 165 (e.g., on storage 144 of the mobile device 110 and/or on storage, not shown, of one or more remote computing devices). In addition, one or more clients of the IMDOEM system 160 may provide various client data to the IMDOEM system 160 that is stored with client data 161 (e.g., on storage 144 of the mobile device 110 and/or on storage, not shown, of one or more remote computing devices), such as related to types of data of interest to be generated for the client. Such clients and their authorized representative users may, for example, use various client computing systems 190 to communicate with the IMDOEM system 160 over one or more networks 180, such as to perform registration activities and/or to obtain object attribute value determinations performed for the client. As noted above, the data 161-166 may be stored in various manners, such as all or in part on one or more server computing systems remote from the mobile device 110, all or in part on the mobile device 110, all or in part on one or more of the fixed-location camera devices 121, all or in part on one or more storage systems (not shown) separate from the computing devices and image acquisition devices (e.g., on cloud storage), etc.

The IMDOEM system 160 in this example includes various modules 171-179, which may perform various automated operations of the IMDOEM system 160. In some embodiments, some or all of the modules 171-179 may execute on one or more server computing systems (or other computing systems) remote from the object 150, while in other embodiments one or more of the modules 171-179 may instead execute on the mobile device 110 and/or on one or more other configured devices of the user 105 (not shown). For example, the Image Quality Monitor module 171 and Image Content Problem Detector module 172 and Motion Data Problem Detector module 173 may optionally be grouped as part of an image/metadata acquisition sub-system 168 of the system 160, with some or all of those image/metadata acquisition modules optionally being executed on the mobile device 110. In addition, the Object Model/Attribute Determiner module 174, Object Change Determiner module 176, Object Information Visualizer module 177, Object Model/Attribute Verifier module 178 and Object Identifier module 179 may optionally be grouped as part of an object attribute value determination and verification sub-system 169 of the system 160, with some or all of those object modules 174-179 being executed on one or more server computing systems remote from the mobile device and/or being executed on the mobile device 110. It will be appreciated that the functionality of the IMDOEM system 160 may be structured in other manners in other embodiments, including to have more or less modules and/or to have more or less functionality than is described in this example.

The Image Quality Monitor module 171 may be configured to perform automated operations for acquired images (e.g., images acquired from the mobile device 110 and/or fixed-location camera devices 121) in at least some embodiments, such as to monitor image quality with respect to one or more metrics of interest, and to take corresponding actions if sufficient quality is not sustained, including to verify that at least some types of temporary problems do not exist with one or more images acquired at a given time about the object's exterior surface that introduce excessive uncertainty in the shape of the object's exterior (e.g., temporary problems corresponding to blurring, warping, skew, wobble, spatial aliasing, excessive or insufficient contrast, and/or other distortions or deformations, such as from one or more of rolling shutter problems, camera vibration or other movement, lighting or other environmental conditions, etc.). In addition, the module 171 may, in some embodiments in which a user such as user 105 is participating in image acquisition, assist in providing feedback or other instructions to the user related to image quality problems that are detected if the module 171 executes concurrently with the image acquisition—for example, Operator Feedback Provider functionality may be configured to perform further automated operations that include providing feedback to the user in various manners while the user 105 is travelling the path 115, such as when image quality problems are detected or to provide other types of information (e.g., to provide instructions about changes to make for future additional images to acquire and/or to re-acquire some previous images).

The Image Content Problem Detector module 172 may be configured to perform further automated operations for acquired images (e.g., images acquired from the mobile device 110 and/or the fixed-location camera devices 121) in at least some embodiments, such as to monitor visual contents of the images to verify that at least some additional types of temporary problems do not exist with one or more images acquired at a given time about the object's exterior surface that introduce excessive uncertainty in the shape of the object's exterior (e.g., temporary problems corresponding to obstructions being temporarily present between the image acquisition device(s) and the object), and to take corresponding actions if such problems exist—in addition, the module 172 may, in some embodiments in which a user such as user 105 is participating in image acquisition, assist in providing feedback or other instructions to the user related to temporary problems that are detected if the module 172 executes concurrently with the image acquisition (e.g., to provide instructions about changes to make for future additional images to acquire and/or to re-acquire some previous images). In a manner similar to module 172, the Motion Data Problem Detector module 173 may be configured to perform further automated operations for motion data and other image acquisition metadata associated with acquired images (e.g., metadata generated by the mobile device 110 and/or the fixed-location camera devices 121) in at least some embodiments, such as to monitor values of the acquired metadata with respect to one or more metrics of interest, and to take corresponding actions if sufficient quality is not sustained, including to verify that at least some additional types of temporary problems do not exist with one or more metadata data points acquired at a given time that introduce excessive uncertainty about the acquisition of the corresponding images (e.g., due to excessive changes between adjacent metadata data points or due to other indicators of unreliable metadata readings), and to take corresponding actions if such problems exist—in addition, the module 173 may, in some embodiments in which a user such as user 105 is participating in image acquisition, assist in providing feedback or other instructions to the user related to temporary problems that are detected if the module 173 executes concurrently with the image acquisition (e.g., to provide instructions about changes to make for future additional images to acquire and/or to re-acquire some previous images).

In at least some embodiments, an additional Image Selector module 129 may be provided and configured to perform automated operations to select, for use as a group of images to represent the object 150 at a given time, some or all images acquired from one or more image acquisition devices for the given time (and optionally some previously acquired images if the images acquired at the given time have only a partial view of the object, such as if the images acquired at the given time are from one or more fixed-location cameras such as camera devices 121 in FIG. 1 without additional supplementary images from a mobile device such as mobile device 110)—in this example embodiment, the Image Selector module 129 is a sub-module of an IMDOEM system Object Model/Attribute Determiner module 174. The selection of the images may occur concurrently with the acquisition of images at the given time or after all of the images for the given time have been acquired—furthermore, if the Image Selector module executes on at least one of the one or more image acquisition devices from which the images are acquired at the given time (e.g., on mobile device 110), and if image data for object 150 is to be transmitted over the network(s) 180 to one or more remote server computing systems, the amount of bandwidth used for the transmission may be reduced in such a situation, as only the images in the selected group (or information extracted from those images of the selected group and/or from other images, such as selected images that were previously acquired) and their associated image acquisition metadata may be transmitted. In other embodiments, all of the images acquired at the given time (or all that satisfy minimum quality standards) may instead be transmitted to one or more remote server computing systems for further analysis along with all of the acquired image acquisition metadata, including in embodiments in which the Image Selector module executes on those remote server computing systems and selects some or all of the acquired images after the item acquisition session has been completed.

The Object Identifier module 179 may be configured to perform further automated operations to, for a group of acquired images that represent one or more objects, identify those one or more objects, such as to match those one or more objects to information about one or more previously modeled objects. As discussed in greater detail elsewhere herein, such objects may change over time with respect to one or more attributes (e.g., shape, size, composition of materials, moisture content, temperature, etc.), and various techniques may be used to determine if an object represented by a group of acquired images corresponds to a changed object that was previously modeled or is instead a new object (e.g., an object that is newly formed such a previous acquisition of images for the same site, an object that is not newly formed but was not previously captured in acquired images, etc.)—as one example one or more locations may be tracked for each object (e.g., GPS coordinates for a boundary of the object and/or a center point or other location within the object's footprint) and used to determine that an object being modeled overlaps at least in part with the location information for a previously identified and tracked object. Such objects may further change in other manners at times, such to have an object that results from two or more other previous objects being combined, two or more objects that result from a previous object being split, a previous object that is removed or is otherwise no longer present, a new object that was not previously present, an object whose previous location has changed, etc.

The Object Model/Attribute Determiner module 174 may be configured to perform further automated operations to, after a group of images to represent the object 150 has been selected and are available in the image data 162 (e.g., by the Image Selector submodule 129), and after corresponding image acquisition metadata is available in the motion data 166, analyze the images of the selected group and associated image acquisition metadata, and generate one or more corresponding models or other representations, such as to generate a point cloud and/or a surface model for the object (e.g., to apply a surface model to a generated point cloud model). In this example embodiment, the module 174 further includes a Motion Data-based Initial Exterior Modeling submodule 126 that uses estimated acquisition pose metadata for various acquired images as part of determining initial trajectory information for the mobile device 110, a Visual Data-based Exterior Modeling Refinement submodule 127 that refines or otherwise updates the initial trajectory information based at least in part on visual data of the acquired images of the selected group, and an Exterior 3D Shape Determination submodule 128 that uses the finalized trajectory information and corresponding aligned visual data of the acquired images of the selected group to determine 3D positions of points on the object exterior surface and to optionally determine further 3D shape information for the object exterior surface, with additional details of various operations of the Object Model/Attribute Determiner module 174 and its submodules discussed elsewhere herein. In addition, in some embodiments and situations, some or all of the generated models may be 3D models (e.g., for a point cloud model), while in other embodiments and situations, some or all of the generated models may have other forms (e.g., 2.5D representations)—use of the term "model" herein is intended to include any representation of data for an object that may be stored, unless otherwise indicated. The module 174 may further be configured to perform further automated operations to, after the one or more models are generated, use the generated model(s) to measure values for one or more attributes of interest of the object 150, such as a volume attribute or other related attributes.

The Object Change Determiner module 176 may be configured to perform automated operations to compare models of one or more objects generated at different times to determine changes in the object(s) over time (e.g., changes in one or more object attribute values), such as to identify differences in visual data from images acquired at the different times for the one or more objects that are used to generate the models. The Object Information Visualizer module 177 may be further configured to perform automated operations to present or otherwise provide information to users in one or more GUIs regarding various types of determined information, including information about determined changes over time in one or more objects and their attribute values, as well as to control what information is presented and/or how it is presented in various manners, as discussed in greater detail elsewhere herein. The module 177 may further be used to provide corresponding information to the client in manners other than via a GUI in some embodiments, such as by generating a report that includes results information and sending it to a client system 190 and/or the mobile device 110, or instead to provide such information in other manners (upon later request by the client, such as to enable the client to login to the IMDOEM system and to review results of previously analyzed objects). In addition, during or after the process of generating attribute information, determining change information and/or verifying attribute information, the module 177 may in some embodiments perform various types of interactions with an end user, including to obtain various types of input from the end user that is subsequently used by the IMDOEM system 160 (e.g., by one or more of the determination and verification modules), as discussed in greater detail elsewhere herein.

The Object Model/Attribute Verifier module 178 may be configured to perform further automated operations to verify generated computer model(s) and/or object attribute values produced from such computer model(s), such as based at least in part on verifying visual data of acquired images and/or associated image acquisition metadata used to generate the computer model(s). As discussed in greater detail elsewhere herein, such automated operations may include analyzing one or more types of information that reflect accuracy and/or completeness of the computer model(s) and their resulting object attribute values, such as to verify data coverage of a computer model of an object with respect to volume and/or surface area of the modeled object, and/or to verify boundary accuracy and completeness of a computer model of an object with respect to a toe proximate to an underlying surface on which the object is situated, and/or to verify sufficiency of data in acquired images used to generate the computer model(s), and/or to verify sufficiency and accuracy of image acquisition metadata associated with acquired images that is used to generate the computer model(s), and/or to verify temporary problems in visual contents of such acquired images that inhibit generation of a corresponding computer model.

While the example of FIG. 1 involves multiple fixed-location camera devices 121 and an mobile device 110 to capture data regarding the object 150, in other situations and embodiments no fixed-location camera may be used, only a single fixed-location camera may be used, or additional fixed-location cameras may be used. In addition, different devices and/or sensors may be used to acquire different types of data (e.g., simultaneously) in some embodiments, and the remote server computing systems and/or local computing devices (e.g., mobile device 110, one or more fixed-location camera devices with computing capabilities, one or more other local computing devices at a site of the object and in communication with the fixed-location camera devices, etc.) may combine or otherwise use such different types of data—non-exclusive examples of types of data that may be acquired include image data in one or more light spectrums, non-light energy data, location data (e.g., via GPS), depth or distance data to the object, color data, sound data, etc. In addition, in some embodiments and situations, different devices and/or sensors may be used to acquire the same or overlapping types of data (e.g., simultaneously), and the remote server computing systems and/or local computing devices may combine or otherwise use such different types of data, including to determine differential information for a type of data. For example, one or more fixed-location devices in the environment may include GPS capabilities (or other location determination capabilities) and the mobile device may similarly include GPS capabilities (or other location determination capabilities), to enable image acquisition positions at a given time to be determined more accurately by tracking relative differences in the differing GPS data (e.g., to eliminate minor transitory variations or fluctuations from a GPS satellite or other common source of the GPS data), and such differential information may similarly be determined for some or all of the other types of data that may be captured. In addition, information such as GPS data or other location data may further be used to determine additional information about an object in some embodiments, such as to assist in determining rough scale information for the object—as one example, location data at different locations on a path or other exterior around the object may be used determine information about the width and/or length of the object, whether alone or in combination with additional data about depth or other distance values of a device or sensor to the object at particular such locations. However, such GPS data or other such location data may not have sufficient accuracy to create a 3D computer model with a desired level or threshold of accuracy in at least some embodiments and situations, such as to model features and other locations on a surface of an object to a scale of one or more inches or fractions of an inch, one or more feet, etc., and thus the visual data of the acquired images may instead be used to determine object scale without such other location data in some embodiments.

It will be appreciated that the details discussed with respect to FIG. 1 are provided for illustrative purposes, and that the described techniques are not limited to these example details.

FIGS. 2A-2H illustrate various example images that may be acquired with respect to an object of interest (e.g., such as for the stockpile object 150 of FIG. 1), such as by one or more mobile devices (e.g., mobile computing device 110 of FIG. 1), as well as corresponding analysis of the images that may be performed in at least some embodiments.

Figure 2A:
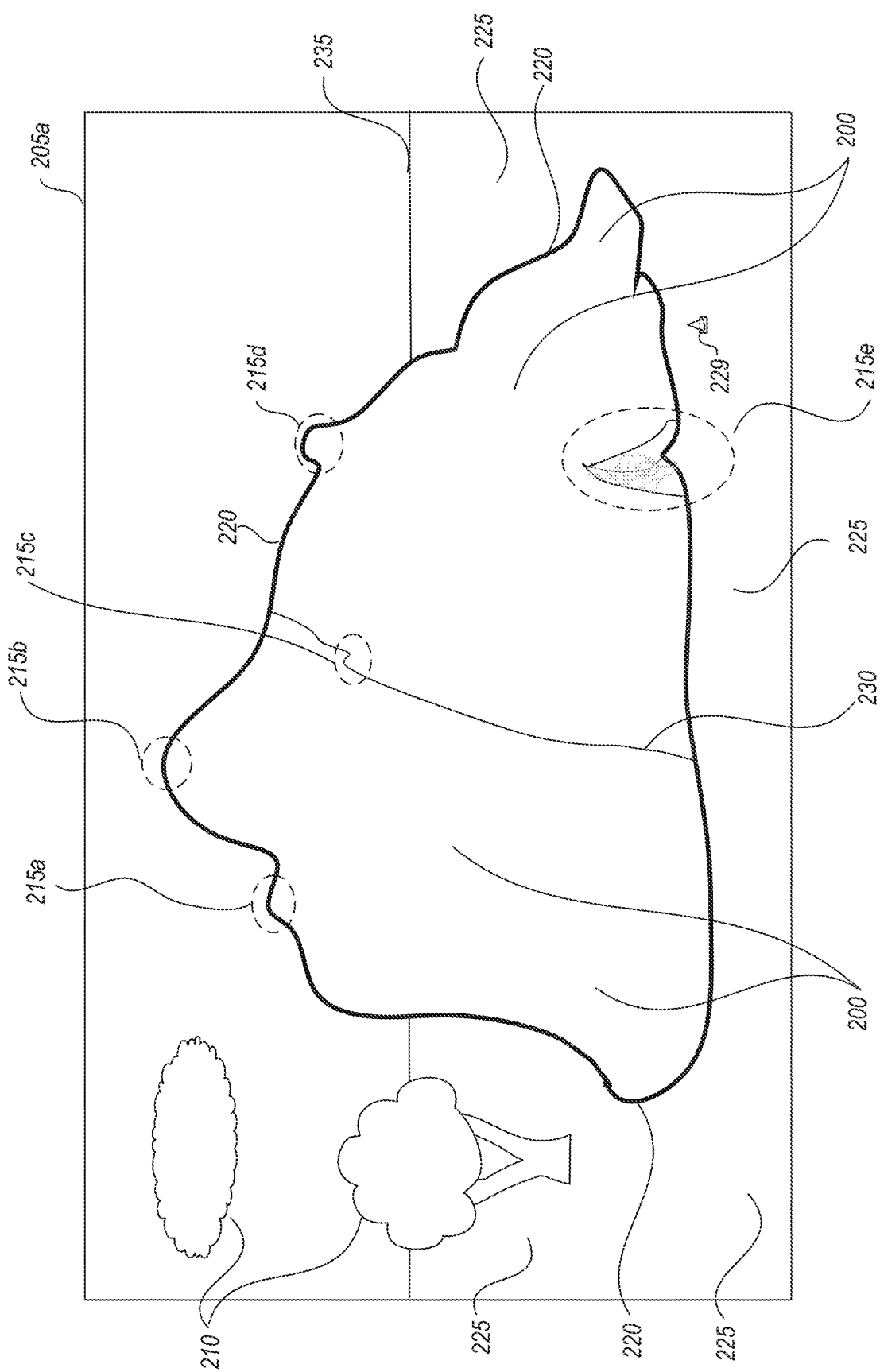
FIGS. 2A-2P illustrate examples of acquiring images with visual data of an object and acquiring other image acquisition metadata for those images, and analyzing the acquired data to assess measurements of volume and/or other attributes of the object and to perform further automated verification activities.

With respect to FIG. 2A, an example image 205a is shown, which includes a side view of an object 200, with the object in this example representing a stockpile of construction aggregate materials (e.g., object 150 of FIG. 1). The image 205a further includes additional information that is not part of the object 200, such as other objects 210 that occur naturally in the environment of the object (in this example, a tree and a cloud) and other objects 229 that are placed in the environment of the object (in this example, a traffic cone), a base surface 225 on which the object 200 and at least some other objects (e.g., the tree 210) rest, a horizon line 235, etc.—it will be appreciated that the surface 225 may in some situations be flat and level, while in other situations the surface may be sloped and/or irregular.

In addition, in this example, the exterior of the stockpile object 200 may include various visible aspects, at least some of which are shown in the image 205a, and which may be reflected in detectable features via an automated analysis of the image. For example, the surface of the object 200 may have varying textures, colors, and shades (although colors and textures are not illustrated in this example, and shading is shown only with respect to feature 215e), such as to reflect a type of material of the object, position of the sun or other lighting source, an angle of the object surface with respect to the viewpoint location of the imaging device, etc. In addition, the surface of the object 200 may have various irregularities or other features that may be identified in the image and used to track changes between images—in this example, various example features 215 are illustrated. Such features may include, for example, points along a top of a silhouette or other outline 220 of the object, such as feature 215b at an overall peak of the object 200, and feature 215a that corresponds to a local high point of the outline. In addition, other example features include feature 215d along the outline 220 of the object 200, such as based on its distinctive shape, feature 215c along a ridge line 230 of the object surface that is not part of the object outline (from this viewpoint), feature 215e that indicates a local cavity or indentation on a portion of the surface (with shading added to show that it may have a darker color relative to other surrounding parts of the surface), etc. While feature 215e provides one example of a feature on the surface of the pile, a variety of other types of surface features may similarly be identified and used, including, for example, based on differing colors, shading, textures, angles, curvature, lack of continuity, etc. between different locations on the surface; based on cavities, indentation, protrusions, protuberances, lines, or other shapes; based on changes from one material type to another; etc. Thus, such features may include structural features that are identified based at least in part on their shape or other structure and/or appearance features with visible elements (e.g., patterns, colors, textures, etc.). It will be appreciated that a variety of types of features may be identified and selected in various manners, including in a manner specific to the type of image analysis that is performed.

Figure 2B:
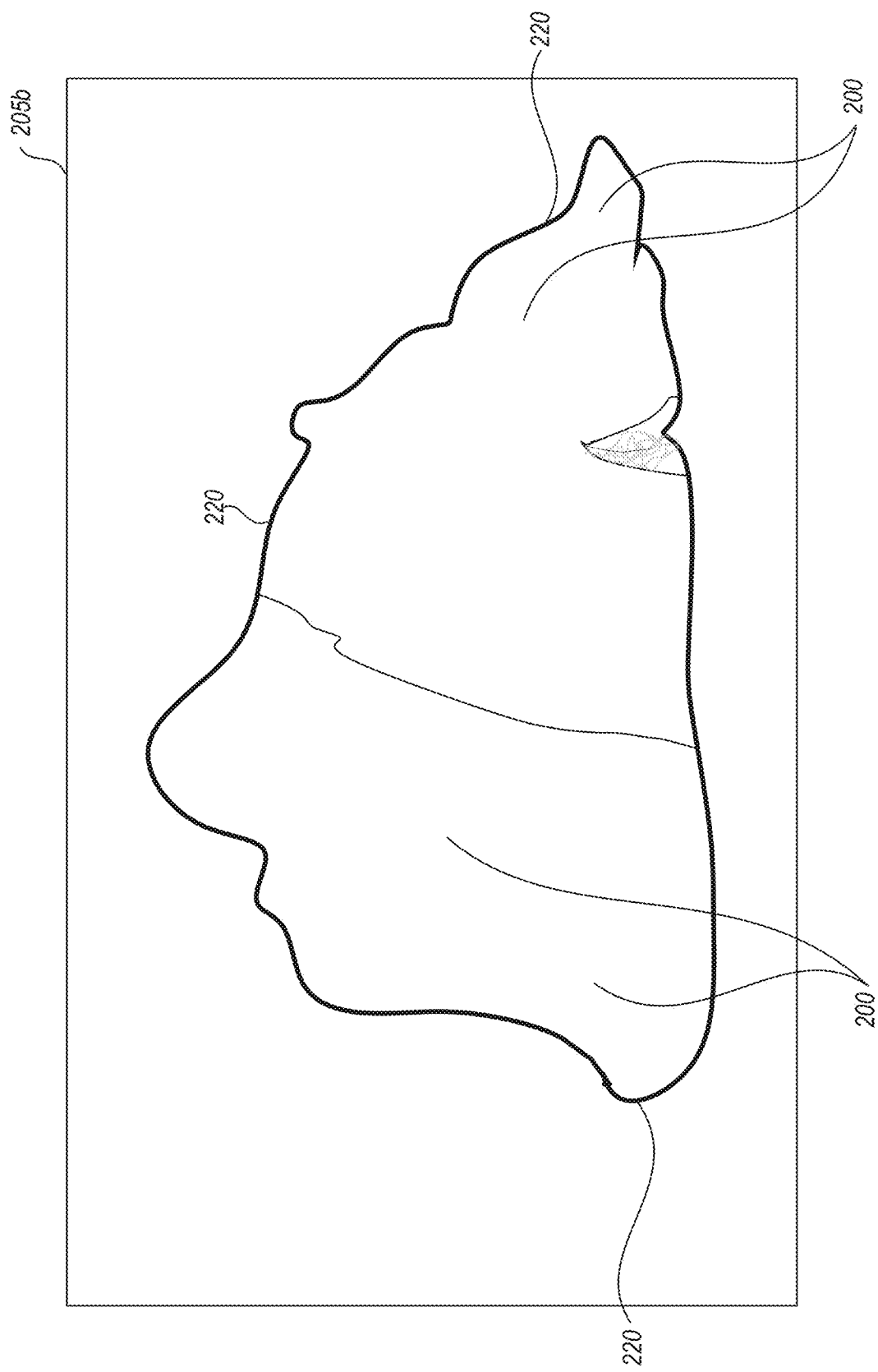

FIG. 2B continues the example of FIG. 2A, and in particular illustrates an example of an image 205b based on image 205a of FIG. 2A, but in which data for a portion of the image corresponding to the object 200 is shown, while data for other portions of the image have been removed, such as based on analysis of the image 205a. In other embodiments, such a separation of an object portion of the image from non-object portions of the image may not be performed at all, or may be performed at a time of generation of a corresponding model.

Figure 2C:
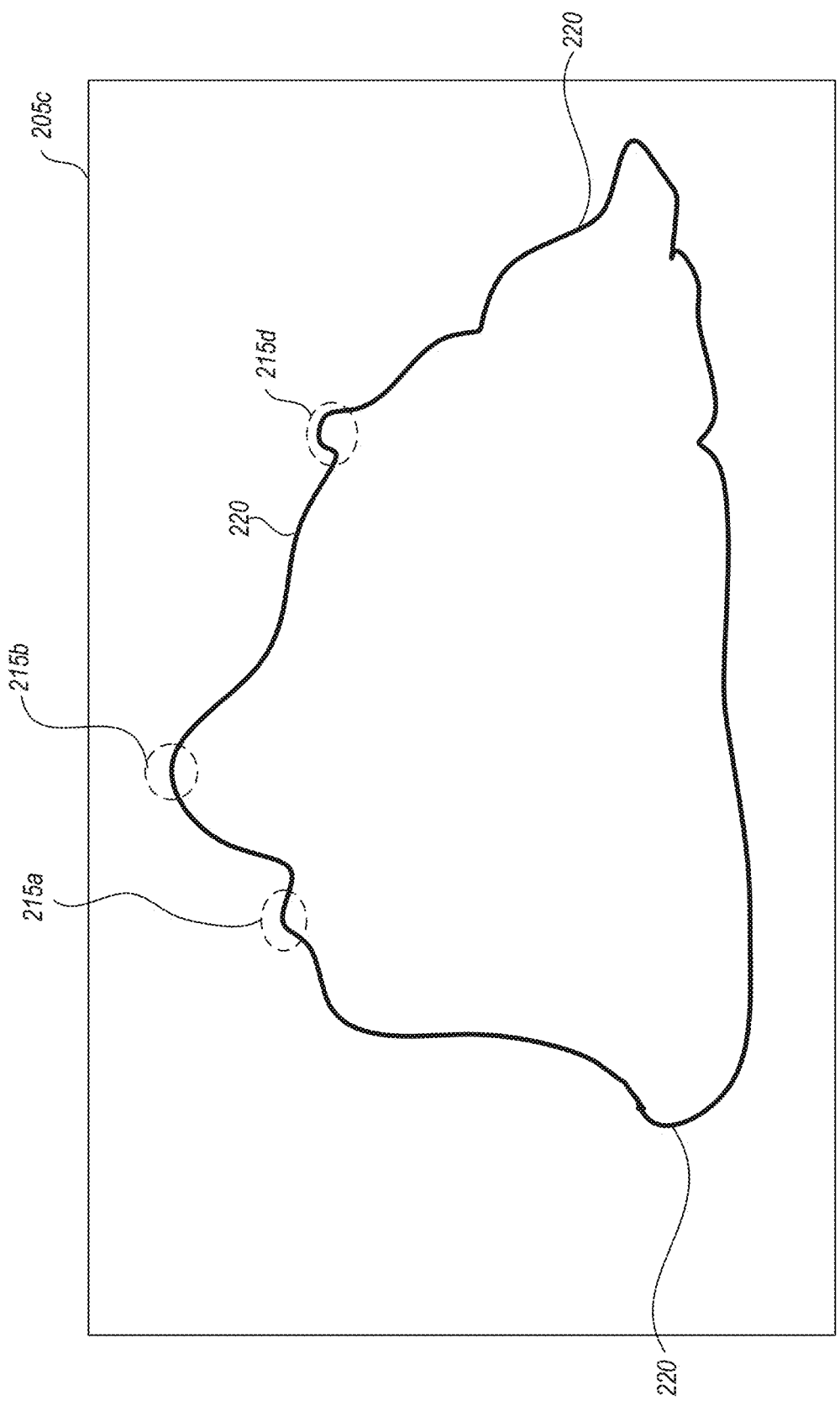

FIG. 2C continues the examples of FIGS. 2A-2B, and in this example illustrates an image 205c based on image 205a of FIG. 2A, but in which only a portion of the information about the object 200 is shown. In particular, in this example, only outline or silhouette information 220 for the object 200 is shown, such as if lighting conditions prevent other surface features from being visible, and/or based on a type of image analysis (e.g., line detection or object boundary detection) that is performed. It will be appreciated that some embodiments may not use such outline information, while other embodiments may do so. In this example, the outline information of FIG. 2C still allows some current features of the object to be identified, such as features 215a, 215b, and 215d—however, surface-related portions of the object are not visible in this example, such as ridge line 230 and features 215c and 215e.

Figure 2D:
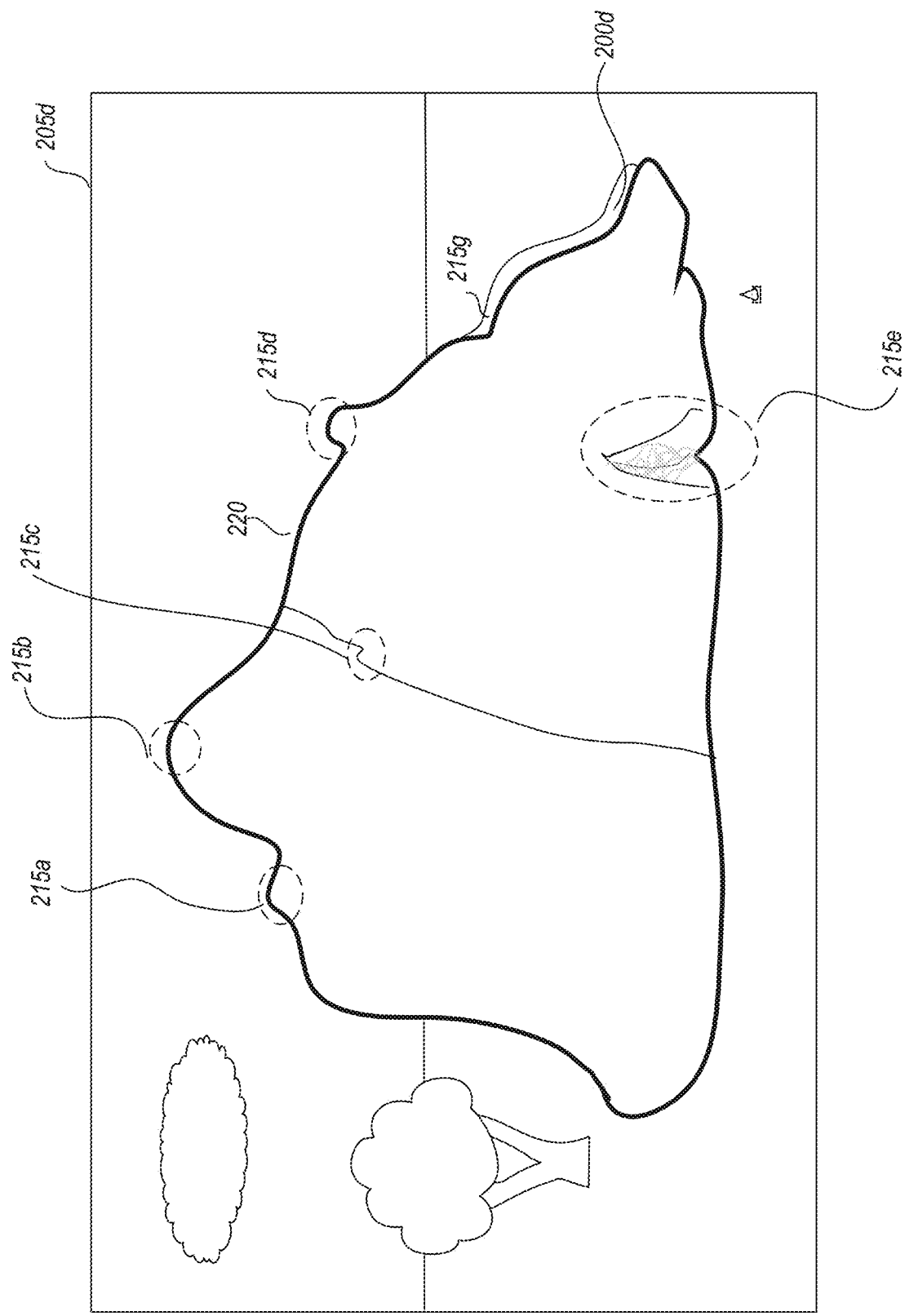

FIG. 2D continues the examples of FIGS. 2A-2C, and includes an example of a successive image 205d that may be acquired for the object 200 from a location very near that of the location at which image 205a of FIG. 2A was acquired, such as to correspond to one of the locations 125 illustrated in FIG. 1 relative to an initial starting location 120a (e.g., if image 205d is a digital image frame from a video taken by the mobile device that is near a frame corresponding to image 205a of FIG. 2A in the sequence of acquired frames). In the example of FIG. 2D, the image 205d varies only slightly as the mobile device begins to move to the right, such as to illustrate a slight additional portion 200d of the object. Accordingly, at a time of image selection for the group of images to represent the object 200, only one of images 205a and 205d may be selected, such as due to a relatively small amount of additional information available in the second of the two images relative to the first of the two images (e.g., the amount of visual overlap between the images exceeding a defined maximum visual overlap threshold or otherwise failing to satisfy one or more defined visual overlap criteria).

Figure 2E:
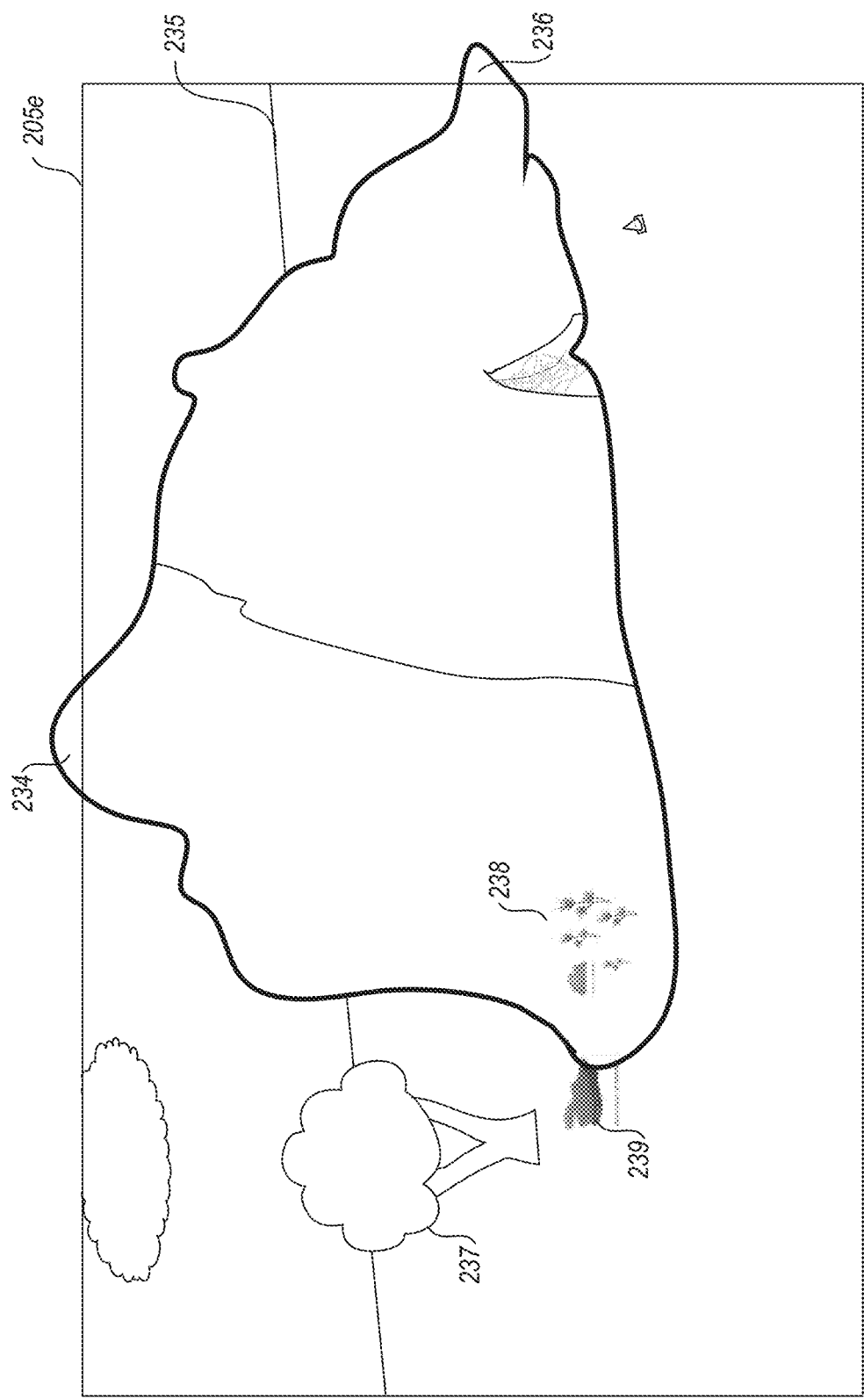

With respect to FIG. 2E, it illustrates an example of an image 205e similar to that of image 205a of FIG. 2A, but in which the image 205e has one or more quality problems, such as due to improper positioning of the mobile device when taking the image 205e, and/or due to features of the environment being imaged. In particular, as is illustrated in FIG. 2E, the image 205e is skewed or tilted (e.g., as illustrated by the horizon line 235), and one or more portions 234 and 236 of the object 200 have not been captured in the image due to improper positioning of the mobile device capturing the image. Accordingly, for such an example image 205e, if image monitoring is being performed, the quality of the image may be determined to be below a specified threshold or to otherwise not meet one or more specified quality criteria, such as with respect to degree of motion between images and/or for other reasons, and the image 205e may be discarded from further consideration (or not selected for use in the image group for the object) due to that failure. Missing portions 234 and 236 may, if not corrected and/or supplemented in other images, reduce an amount of data used to model the object (e.g., require data interpolation to estimate corresponding portions of the object, such as to estimate a flat top or more rounded top to reflect portion 234), and thus reduce a degree of completion and corresponding automated confidence value in the resulting model of the object, as discussed in greater detail elsewhere herein. In addition, FIG. 2E further provides examples of extraneous objects (in this example, a tree 237 external to the pile, vegetation 238 on the pile, and water 239 adjacent to the pile's boundary with the underlying surface) that for other images, depending on a location of the mobile device taking those images, could obstruct a portion of the pile of material and/or of the toe portion of the pile, and thus provide other quality problems that similarly reduce an amount of data used to model the object, with resulting confidence reduction in related object attributes (e.g., the object volume). Other such potential obstructions that block views of the object could include, for example, a vehicle and/or equipment (not shown) used to create or maintain the pile (e.g., a conveyor belt or crane to carry materials to upper levels of the pile), a human, an animal, etc. The puddle or other water 239 adjacent to the pile and proximate to the toe portion of the object may cause quality problems, as reflections from the water in images could make it difficult to determine the boundary of the object and underlying surface from analysis of those images, and/or the presence of the water may make it difficult to determine a location of the underlying surrounding surface from analysis of those images, such as by reflecting the object or other material. Such quality problems may reduce an amount of data used to model the toe area and/or underlying surface, and thus reduce a degree of completion and corresponding automated confidence value in a resulting model of the toe and/or underlying surface (and thus related object attributes such as the object volume), as discussed in greater detail elsewhere herein. Similarly, missing portion 236 may, if not corrected and/or supplemented in other images, reduce an amount of data used for a resulting model of the toe and/or underlying surface, and thus also reduce a degree of completion and corresponding automated confidence value for object attributes (e.g., object volume). While not illustrated in FIG. 2E, other image problems may occur from an adjacent pile (or other object) that partially overlaps with a portion of the pile of interest, and/or from a wall or other thing enclosing at least some of the object, thus causing problems for both toe and underlying surface detection and modeling, and for modeling of the pile itself. In addition, or alternatively, user feedback may be provided to a user that is carrying or operating the mobile device based on one or more such detected quality problems with image 205e (e.g., shortly after acquiring the image 205e and/or other related images), such as to indicate one or more of the problems that exist with respect to the image 205e. For example, one or more of a variety of feedback messages may be displayed or otherwise indicated to the user, such as, for example, "user motion too fast", "image contrast too low", "object not centered in image", "mobile device skewed/tilted", "obstruction(s) detected", "obscuring vegetation detected", "adjacent water detected", "overlapping adjacent object detected", etc.

Figure 2F:
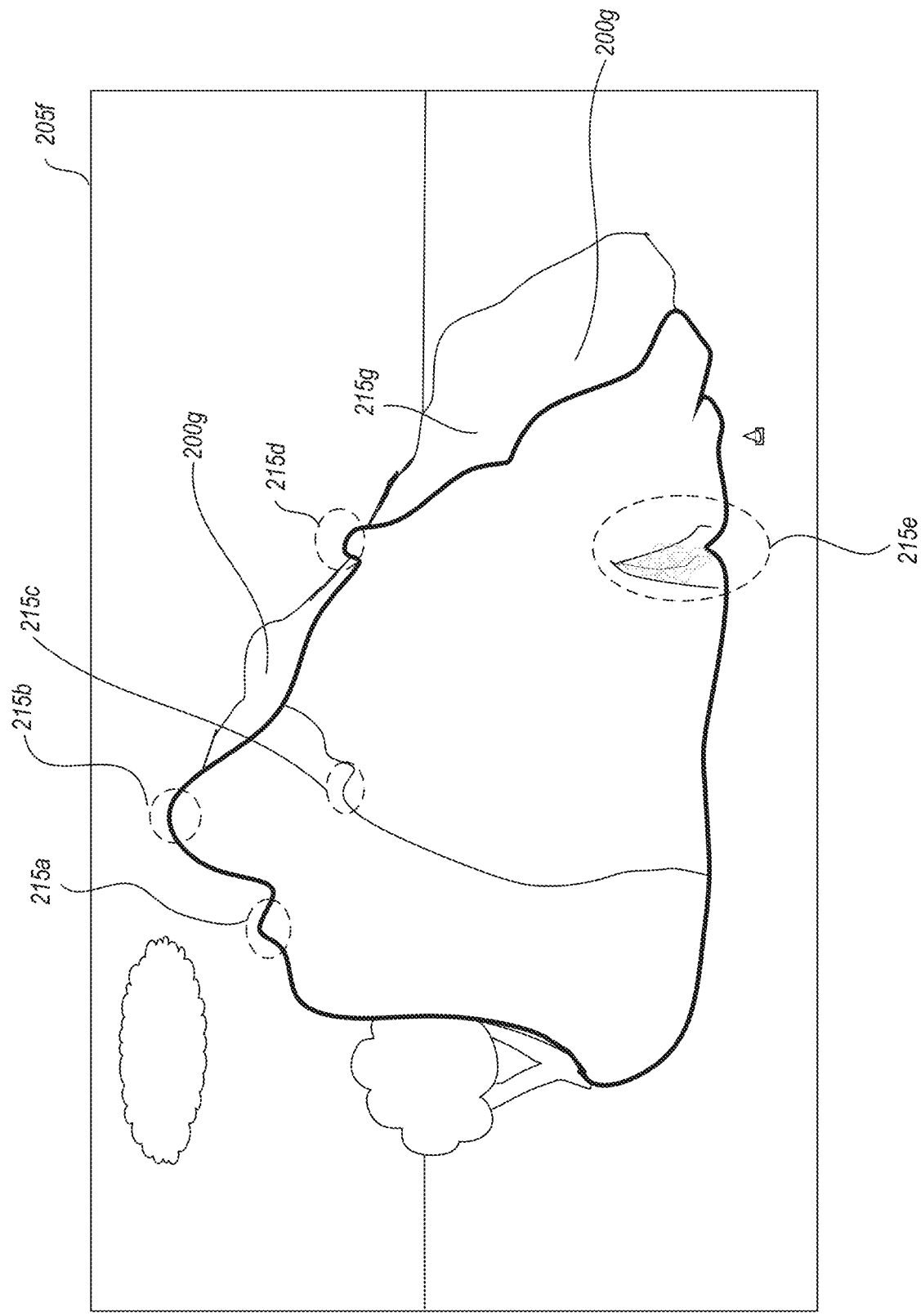

FIG. 2F continues the examples of FIGS. 2A-2E, and in particular illustrates an image 205f. In this example, the image 205f continues to correspond to object 200, but from a different viewpoint than that used for image 205a of FIG. 2A, such as from location 120b of FIG. 1. In this example, all of the features 215a-215e continue to be visible in image 205f, along with an additional portion 200g of the object 200 relative to that of image 205a, based on the change in location.

Figure 2G:
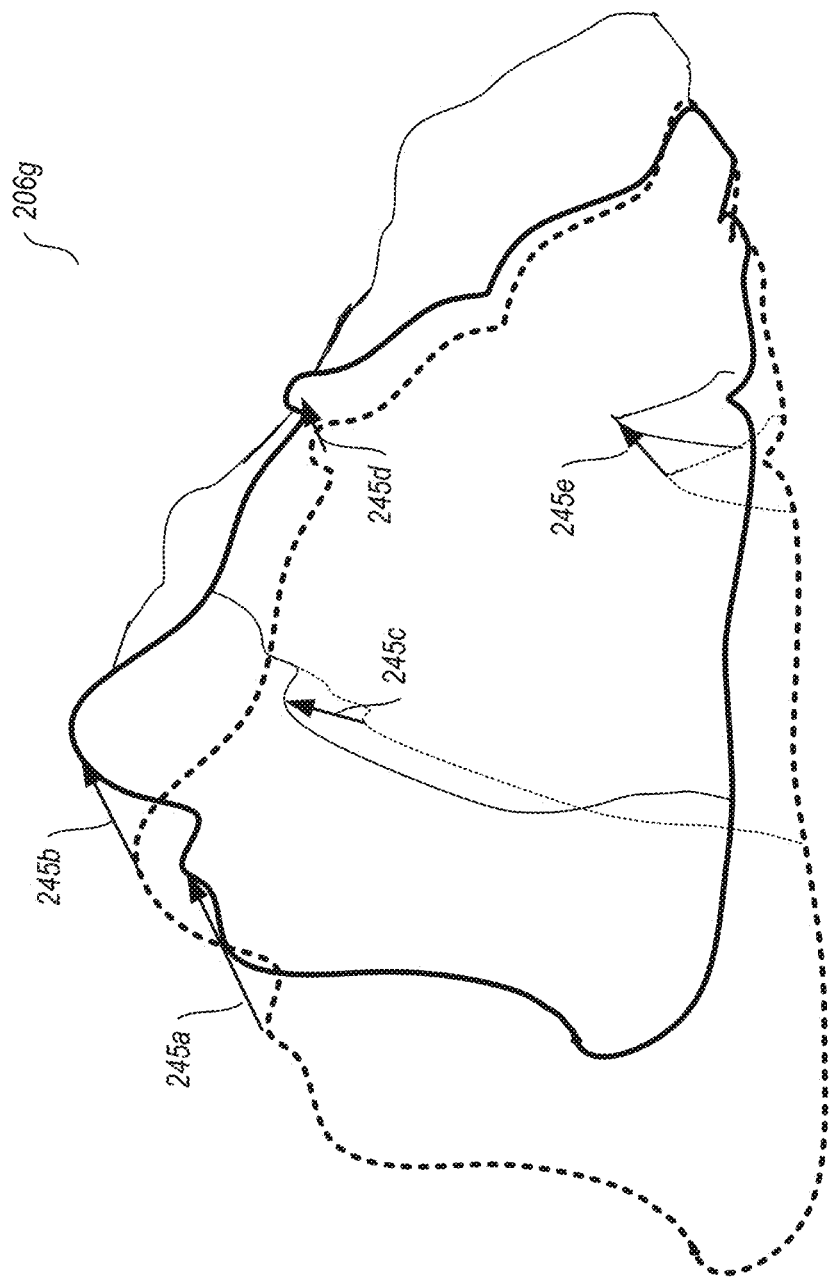

FIG. 2G continues the examples of FIGS. 2A-2F, and in particular provides a view 206g that combines portions of images 205a and 205f of FIGS. 2A and 2F, such as to illustrate relative changes between features 215a-215e from those images. In particular, outlines of the object 200 from both images are shown overlaid on each other in view 206g, with dotted lines being used for the outline from image 205a, and with solid lines being used for the outline from image 205f. In addition, arrows 245a-e have been added corresponding to portions of features 215a-215e, respectively, to show an amount of movement of those features between the two images. Such information may be used in various manners, including to determine an amount of apparent motion between the images (e.g., based on the movement of the mobile device), an amount of overlap between images and/or additional portions of the object exterior that may be available from one image to another, etc. It will be appreciated that hundreds or thousands or more features may be tracked between such images in actual use.

Figure 2H:
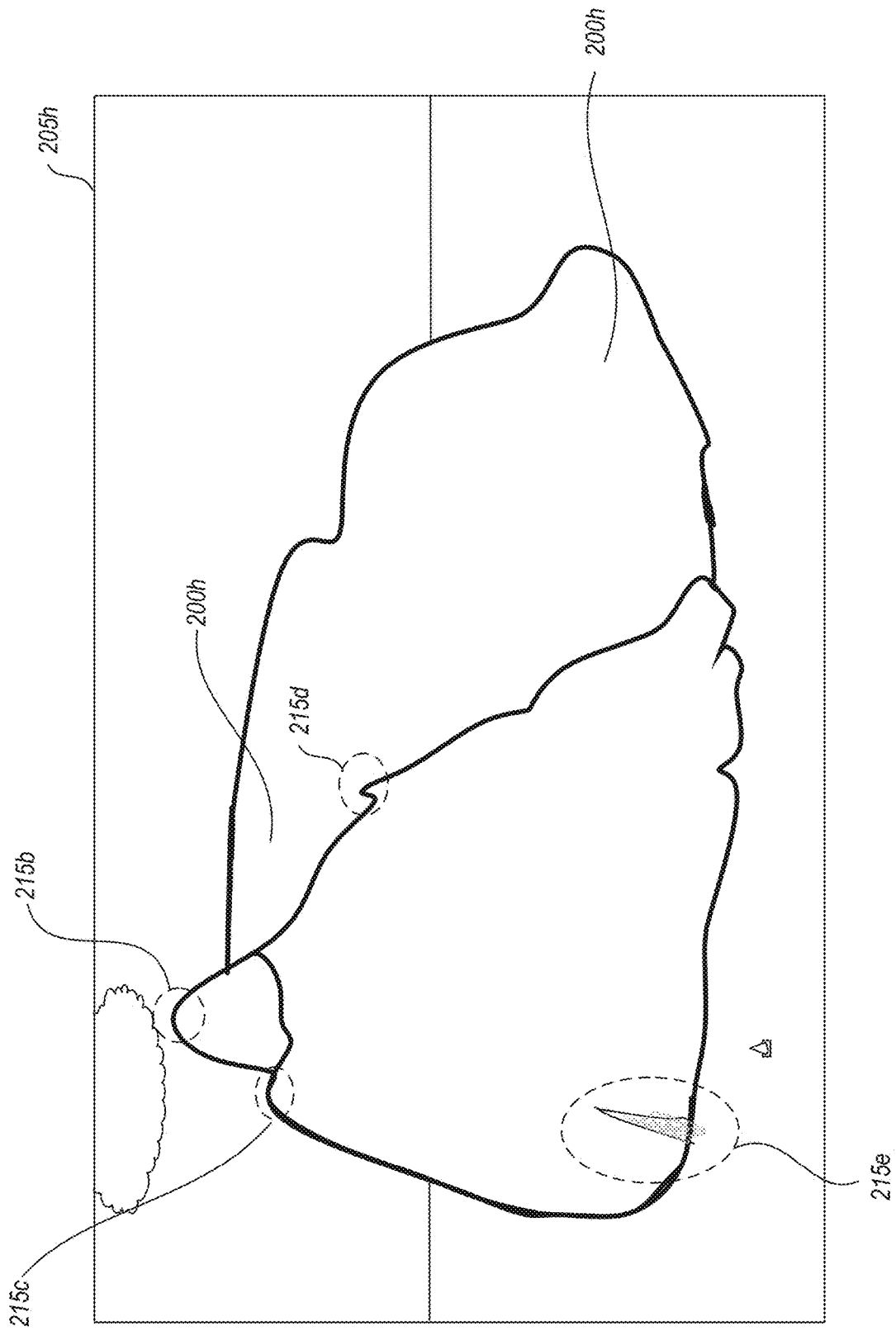

FIG. 2H continues the examples of FIGS. 2A-2G, and illustrates an example image 205h that corresponds to object 200 from an additional location, such as from location 120c of FIG. 1. In this example, it can be seen that feature 215a is no longer visible due to the change in the view, such as based on other portions of object 200 obscuring those features, and additional portions 200h of the object 200 are shown relative to that of image 205a. Accordingly, when selecting images for the group to represent the object 200, and if image 205a is selected as an initial starting image, images 205d, 205e, and 205h of FIGS. 2D, 2E, and 2H, respectively, may not be chosen as a next selected image for the group for different reasons. As previously noted, image 205e may be discarded to its quality problems, while image 205d may not be chosen due to its relative lack of additional information compared to image 205a (due to the small change in location from which the additional image is acquired). Conversely, image 205h may not be preferred as a next image in the group after image 205a due to a relative large change in location for the two images (e.g., the amount of visual overlap between the images failing to reach a defined minimum visual overlap threshold or otherwise failing to satisfy one or more defined visual overlap criteria), including to lose the ability to map features such as 215a between images 205a and 205h due to the change in location. Thus, in the examples of FIGS. 2A-2H, an image corresponding to information 205g of FIG. 2G for the updated pile position may be selected as the second image to include in the selected group to represent the object 200, after that of image 205a of FIG. 2A, and additional images may be further selected from other views 200 (e.g., to select image 205h as a next third image after the second image corresponding to information 205g), so as to include further overlapping portions that, in aggregate, include all of the exterior of the object.

More generally, in at least some embodiments, a goal of photogrammetric reconstruction is to take a set of input images that capture a scene including one or more objects of interest, and to recover the geometric and photometric (including hyperspectral information if captured in the images and/or by associated sensors) properties of the scene, as well as the geometric and intrinsic properties of the cameras associated with the input images. The outputs of such a process include, but are not limited to, the following: 3D representation of the scene's geometry and structure; texture and material properties of the scene's contents; 3D camera poses from which the images were taken; and camera and lens characteristics, with such techniques referred to at times as a 'photogrammetric reconstruction pipeline'. Given an input set of images, the first step in the reconstruction pipeline is to determine which images observe common parts of the scene. This can be accomplished through, for example, the use of 2D feature extraction, image retrieval, feature matching, and geometric verification. A goal of feature extraction is to identify distinct 2D locations (keypoints) within an image, and generate unique yet meaningful representations (numeric descriptors) of those locations' appearances in the image. These identified locations are preferably repeatable, such that if the same scene content is observed in another image, the corresponding identified 2D feature locations preferably lie on the same parts of the scene's content. Likewise, the representations of the same scene element preferably have a similar numeric value. Feature detectors to find keypoint locations may identify distinguishable locations such as image or scene corners or points of high contrast to their surroundings. Additionally, they may summarize geometric characteristics of the locally detected area, such as scale, orientation, or skew. Such feature descriptors may, for example, summarize the intensity, gradient, or color of the keypoint's local neighborhood in the image. Once features are extracted from every image, pairs of images are determined that are likely to have the same content, which is accomplished in some embodiments by generating a numeric descriptor that represents the entire image, where the descriptor is typically formed by summarizing the 2D features found in the image, so that only those image pairs with similar global representations may be considered for further overlap verification. Given candidate pairs of images with potential image overlap, the next step in the reconstruction pipeline is to find associations between the 2D features within the images, such as by computing the distance between the 2D feature descriptors' numeric representations, and selecting those pairs of descriptors from opposite images that have sufficiently high similarity, although additional match criteria may be employed in some embodiments to help refine the set of matched features. It will be appreciated that the selection of various images may be performed in various manners and using various techniques, as discussed in greater detail elsewhere.

Figure 2I:
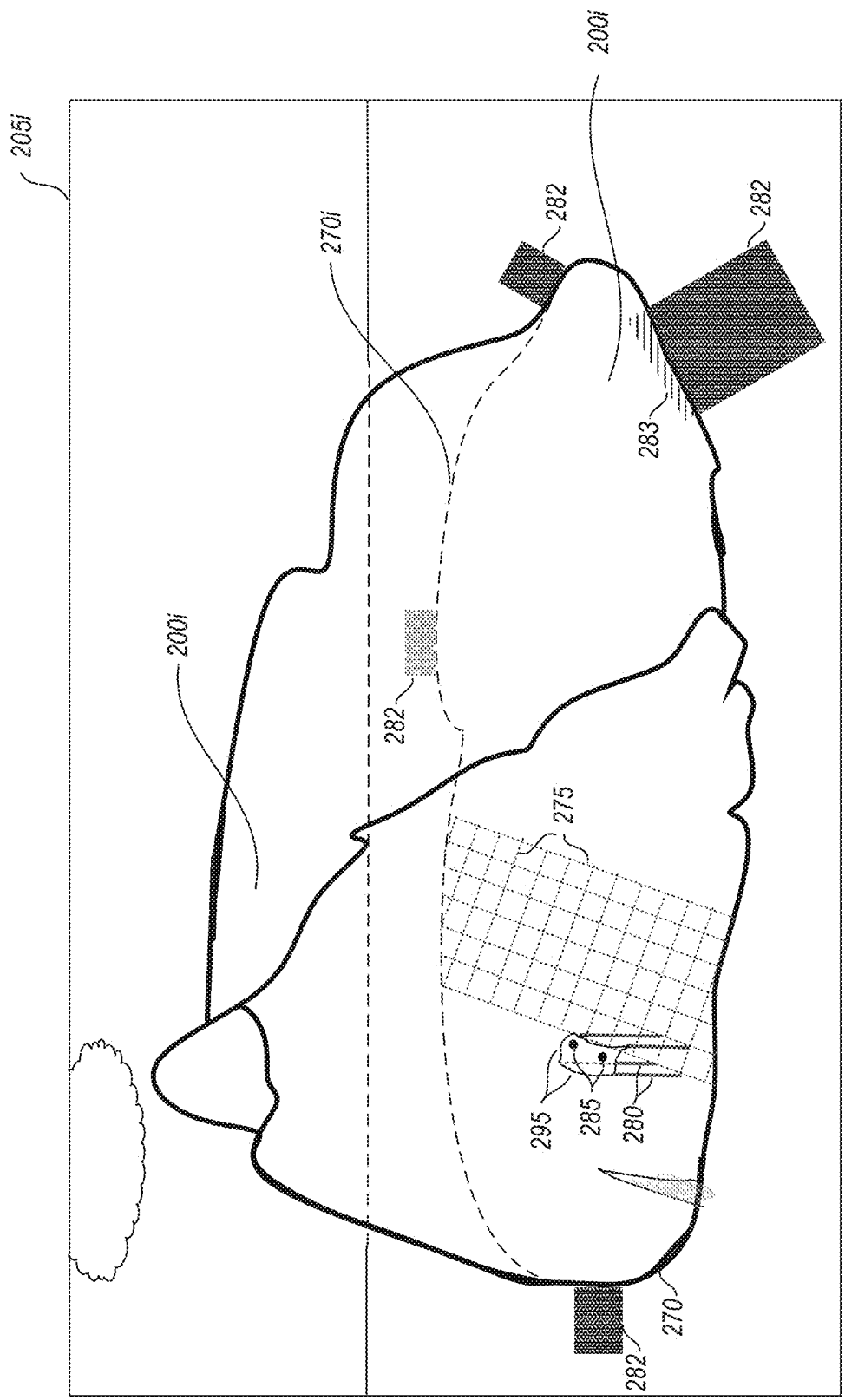
Figure 2J:
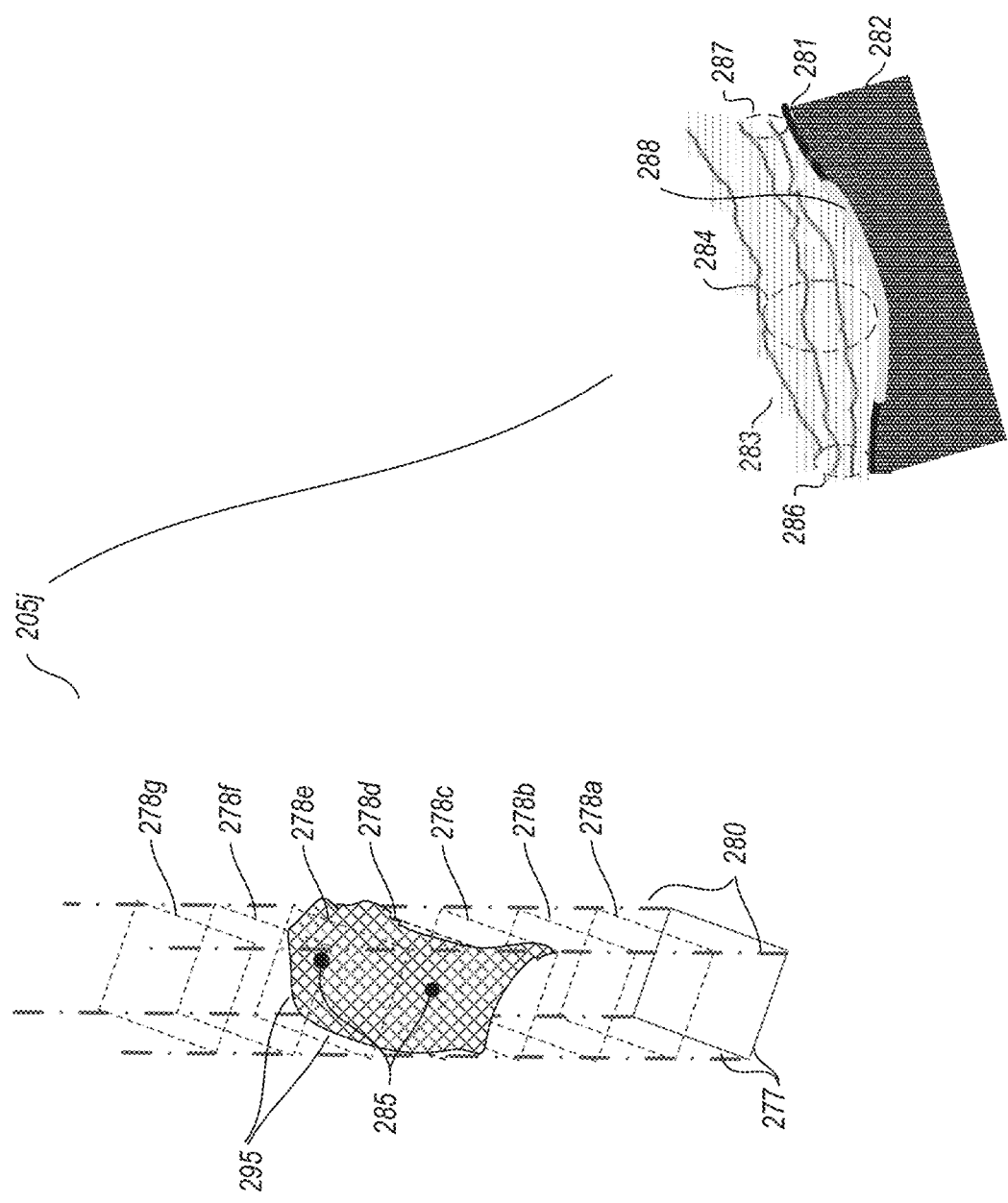

FIGS. 2I-2J continue the examples of FIGS. 2A-2H, and illustrate some techniques for performing verification activities of a generated computer model of an object. In particular, FIG. 2I continues the examples of FIGS. 2A-2H, and illustrates an example image 205i that is similar to image 205h of FIG. 2H, but in which various additional information is illustrated with respect to performing automated verification activities for the computer model(s) of the object and object attribute values resulting from the computer model(s). In particular, for the sake of discussion with respect to FIG. 2I, the representation 200i of the stockpile object 200 being modeled represents a rendered surface of a computer model generated from the image data acquired in FIGS. 2A-2H and optionally additional images (not shown) from other vantage points around the exterior of the object, and additional information 275-295 is added in FIG. 2I for the purpose of explaining some of the automated verification activities that may be performed.

As one example of automated verification activities illustrated with respect to FIG. 2I, automated operations may be performed to determine the confidence in a boundary of the modeled object and the underlying surface. In particular, and as discussed in greater detail elsewhere herein, various data points 282 may be acquired from portions of the surface area external to the object (with only partial limited sets of data 282 being shown in FIG. 2I for the sake of illustration), and may be used to generate an initial estimate of a base surface on which the object is situated. With respect to an initial estimate of a boundary or edge 270 of the object (with a non-visible portion 270i being illustrated with respect to the backside of the modeled object relative to the current view location), a lower toe portion 283 of the object above that boundary may be identified (shown in this example for only a small part of the object for the sake of illustration), and additional automated operations may be performed to refine the edge location and/or identify whether the toe portion of the object is likely to be accurately represented, such as based at least in part on one or more slope values and/or based at least in part on completeness of visual data for the toe (as discussed in greater detail elsewhere herein). FIG. 2J further illustrates additional example details related to such automated boundary verification activities. Furthermore, in some embodiments and situations, user-supplied information may assist in determining at least some of the boundary or edge 270, such as by a user after images have been acquired (e.g., based on manual input on images displayed via a GUI) and/or as part of the image acquisition process (e.g., by a user directing the image acquisition so that the boundary or edge 270 is at a specified location, such as at the bottom of the acquired images).

As another example of automated verification activities illustrated with respect to FIG. 2I, automated operations may be performed to determine the confidence in data coverage of the modeled object, such as with respect to its surface area and/or volume. In particular, and as discussed in greater detail elsewhere herein, a 2D grid 275 of cells may be generated under the surface of the modeled object (shown in this example for only a small part of the object for the sake of illustration), and a subset 295 of the modeled 3D surface of the object above a particular cell may be examined to determine a quantity and/or density of 3D data points 285 that are located in that surface subset 295, although other techniques for representing acquired data and/or data coverage may instead be used in other embodiments. After such operations are performed for each cell, the percentage (or other amount) of cells that are sufficiently supported by image-acquired data may be used as part of determining confidence in resulting surface area and/or volume values for the modeled object. FIG. 2J illustrates additional example details related to such automated data coverage verification activities.

FIG. 2J continues the example of FIG. 2I, and illustrates example information 205j that is similar to portions of information 275-295 of FIG. 2H, but in which various additional information is illustrated with respect to performing automated verification activities for the computer model(s) of the object and object attribute values resulting from the computer model(s). In particular, in a manner similar to information 282 and 283 on the lower right side of the object representation of FIG. 2I, related information 282 and 283 is illustrated in FIG. 2J along with additional information 281, 284 and 286-288. The information 282 of FIG. 2J represents a portion of an underlying surface outside a boundary 281 of a modeled object, and the information 283 of FIG. 2J represents a toe portion of the modeled object. In this example, contour lines have been added to the toe portion to provide a visual indication of slope, such that automated assessment and possible refinement of the object boundary may, depending on an amount of slope in an area 284 of lower slope in the search ring (relative to other areas 286 and 287 with higher slope), determine to exclude some or all of the lower-slope area 284 from the modeled object, and move the initial object boundary accordingly, although a revised object boundary is not illustrated in this example. While contour lines are not similarly illustrated for the underlying surface 282 in this example, the slope of that underlying surface may similarly be evaluated. If particular portions of the toe have a slope that is too low (e.g., relative to a slope, if any, of the overall underlying surface; below a defined minimum slope threshold; etc.), uncertainty may exist regarding whether those toe portions are actually part of the object, while a sufficiently high slope for other portions of the toe (e.g., at or above a defined minimum slope threshold) may increase confidence that those toe portions are correctly identified as being part of the object, although a slope that is determined to be too high for portions of the toe (e.g., above a defined maximum slope threshold) may indicate a dangerous overhang area. While particular low-slope and/or high-slope portions of the toe portion are not identified, a subset 288 of the object boundary has been identified as being a portion with associated toe surface that is either sufficiently high to affirm that boundary portion (e.g., as being a "good" boundary) or sufficiently low to disaffirm that boundary portion (e.g., as being a "bad" boundary). When performed for all portions of the modeled object's boundary, a corresponding percentage or other amount of the boundary that is affirmed (or is not affirmed) may be calculated, and used to determine verification (or lack thereof) of the modeled object's boundary and resulting object attribute values, such as by determining whether that percentage or other amount satisfies one or more corresponding boundary accuracy thresholds.

In addition, and in a manner similar to the information 275, 280, 285 and 295 of FIG. 2I, related information 280, 285 and 295 is illustrated in FIG. 2J along with additional information 277 and 278*a*-278*g*. In particular, the cell 277 of FIG. 2J represents a particular cell in the grid 275 of FIG. 2I, the area 295 continues to represent a portion of the modeled 3D surface of the object above that cell 277, and the 3D data points 285 continue to represent image-acquired visual data that provides coverage of that surface portion 295. In this example, the column above the 2D cell 277 has further been separated into multiple 3D cells, with the indicators 278*a*-278*g* showing the upper boundary of each successive 3D cell in the column from bottom to top. In this example, the surface portion 295 extends through two of the 3D cells with upper boundaries 278*d* and 278*e*, and with the three 3D cells with upper boundaries 278*a*-278*c* being fully below the surface portion 295. The 3D cells of FIG. 2J may be used in some embodiments as part of determining a confidence in sufficient data coverage for a volume value for the object. For example, if the data points 285 are determined to be sufficient data coverage for the surface portion 295 (e.g., have a sufficient density), the corresponding volumes of at least the three 3D cells with upper boundaries 278*a*-278*c* may be affirmed as being sufficiently verified, and optionally some or all of the two enclosing 3D cells with upper boundaries 278*d* and 278*e* may similarly be marked—alternatively, if the data points 285 are determined to not be sufficient data coverage for the surface portion 295, the corresponding volumes of those 3D cells may be disaffirmed as not being sufficiently verified. When performed for all 3D cells under the modeled object's surface, a corresponding percentage or other amount of the volume that is affirmed (or is not affirmed) may be calculated, and used to determine verification (or lack thereof) of the modeled object's volume value, such as by determining whether that percentage or other amount satisfies one or more corresponding surface coverage thresholds. As discussed in greater detail elsewhere herein, other embodiments may determine sufficient data coverage for such 3D cells in other manners, including based on an individualized probability that is determined for each cell of it being sufficiently covered by the image-acquired data.

As noted above, once a set of images to represent a pile or other object (e.g., a structure) are selected, they may be analyzed to generate a 3D model of the object, such as a 3D point cloud, and such techniques may further be used to model multiple piles or other objects at a common site. In some (but not all) embodiments, an automated above-ground object extraction method (e.g., for stockpile extraction) starts with a 3D point cloud of a surveyed site (e.g., a bulk materials site for stockpiles), and proceeds as follows. An automatic classifier is used to label points as either object (example described here is a pile), near ground (ground close to object) or far ground (ground farther away from the object). After classifying points, the labeled points are placed in a grid, and each grid cell is analyzed with respect to a threshold according to its likelihood of being a near, far or in-between ground point. Points that are more than likely ground and form large contiguous areas are candidate ground areas. A region-growing operation (e.g., a flood fill operation) is used to filter out ground points that are mislabeled (e.g., on the tops of buildings or other tall, flat objects). Finally, ground points that are within the filled, contiguous ground areas and have probability of being ground greater than a threshold are selected. Although a grid is used to accumulate probability information from multiple points in a given location in this example, other approaches are possible, such as continuous spatial probability representations, extremely fine grids where each point contributes probability in its local neighborhood and with the contribution of a given point falling off the farther the grid cell is from the point, etc. A multi-resolution, nonlinear optimization is then used to fit a (gridded) point surface to the filtered ground points, although other techniques may be used in other embodiments, such as a parametric surface fit to the points. The ground surface finding approach used in this example extracts the ground surface from the (labeled) point cloud, using constraints for the optimization that encourage the surface to be close to the filtered ground points in height, smoothly vary and to be below the point cloud (it will be appreciated that in the absence of a constraint to be below the point cloud, fitting a surface to the ground points may allow the surface to pass through and over the point cloud in areas with large terrain height variation). The (multi-resolution) surface fitting used in this example first fits a surface with a larger point spacing to the points and then does a second fine-grained surface fit, with the low resolution surface fit allowing the method to quickly converge to the gross shape of the site at a low computational cost, and the final, high resolution fit filling in the details. In other embodiments, a single step may instead be used, with a high grid resolution fit that is typically computationally expensive because the propagation of the height corrections between distant points takes more iterations of the solver than performing it hierarchically. Points may be present in the surface around the boundary of the site, which are constrained by smoothness in the optimization—such points are used in the next phase to cause the pile surface to meet the ground outside of the reconstructed area, ensuring that no volume is added by the difference in the surfaces outside of the reconstructed area. Now that a ground surface exists, the pile surface is calculated. Taking the difference of these two surfaces provides the pile height. The same (multi-resolution) non-linear optimization is used in this example to fit the pile surface as the ground surface, with the boundary points from the ground surface being added here as constraints to the pile surface. These point constraints at the border penalize the pile surface deviating in height both above and below the ground surface points and cause the two surfaces to have the same height outside the reconstructed area. Alternatively, when calculating statistics about the extracted piles, one could mask out any points outside the reconstructed area to achieve a similar purpose. It is preferable to ensure that only 3D points within the reconstructed point cloud are used in visualization, generating summary statistics such as volume, etc. The final stage in stockpile extraction is to subtract the pile and ground surfaces to get an above bare earth height map of the site, with all of the connected components higher than a threshold level being found, and a watershed algorithm then used to extend these connected components down until they either run into each other or would grow into a region lower than a minimum height threshold. A final classification is performed based on pile boundary shape and color to exclude non-pile components, as certain parts of a site might not be used to store stockpiles. For example, a company may have a policy to never store stockpiles pushed up against safety berms or high walls, and if so, a geo-referenced storage area mask may be used along with geo-referencing data in the point cloud to exclude contours that could not be piles. In cases in which two materials are stored together in a stockpile that runs together, the piles may be separated in various manners (e.g., based at least in part on feedback or instructions from a human operator regarding how to separate out the piles) or instead treated as a single combined pile. Another possibility is to use a machine learning method, e.g. classifier, leveraging texture from the original images and the camera poses found in object from motion to separate out these piles—this would involve training a classifier to find separate piles in the images and then back projecting those pile outlines onto the 3D point cloud. Additionally, if prior data about the site is available (such as a bare earth model, geo-referenced material mask, geo-registered labeled point cloud, etc.), it may be incorporated into the final ground/pile/other classification. More specifically, once a site has been labeled, future image collections of that site can be aligned into the same coordinate system of this dataset (as discussed elsewhere herein), and then benefit from that initial labeling when attempting to determine the point classification of those future image collections.

FIGS. 2K-2P continue the examples of FIGS. 2A-2J, and illustrate additional techniques for generating and verifying a computer model of an object and resulting object attribute value determinations, based on analyzing visual data in acquired images from one or more image acquisition devices in combination with analyzing associated motion data for the image acquisition device(s) and/or other associated image acquisition metadata.

Figure 2K:
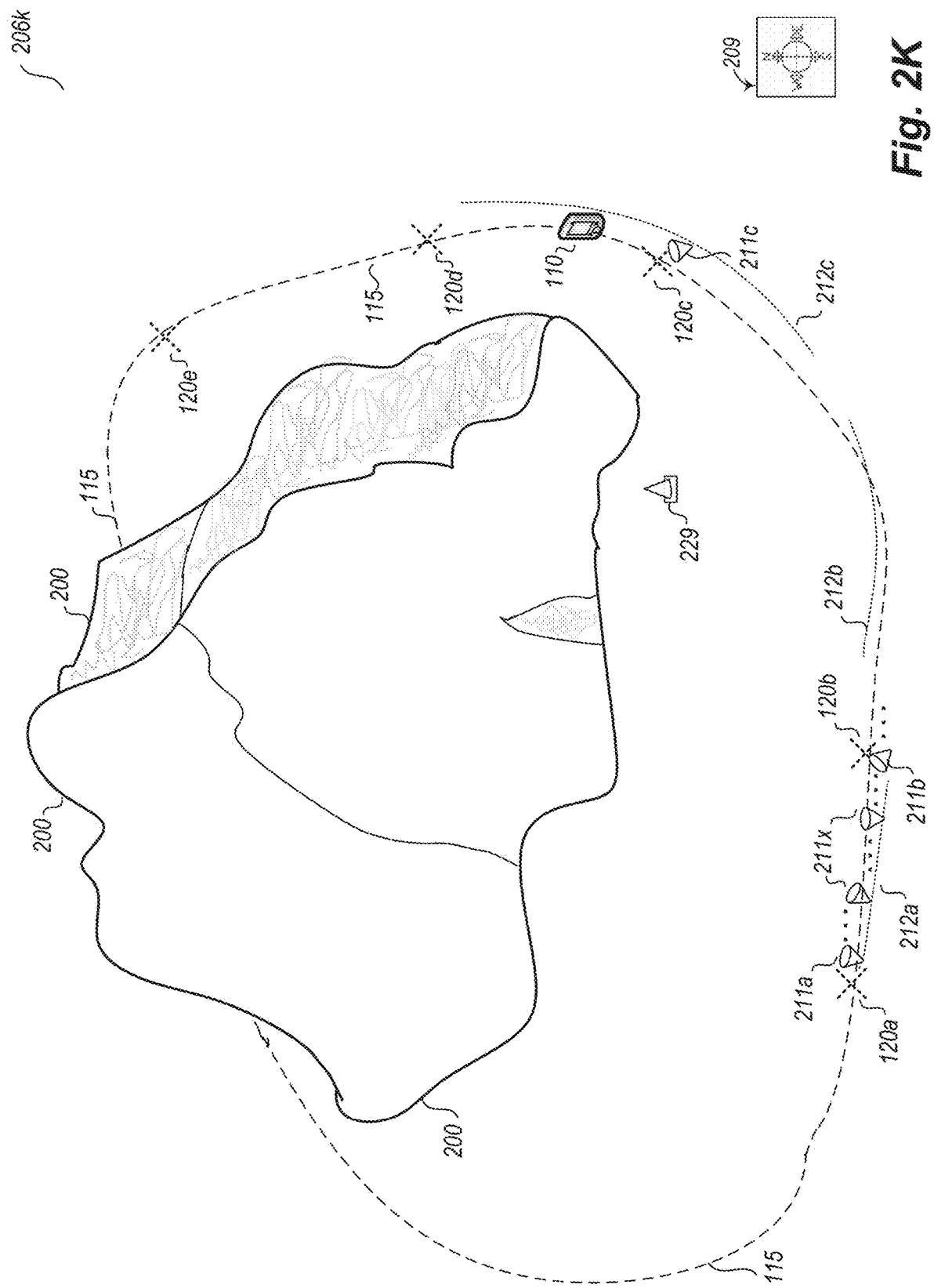

In particular, with respect to FIG. 2K, information 206k is illustrated to show additional details about an image acquisition session for acquiring images and associated image acquisition metadata for the object 200 (in this example, the stockpile object 150 of FIG. 1). In this example, a user or other automated device (not shown) begins the image acquisition session at location 120a, and moves in an eastward (or counterclockwise) direction around the exterior of the object 200 along path 115 (in a manner similar to that of FIG. 1) while transporting a mobile computing device 110 that is acquiring images and associated image acquisition metadata during the image acquisition session, and with an example geographical indicator 209 added for reference purposes. In this example, as the mobile computing device 110 moves along the path 115, it acquires images of the object 200 at various locations (and of other objects in the surrounding environment, such as traffic cone 229), and further acquires image acquisition metadata that includes motion data of the mobile computing device 110. The acquired image acquisition metadata may include data from one or more IMU sensors (not shown) on the mobile computing device 110, which may be analyzed in a real-time or near-real-time manner to generate acquisition pose data 211 for the mobile computing device, such as pose data 211a corresponding to the image acquired at location 120a, pose data 211b corresponding to another image acquired at location 120b, pose data 211c corresponding to another image acquired at location 120c, etc., and with various other pose data 211x corresponding to additional locations along the path 115 to reflect the pose of the mobile computing device at those locations—it will be appreciated that tens or hundreds or thousands of images may be acquired between starting location 120a and intermediate location 120c in actual usage, which is simplified in this example for the sake of clarity. In addition, the mobile computing device 110 has completed only a portion of the image acquisition session in this example, and in particular has completed approximately one fourth of the session, with the mobile computing device being currently located on the east side of the object 200 after moving past image acquisition location 120c and not yet reaching acquisition locations 120d or 120e.

As discussed in greater detail elsewhere herein, some or all of the IMDOEM system may be executing on the mobile computing device 110 and analyzing the acquired images and/or acquired associated image acquisition metadata during the image acquisition session (e.g., concurrently with the acquisition, such as in a real-time or near-real-time manner), including determining information for use in generating a partial computer model of the object 200 based on the portion of the image acquisition session that has occurred so far—such determined information may include the estimated acquisition pose information 211 and additional related metadata based at least in part on that acquisition pose information. In particular, FIG. 2K further illustrates initial trajectory information 212 that is determined based at least in part on the estimated acquisition pose information 211. In this example, the initial trajectory information 212 is separated into three separate sequences of estimated pose data points 212a, 212b and 212c due to trajectory discontinuities, such as with those estimated pose data point sequences being separated by one or more estimated pose data points that are excluded from use with the initial trajectory information due to not satisfying one or more defined trajectory criteria. For example, a visual inspection of the estimated pose data point 211b indicates that it differs significantly from the previous illustrated estimated pose data 211x and does not appear to actually point at the object 200, and thus may be one example of estimated pose data that is excluded from use with the initial trajectory information. In addition, it will be appreciated that the initial trajectory information 212 may differ in various manners from the actual traversal path 115, such as for sequence 212a to increasingly diverge from the actual traversal path 115 and for sequence 212c to consistently differ in location from the actual traversal path 115, including to reflect problems such as long-term drift, temporary instabilities, etc.

Figure 2L:
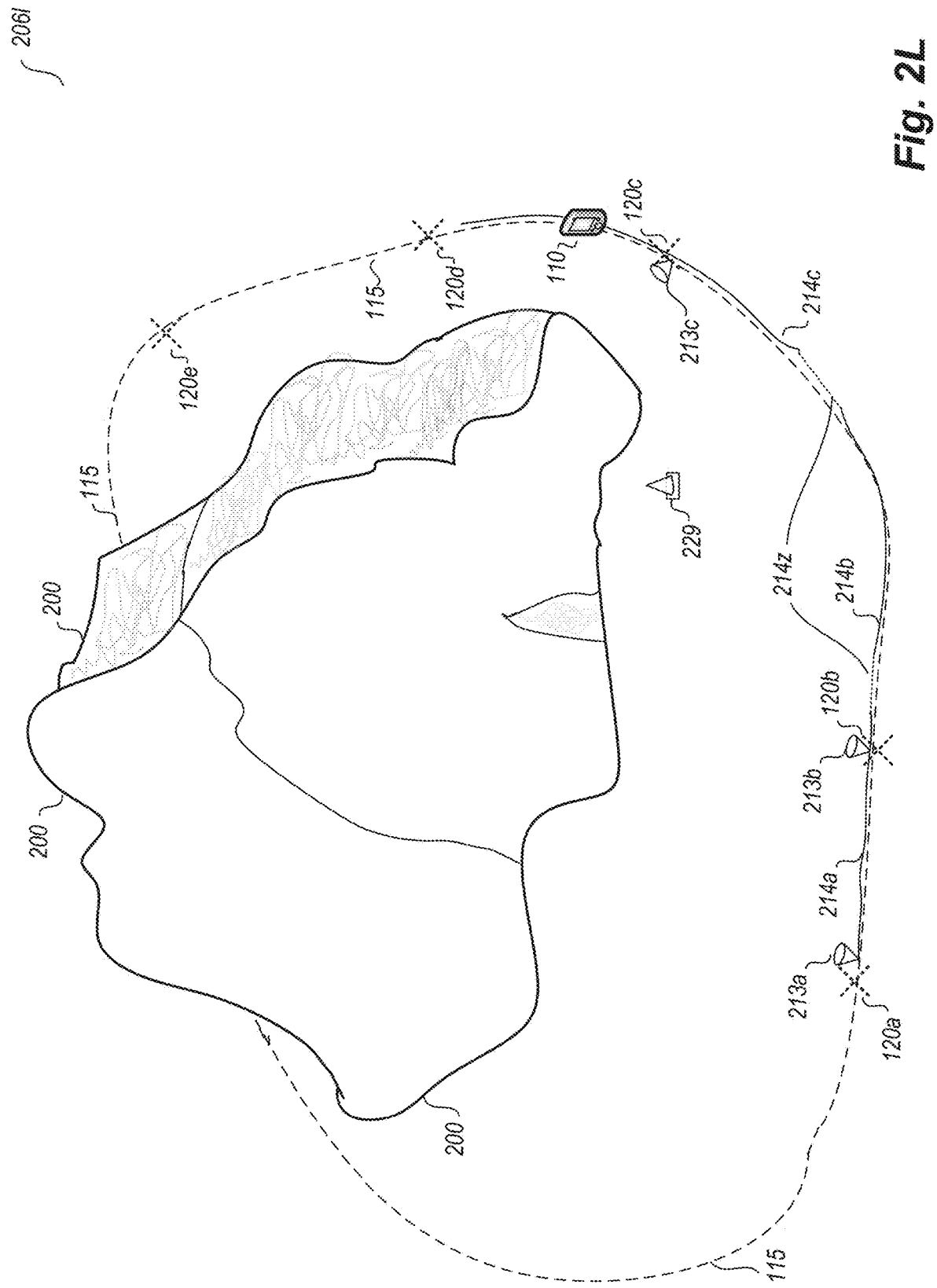

FIG. 2L continues the example of FIG. 2K, including to illustrate information 206l that includes updated trajectory information 214 to better match the actual traversal path 115, including sequences 214a, 214b and 214c that correspond to updated versions of sequences 212a, 212b and 212c of FIG. 2K, as well as to connect the sequences 214a, 214b and 214c in this example with connecting traversal information 214z. In particular, and as discussed in greater detail elsewhere herein, the determination of the updated trajectory information 214 may include selecting a group of some or all of the images acquired so far to represent visual data for the object 200, analyzing the images of the group to align the visual data, and using the aligned visual data to generate corrected acquisition pose information 213 that is used to produce the updated trajectory information 214. As one example, updated pose data point 213b for image acquisition location 120b has now been corrected to point at the object 200, and updated pose data point 213c has now been corrected so that its location better corresponds to that of the image acquisition location 120c.

Figure 2M:
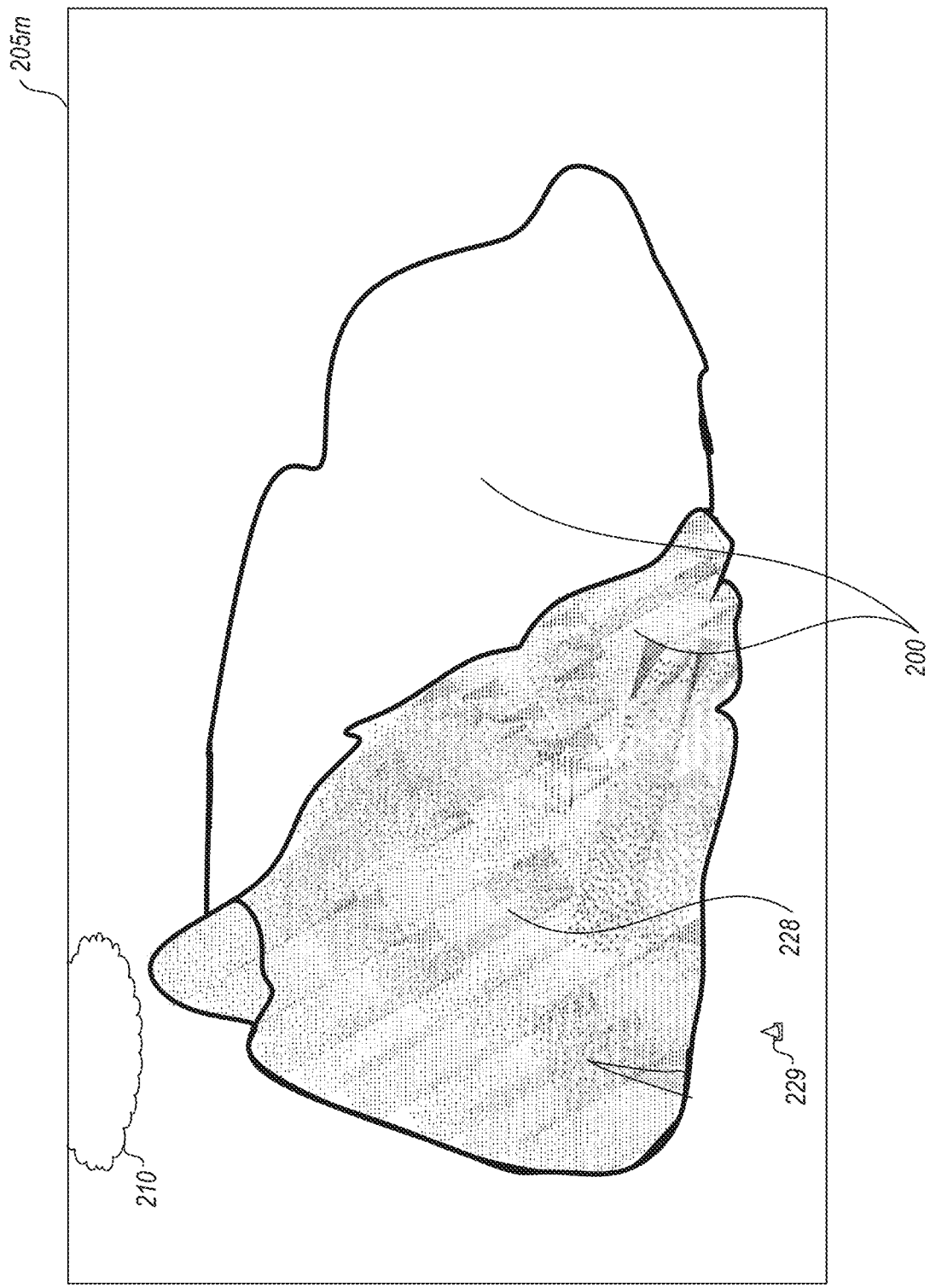

FIG. 2M continues the examples of FIGS. 2K-2L, and illustrates an image 205m of the object 200 from approximately image acquisition location 120c. In this example, the IMDOEM system executing on the mobile computing device 110 uses the updated trajectory information of FIG. 2L and other acquired visual data and associated image acquisition metadata to determine a partial 3D point cloud for the surface of the object 200, and in particular for the portions of the object 200 surface that are visible in the images acquired between image acquisition locations 120a and 120c, with that partial 3D point cloud 228 being illustrated in FIG. 2M on corresponding portions of the object 200 that are visible from the image acquisition location 120c. Additional object 229 continues to be visible in the image 205m, as does cloud 210.

Figure 2N:
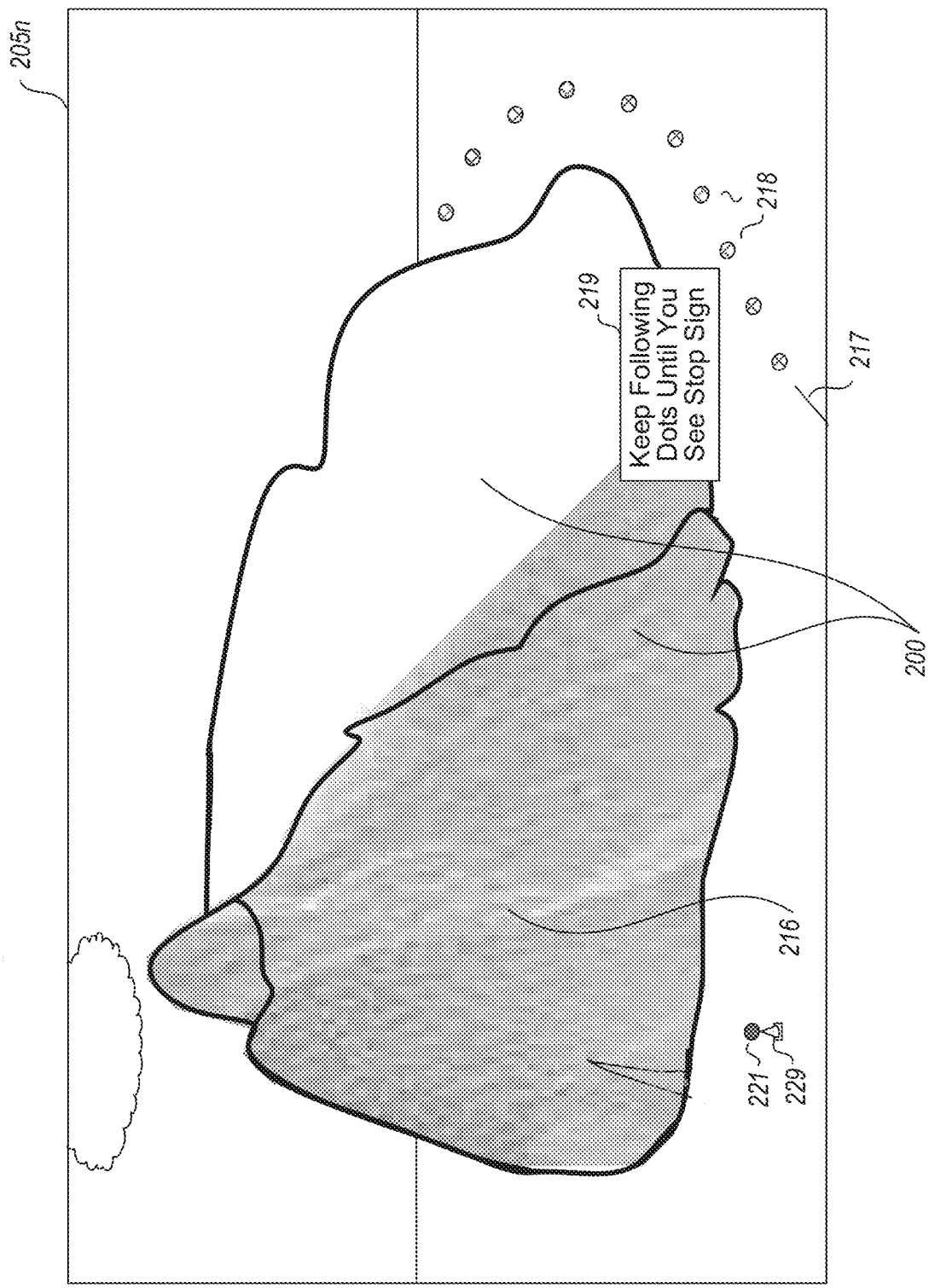

FIG. 2N continues the examples of FIGS. 2K-2M, and illustrates an image 205n that may be displayed to a user operating the mobile computing device 110 (e.g., an IMDOEM system operator user) during the image acquisition session as part of a corresponding GUI, such as while the user is at or near the image acquisition location 120c. In this example, the 3D point cloud information illustrated in FIG. 2M has been used to further generate a partial 3D surface 216 for portions of the object 200 that are visible in the images acquired between image acquisition locations 120a and 120c, with that partial 3D surface being overlaid on corresponding visible portions of the object 200 in the image 205n using augmented reality techniques. In addition, further information has been selected and added to the current image of the object 200 in this example GUI, including a visual indicator 221 that is placed over the top of the traffic cone 229 (e.g., to visually indicate that the traffic cone has been identified in the visual data, and that the position of the traffic cone has been correctly determined), visual information 217 to show a portion of the traversal path 115 that has already been completed and is visible in the image, visual indicators 218 to instruct the user of a further traversal path to take during the current image acquisition session, textual information 219 to provide further instructions to the user regarding performing additional parts of the image acquisition session, etc. It will be appreciated that a variety of other types of information may be displayed in other manners in other embodiments.

FIG. 2O (referred to herein as "2-O" for the sake of clarity) continues the examples of FIGS. 2K-2N, and illustrates an image 205o that may be displayed as part of an example GUI to present a final completed 3D computer model of the object 200, such as to an end user at a different location from that of the object 200. In particular, in this example, the end-user is at a location with a view of a mostly empty parking lot, and a visual representation of the 3D computer model of the object is overlaid on a portion of the parking lot in the current image 205o, such as to reflect an actual size of the object on a corresponding area of the parking lot. In this example, additional information has been selected and added to the current image of the parking lot using a virtual sign 222 that is overlaid on the current image and on a portion of the displayed overlaid computer model, with the virtual sign in this example including information about the location and identity of the object, a type of material of the object, a date of the image acquisition session used to generate the computer model of the object, attribute information to show the determined volume and/or weight of the object, information to show a change in volume or weight of the object relative to previous modeling of the object, etc. It will be appreciated that a variety of other types of information may be displayed in other manners in other embodiments.

Figure 2P:
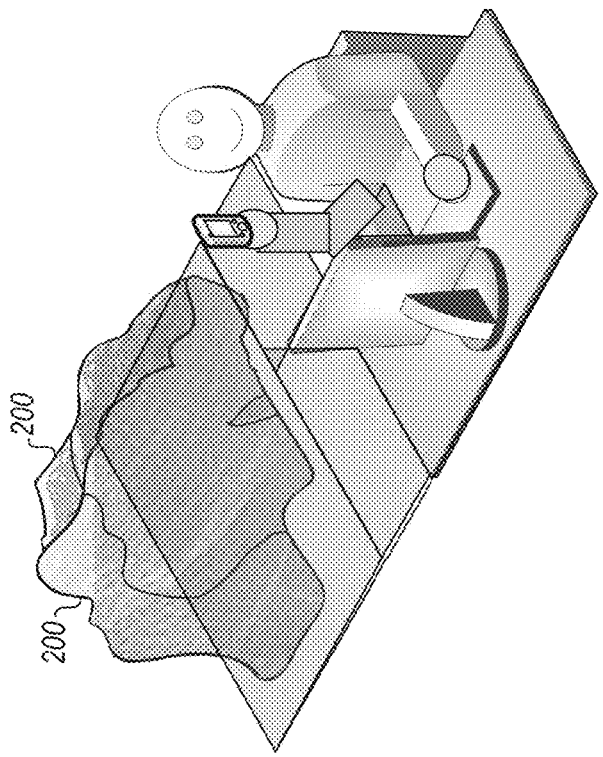

FIG. 2P continues the examples of FIGS. 2K to 2-O, and illustrates information 206p that shows an alternative GUI that may be displayed of a final completed 3D computer model of the object 200, such as to an end-user sitting at a desk in a different location from that of the object 200. In this example, the user is holding a mobile display device (e.g., a smart phone or other mobile computing device), on which a presentation of the 3D computer model of the object is overlaid on an image (not shown) visible from the mobile display device of a portion of the user's desk—in other embodiments, such as GUI may be displayed I other manners, such as on a head-mounted display or other augmented glasses worn by the user. As will be appreciated, the scale of the computer model is reduced in this example to fit on an area of the current image (in this example, to fit on a portion of the desk). In addition, while not illustrated in this example, the user may be using a different computing system (e.g., a desktop computing system) to display other visualization information regarding the object 200 and/or a larger site at which the object 200 is located, such as in a manner similar to that illustrated in the example GUIs of FIGS. 10A-10D. It will be appreciated that a variety of other types of information may displayed in other manners in other embodiments, including to select and virtually overlay various additional types of information on the displayed computer model, although such additional virtual overlay information is not illustrated in this example.

It will be appreciated that the details discussed with respect to the examples of FIGS. 2A-2P are provided for illustrative purposes, and that the described techniques are not limited to these example details. It will be further appreciated that while various shape estimation and determination techniques and model information presentation techniques have been shown, including in the examples of FIGS. 2K-2P, any combination of such techniques may be used together in particular embodiments, while in other embodiments only a single such technique may be used.

In addition, further details related to some aspects of generating, verifying and displaying computer models are included in U.S. patent application Ser. No. 13/843,833, filed Mar. 15, 2013 and entitled "Determining Object Volume From Mobile Device Images", now U.S. Pat. No.

9,196,084; in U.S. patent application Ser. No. 15/076,493, filed Mar. 21, 2016 and entitled "Verifying Object Measurements Determined From Mobile Device Images", now U.S. Pat. No. 10,403,037; in U.S. patent application Ser. No. 15/912,406, filed Mar. 5, 2018 and entitled "Determining Changes In Object Structure Over Time Using Mobile Device Images", now U.S. Pat. No. 10,186, 049; in U.S. patent application Ser. No. 15/076,321, filed Mar. 21, 2016 and entitled "Verifying Object Measurements Determined From Mobile Device Images", now U.S. Pat. No. 9,495,764; and in U.S. patent application Ser. No. 17/171,808, filed Feb. 9, 2021 and entitled "Determining Object Structure Using Fixed-Location Cameras With Only Partial View Of Object"; each of which is hereby incorporated by reference in its entirety.

FIGS. 10A-10D provide additional example details related to automated data analysis activities for determining and tracking information about object attribute values, and for displaying and controlling information about changing object shapes and other attribute values, as well as other information about particular example embodiments. Various details are included in the example embodiments described below with respect to FIGS. 10A-10D for the purposes of illustration, but it will be appreciated that other embodiments may differ in various manners from these examples.

In the examples discussed with respect to FIGS. 10A-10D, the automated

IMDOEM system captures, identifies, analyzes, quantifies and presents to a user the shape and other determined attributes of objects on a temporally surveyed site, such as a bulk materials storage site with one or more pile objects monitored over time. The IMDOEM system allows users to frequently, or in some cases continuously, update a representation of their storage site, extract information about the state of their site, and monitor changes to their site, including in some cases by using one or more fixed-location cameras that provide continuous or frequent images of the site. The monitored site information (e.g., geometry, material, semantic change, etc.) may include, but is not limited to, the volume or tonnage of the different materials stored, their location, their 3D shape, temperature, moisture content and material type (e.g., sand, gravel, topsoil, pine bark, etc.). The described techniques may be used to provide a complete solution to align in 3D the different site representations over time and/or the captured images over time, detect changes in 3D representation, texture or other quantities of interest, and form associations between bulk material stockpiles over time. The described techniques further provide functionality for visualizing changes in stockpiles or other objects, providing insights into how a user's inventory changes as they add, move and remove material.

Attempts to manually handle large and frequent data collects (or collections) are typically not successful, as adding a temporal dimension multiplies the data volume by the temporal capture frequency. Instead, the described automated techniques allow such functionality to be provided, including in at least some embodiments by using machine learning techniques to automatically extract stockpiles from 3D point cloud(s) and associated images with camera calibration (rotation, translation and intrinsic calibration) that is known or determined (e.g., via autocalibration). Thus, use of these described techniques enable high frequency monitoring of temporally surveyed sites, such as bulk material site(s), to identify, understand, quantify, analyze, and present to a user its changes over time. When one or more mobile camera devices and/or fixed-location camera devices capture imagery of the same location over time, the captured information can be leveraged to perform temporal analysis. In the context of a site with various stockpiles of material (such as an aggregates, mulch, or construction site etc.), or a pit from which material is being extracted, this analysis and/or visualization may include, but is not limited to, the following: detecting and quantifying the change in volume of the stockpiles; analyzing the progress of material being removed from a pit, and measuring its fill volume; and tracking the location and movement of material across the site.

Figure 10A:
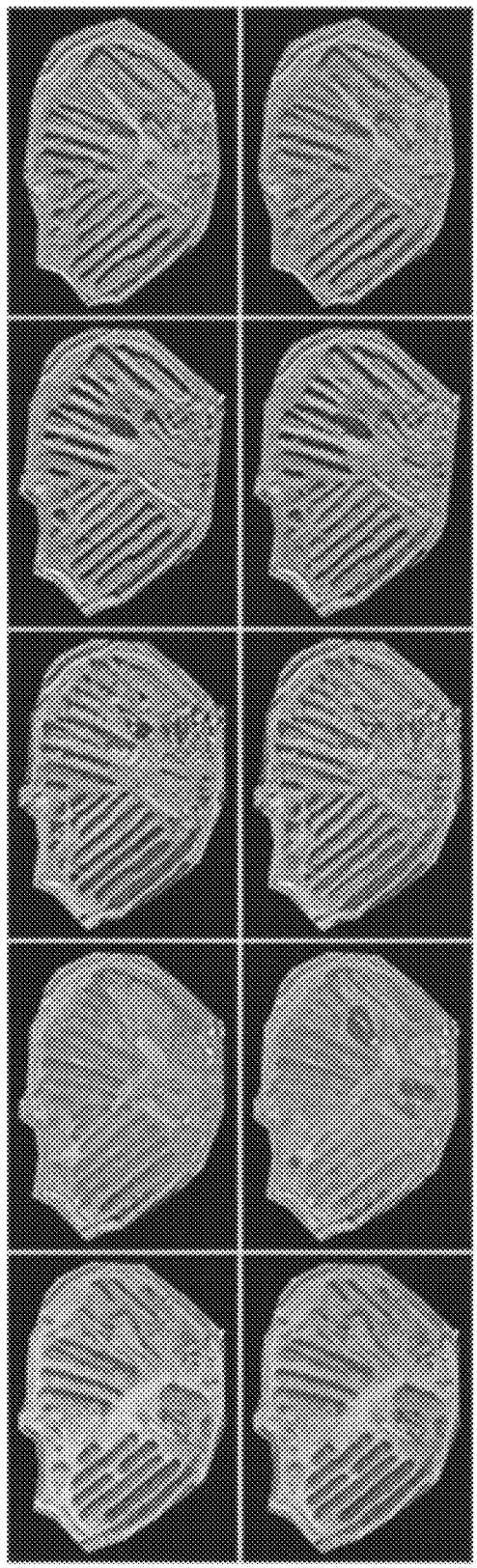
FIGS. 10A-10D illustrate examples of determining and tracking information about changing object shape and attributes over time, and of corresponding user interfaces for displaying and controlling such information.

FIG. 10A provides an example visualization 1000-26 that can be performed when the temporal dynamics of a site are analyzed. Here, the top row of images denote several image collections (or "collects") of the same site on different dates, where the sites have all been registered into the same spatiotemporal space. The bottom row indicates the relative change that has occurred on the site since the previous dataset. Areas of the site that have increased in elevation may be visually indicated in a first manner (e.g., colored green), while those areas that have decreased in elevation may be visually indicated in a second manner (e.g., colored red). The visual indications may further be used to provide an indication about the magnitude of the differences (e.g., using saturation of the colors).

In order to compare images and/or resulting generated 3D computer models for two different times to provide such a comparison, the images and/or models are first determined to correspond to the same one or more objects, and are aligned (also referred to as "registered") so that particular features or portions of the object(s) are associated together in the different images and/or models. Such techniques may include aligning all of the captured images into a common 3D coordinate system, and then analyzing the differences between different sets of images and/or their resulting computer models, where each set was captured at a common time. By aligning the images in a common 3D coordinate system, the reconstructed 3D models may be used to provide a foundation on which reasoning and analysis is performed. To prepare a dataset for inclusion in the temporal analysis, it is first reconstructed to determine the relative poses of the images and the relative location of the site's geometry. To do so, a photogrammetric reconstruction pipeline is described herein that generates a 3D representation of the scene's geometry (e.g., sparse or dense point cloud, triangle mesh, surface or volumetric representation, etc.). Additionally, 3D camera poses and their correspondence with the representation of the scene's geometry may optionally be used.

In at least some embodiments and situations, including situations in which multiple objects are co-located near each other at a single site, an object being captured in multiple images may need to be identified, such as to distinguish it from other nearby objects. Such object identification may be performed in various manners based at least in part on an analysis of the images, including to compare object information in the images to object information in other previously acquired images at a different time (e.g., to determine that the object visually represented in the images is a same object as the object visually represented in the other previously acquired images), compare object information from a computer model generated from the images to object information in one or more other previously generated computer models from other images (e.g., to select one or more other such computer models as matching or otherwise corresponding to a currently generated computer model, such as to determine a match between two computer models using at least one of location, a type of material, an appearance feature between the first and second computer models, a structural feature between the first and second computer models, a shape of the objects, etc.), etc. Additional details are included below related to identifying an object captured in one or more images.

Given multiple independent 3D computer model reconstructions of a single object or the same site (each captured at a different point in time), they are next aligned into the same coordinate system. This may be implemented as a multi-step process, which includes the following: optionally determine an initial, approximate alignment between the sites; find corresponding locations between the geometry of the sites for which corresponding portions of the 3D computer model reconstructions are associated; optionally identify planar ground regions within the sites; and estimate a smooth warping to finely align the sites using the constraints provided by site-to-site correspondences and planar ground regions. If performed (e.g., depending on the availability of data), obtaining an initial alignment of the sites simplifies later processing. For two or more generated computer models, their alignment may be performed in various manners in various embodiments, including one or more of the following: associating multiple corresponding portions of the first and second computer models together based at least in part on determining relationships between the multiple corresponding portions; determining and matching three-dimensional locations of points for the object(s) represented by the computer models (e.g., such that matching locations are within a defined distance threshold), such as by analyzing location information associated with images used to create the models and/or retrieving location information associated with predefined additional ground points visible in such images and/or identifying and matching regions with multiple locations in the images and/or resulting computer models; determining and matching one or more appearance features visible in such images and placing appearance features that correspond with each other in different computer models at same locations in one or more coordinate systems used for the computer models (e.g., for appearance features on the surfaces of the objects, for predefined points visible in the environment around the object, for planar ground areas in the environment having corresponding shapes, etc.); etc. In addition, one computer model may be deformed or otherwise transformed to match another similar computer model (e.g., for the same object at different times), including to do one or more of the following: use constraints identified for one or both computer models during an initial alignment to modify at least one of a shape or location of the one of the computer models to correspond to the other of the computer models as a final alignment; determining locations and orientations of one or more devices used to acquire the images used to create at least one of the computer models, and altering such determined locations and orientations to minimize re-projection errors of portions of a computer model resulting from those images; etc.

Furthermore, in at least some embodiments two or more of the object identification and computer model generation and computer model alignment are performed together at substantially the same time, including in situations in which images are received with geotags or other location information that enables at least initial or tentative object identification and/or alignment from such location information (e.g., based at least in part on relationships determined between corresponding portions of the resulting generated computer models). For example, if image geotags are available (such as those often embedded by commercial unmanned aerial vehicles), then an initial alignment can be obtained by rigidly transforming the 3D reconstruction, such that the recovered camera poses closely match their corresponding geotags. This rigid alignment is achieved using, for example, a robust estimation method (such as, but not limited to, RANSAC, MLESAC, Hough transform, or their many variants) that estimates a similarity transform between the recovered 3D camera positions and the 3D coordinates represented by the image geotags. If the robust method fails (e.g., if the geotags are sufficiently noisy), then a least-squares approach can be leveraged to obtain an approximate alignment between the cameras and their geotags. An alternative strategy would be to use an iterative approach to alignment, leveraging such techniques as ICP or non-linear refinement. Additional details are included below related to performing alignment of at least two computer models.

Once an initial, rigid alignment is achieved, a refinement may be performed that allows the 3D reconstruction to deform slightly to better align with the geotags (e.g., remove curvature, adjust scale, modify camera intrinsics, etc.). Note that this initial refinement is optional, but often helps with the convergence behavior of the refinement. The refinement is formulated as a non-linear error mitigation, e.g. a bundle adjustment, where the residual is computed as a camera position's radial deviation from the trajectory defined by the sequential geotag positions. Other possible residuals are a camera position's absolute deviation from its associated geotag, a weighted distance between the positions based on a priori or measured insights into the error distribution of the GPS values, or other strategies that seek to combine the 3D reconstructed camera positions with image geotags in order to create a more accurate solution.

One possibility of the non-linear error mitigation method is a trajectory-based approach, such as to take the form of defining the error in terms of a camera's radial deviation from the trajectory defined by the sequential geotag positions. To define the trajectory, linear segments of the camera's path are identified by finding three consecutive camera poses that are roughly collinear (enforcing a similar direction of flight). Additionally, a constraint may optionally be imposed that the cameras' associated geotags should also be roughly collinear. For each of these 3-camera segments, a residual value for the middle camera's position is added, which measures its radial deviation from the line segments between the first and second, and second and third cameras' GPS positions. For camera positions falling outside the line segments, radial constraints may optionally be imposed with respect to the endpoints of the line segments. When forming the trajectory-based approach, parameters may be added to the optimization that model an airframe bias (structured error in the GPS positions relative to the camera's pose, and optionally, direction of movement). Additionally, a GPS bias may be modeled that may occur when the GPS receiver is turned off and then back on again (which results in a structured error for each separate flight of the site). This trajectory based approach is one specific example, and could be reformulated to model a smoother camera trajectory, incorporate other values from sensors (such as ground-based tracking units, inertial sensors on the camera's platform, etc.), or other modifications.

If image geotags are not available, known ground control points (GCPs) within the site can alternatively be leveraged. These ground control points may have a known GPS position and/or unique appearance (e.g., high-contrast targets that have been permanently placed on the site and surveyed). Thus, by identifying the 2D observation position of these ground control points in the images, the GCPs' positions within the site may be triangulated. Then, a rigid similarity transform is estimated between the triangulated GCP positions within the site and their known GPS coordinates. Here, a robust estimator, e.g. a RANSAC-based method, can again be employed, as it effectively deals with outlier values. To identify the 2D observations in the image, an automatic method may be used that attempts to detect the GCPs' unique appearance in the image. Alternatively, a human-in-the-loop approach could be employed in some other embodiments, where a user can manually supply this information, e.g. by clicking on the GCPs' positions within the images. Given this initial rigid alignment, the solution is further refined by utilizing a nonlinear error mitigation, such as a bundle adjustment operation, which minimizes the distance between the triangulated GCP positions and their known GPS coordinates. This could additionally be reformulated as minimizing the reprojection errors between 2D observations of the 3D GCPs' positions, or other strategies which seek to generate an accurate alignment between the 3D reconstruction and known (geotagged) locations within the scene.

If both geotags and ground control points are unavailable, another method may be used to align a site to a reference 3D reconstruction of the location, by attempting to find correspondences between 2D image-based features or between parts of the 3D geometry. To find these correspondences, image-based or geometry-based descriptors are used. A descriptor is a numeric representation of the local 2D or 3D neighborhood of a point, and summarizes such things as texture, curvature, variance, and other local characteristics, e.g. depth, etc. Once a set of descriptors is created for each dataset to be aligned, similar descriptors (candidate correspondences) are found by comparing the numeric representations of those descriptors, and selecting those that are most similar. These candidate correspondences are then filtered using a robust estimator, for example a RANSAC, for a (piecewise or smooth continuous) 3D similarity transformation estimation phase. The resulting transform is then used to approximately align the datasets.

A next phase of the pipeline detects corresponding parts of the site that have not changed, and forms a set of constraints to use to align those parts of the site together. While ground control points and geometry descriptors fall into this category of site-to-site correspondences, this step preferably finds a significant number of these correspondences, with these correspondences being as accurate as possible. To do so, patches of unique geometry are first identified within the currently reconstructed site. Here, the uniqueness of the patch refers to the characteristic that it is unambiguous in its shape, and has no rotational or translational symmetry (a planar patch would be ambiguous). This uses a 3D region of interest detector, which identifies parts of the geometry with high curvature along multiple axes. Once a set of these geometry patches are identified, they are independently aligned to the reference site's reconstruction, using an alignment transform estimator, for example the iterative closest point (ICP) algorithm. Here, ICP is initialized using the alignment found in the initial alignment phase. Other (robust) estimators may similarly be suitable to perform this task. Once ICP converges, the quality of the patch's alignment is scored. As the goal is to identify parts of the site that have not changed, alignments of patches where any part of the patch deviates significantly from the corresponding patch in the reference dataset may be rejected—if so, only those patches that maintain a very close alignment across the entire patch are retained as valid correspondences. An additional way to find correspondences would be the image and geometry descriptors from the previous stage of initial alignment estimation. Both methods can be employed in parallel, or either one alone may be used, although the ICP based patch alignment may provide finer control on the ability to reject patch correspondences that do not exactly align.

While the site correspondences discussed above define direct one-to-one mappings between unique parts of the sites, no constraints were added in those examples for large planar regions such as the ground. However, in the final alignment of the sites, one would expect that the ground surfaces should align closely or perfectly (assuming that they have not changed). Toward this end, a further optional step to the alignment pipeline may explicitly detect the ground of the site, and constrain it to align with the ground of the other site, or more generally align temporally invariant surfaces or scene elements to each other. To initially identify the ground in both datasets, a ground detection routine may be used, as discussed below with respect to automatic pile extraction techniques. Then, regions of the site where the ground has not changed are found, so that their alignment can be later enforced. To find these unchanged regions, both datasets are scanned, and any ground points that do not have a sufficiently invariant local neighborhood are removed (e.g., for stockpile sites locally planar surfaces). In general, the invariant surface characteristics will vary with the application area, and can be objects or natural features in the environment. Given the resulting regions of invariant points, the intersection of these regions are found (those parts of the site that are planar in both datasets)—this intersection leverages the initial approximate site alignment found earlier in the alignment pipeline. While the initial alignment may have some registration error, as long as that expected error is no greater than the radius of the local invariant region, e.g. local planar region, then a valid alignment can still be found between the intersecting regions (and their invariant neighborhoods).

Given the previous detections of correspondences between two sites and their resulting 3D computer models, either through local geometry alignment or local planar regions, these correspondences are formulated as constraints within a bundle adjustment operation. The goal is to deform one dataset such that it aligns with a previously determined reference reconstruction of the site. This reference reconstruction can be the first reconstruction of the site, any later reconstruction, a 3D representation of the site obtained from other techniques, etc. The reference reconstruction may additionally be augmented with reference values such as ground control point constraints, distance or angular values between fixed objects, or constraints which limit the scene's geometry. However the reference reconstruction is determined, it provides a coordinate system with which the current reconstruction will be aligned.

Using the site correspondences, they are parameterized as constraints in non-linear error mitigation, e.g. bundle adjustment, by minimizing the residual between the corresponding locations (this can be formulated as a distance, angular, or other error measure). For improved accuracy, surface characteristics such as geometric normals and local neighborhoods may be incorporated. For example, instead of utilizing point-to-point distance constraints, point-to-plane constraints may be leveraged, where a point in one dataset should lie within the local planar neighborhood of the other dataset' surface representation. Similar to the site correspondence constraints, the coplanar ground constraints may be formulated as minimizing a residual function, which seeks to achieve an accurate alignment between two roughly locally planar neighborhoods of the corresponding 3D representations. One way in which this can be formulated is point-to-plane, or plane-to-plane distances, which minimize the deviation between the two local surfaces.

During this deformation process, discontinuities, or large, exaggerated transforms, are avoided, such as by imposing a smoothness constraint on the deformations that are possible. To efficiently and compactly represent this smoothness constraint, deformation amounts (magnitudes and directions) may be estimated only at vertices of a large, fixed 3D grid (where grid cells are typically 10 to 50 meters on each side). Given these deformation vectors defined on a regular grid, they may be smoothly interpolated in 3D to define the currently estimated deformation at every point in 3D space for the site. Thus, when constructing the non-linear, e.g. bundle adjustment, based alignment, the possible motion of the scene's geometry is parameterized using this regular grid of deformations. Alternatively, smoothness can be enforced explicitly through smoothness constraints (where neighboring deformations should be similar), through sparsity constraints (where points of inflection or surface variation should be sparse in their arrangement), or through other techniques which constrain the realm of possible scene deformations. Additionally, instead of representing the scene's deformation as an explicit deformation field, the scene's geometry may instead be allowed to deform, and constraints on the scene's connectivity, curvature, and other characteristics may be imposed to limit the amount of deformation that is permissible.

Finally, a bundle adjustment constraint is included that the cameras should minimize the reprojection errors of their observed 3D points. In this manner, as the site deforms, the camera poses and intrinsics may be altered to match the new geometry of the scene. In order to achieve this, the non-linear optimization, e.g. bundle adjustment, operates not only on the sparse 3D points (from which reprojection errors are computed), but optionally also on the dense 3D point cloud or triangle mesh (where the site correspondences and coplanar ground constraints are defined). Both of these geometries are deformed simultaneously using the same deformation field, which allows the various constraints to operate in a combined, consistent system.

While the examples above have discussed only two datasets (the current dataset that is being analyzed, and a reference dataset to which the current one is aligned), use of pairwise alignments computed between the current collect and the one previous to it may in some situations allow the scaling of the site to drift over time. One solution to this is to always align a new dataset to the same, original reconstruction of the site. That way, the scaling of the site will remain consistent as there is a constant reference for the deformation. However, this technique has the drawback that the reference reconstruction may become no longer relevant, if the content of the site has changed drastically over time. This issue may be mitigated by, for example, the use of ground control points (e.g., temporally stationary points of interest, including buildings or permanent structures). If the alignment of these parts of the site remains accurate over time, then the scaling of the site will remain consistent. In addition, while some examples above discuss alignment of two datasets (a current dataset that is being analyzed, and a reference dataset to which the current one is aligned), in other embodiments more than two datasets may be aligned to each other, such as to align the current dataset to an arbitrary number of previous, reference datasets (e.g., all of which are already aligned) or resulting models, and optionally to give differing weights to at least some datasets (e.g., to decrease the weight given to a dataset as its age, or lack of recency, increases). The benefit of this approach is that older datasets, while potentially less relevant, may still contribute to the alignment and be used to constrain the drift in a scene via their stationary points of interest and planar ground regions, while more recent datasets (which are frequently more relevant) help constrain the alignment via their more numerous site correspondences (as there is less change in the scene's geometry between the current dataset and these more recent datasets).

Once two (or more) datasets are aligned (e.g., a new dataset with a reference coordinate system of a previous dataset), changes in the site's geometry may be determined, such as directly from the current (or most recent) dataset relative to one or more earlier datasets, and/or by comparing computer models generated from the images for the datasets and aligned with each other (e.g., by comparing one or more corresponding portions of two such aligned computer models, including using the alignment to identify such corresponding portions). One way to accomplish this is to compute the nearest distance between every point of the current collect (either a point in the dense point cloud, or a position along the triangulated mesh) and the geometry on which the comparison is being performed. However, this approach can suffer from artifacts, in that the nearest geometry may not always be in the same consistent direction or even the nearest point in the new reconstruction. Alternatively, another way to quantify the difference is to measure the nearest distance only along a scene-specific fixed direction, e.g. within the vertical direction of the dataset (perpendicular to the ground plane) for stockpiles. In this manner, the output set of distances between the reconstructions matches the change in elevation between the datasets. When constraining the distance vectors to be computed along the Z axis (or perpendicular to the ground plane), the computed distances accurately characterize the difference in elevations between the surfaces. To avoid quantization artifacts, and to accelerate the distance computation, the nearest distance determination may be performed using a kd-tree and radius-based query. If so, each point in the reference dataset is projected to the plane perpendicular to the specific direction, e.g. the ground plane (e.g., XY plane) for the up vector, and then indexed into a kd-tree. Then, for each point in the current dataset, a radius-based query (with a typical radius of 0.1 to 1.0 meters) is performed. This retrieves all points in the reference dataset that were within the specified radius within the XY plane. Then, to determine the amount of change for that part of the site, the query point's distance value along the direction is compared to the distance values of the retrieved coordinates. The maximum Z difference is returned as the final distance for the examples discussed here, but other statistics such as minimum, median, or mean may be employed to compute the final value. One benefit of using the maximum is that it more accurately represents the case when a column of points is present in one dataset and not the other. For example, if the reference dataset contained a column of points, and the query point in the new dataset corresponded to the base of the column, then the minimum distance would be minimal, as the points at the base of the column would agree in Z value. However, if the maximum distance is computed, then the distance will be the height of the column, as the query point will be compared to the point at the top of the column.

Another efficient way to compute change detection between two datasets is through the use of geo-registered elevation maps (e.g., GeoTIFFs, raster images with geographic information, or other data formats). Such elevation maps represent the height of the terrain at a particular geographic point relative to some base surface or elevation.

These maps may be computed by, for example, fitting a smooth surface to the dense 3D point cloud, by using the 3D triangular mesh, or other schemes that determine the elevation of the terrain. Depending on the particular application, particular parts of the scene may be excluded when computing the site's elevation map. For instance, if the elevation of the bare earth surface is being modeled, objects such as trees, equipment, or buildings may be excluded from the elevation map. Once an elevation map is computed for each dataset, change in the datasets can be detected by subtracting the heights of corresponding geographic positions.

To further enhance the usefulness of the change detection, semantics and other attributes may be handled, such as if the height of the geometry has not changed, but the content creating that geometry is different. For example, if the pile in one collect is replaced by equipment that is exactly the same height, then the computed height difference will be minimal. However, by defining, tracking, and comparing the sites' contents, differences that are not only geometric in nature may be detected and highlighted.

Pile association links consecutive values of the same physical pile or other object over time. For inventory purposes an object may be identified by its location and additional attributes such as, for example, the material it is made of. The IMDOEM system assigns a unique ID ("identifier") to each pile, and in some embodiments each pile or other object may have one or more unique labels or names (whether generated automatically by the system and/or manually specified by a user), such as for use when displaying or presenting or otherwise providing information about the object to one or more users. Over time material is added to and removed from the pile, which changes its shape and appearance. The lifespan of piles varies greatly. They may appear and disappear from one computer modeling session to another. Some static piles may never change. Additionally, a pile may be split—up and two or more piles may be merged into one. To associate an object value to a specific object, its attributes (e.g. material), location and possibly shape are matched to previous values of the same object. For a given value, the association process may use, among other things, the object's images, its point cloud, surface model, orthographic image, and volume value. Seasonal factors like illumination and moisture content affect the appearance of the object, and image quality and vantage point also affect the quality of the data.

The association process has a first automated stage that uses a classifier to produce candidate material and object identities, and may optionally be done in a batch mode. If the confidence in the results is not sufficient or if it is ambiguous, a human operator may optionally provide further information in a second stage, such as to approve and/or refine the results of the classifier in the first stage by adding or excluding pile materials and locations. In such a second stage, a GUI may be used to present the user with the input data (object images, derived material chips, etc.) along with exemplars of matched material chips, object locations, object id, and historical data from previous values (images, volumes, locations, etc.). If no object association is made, the modified data is then fed back into the first stage.

The material of a pile may be identified by automated texture and color analysis. The IMDOEM system may, for example, first create a material database made of image chips collected from the images of piles over time. The chips are used to train a material classifier. Given a set of input chips from a pile, the classifier outputs most likely material classes along with exemplar chips from the material database. In addition to image chips, the material database may store additional information examples, such as site ID, object ID, object location, pile footprint, and date and time of day—such information may improve the classifier's site-specific and season-specific classification accuracy. In some embodiments, a hierarchy of classifiers may be used to refine a set of candidate materials. The location of a pile may be determined by comparing the position of its centroid with the centroid of previous values. The match may be further refined by matching the shape of the pile with those of previous neighboring values.

There are different types of shape descriptors, such as 2D rasterized footprint, rasterized height maps, local and global point cloud detectors, etc. The shape matching process for 2D rasterized footprint is further discussed, but other descriptors that have an overlap measure may be used. Normalized cross-correlation is a suitable measure for 2D rasterized footprints.

If the footprints overlap between a new object with the last object in the same location, then the IMDOEM system may assign the previous object's ID to the new one, with the confidence in this initial match being a function of the overlap measure. The IMDOEM system may further confirm or reject the match by comparing the new footprint to those of older objects. This technique is particularly advantageous to identify static objects. The IMDOEM system may further be configured to perform initial matches exclusively with the latest historical dataset, and/or to search within a time window that encompasses several datasets. If the new object overlaps with several separate previous object taken at the same time and the same material, the IMDOEM system may detect an object merge, e.g. merging piles. Likewise, if two new objects overlap with a single previous object then the IMDOEM system may detect an object split, e.g. a pile split. New object information with no matches correspond to new objects. In some embodiments, user input may be used to confirm such new objects. Some objects may be so small that their footprint is at the scale of the co-registration error between the current dataset and the historical objects. If so, the matching may be performed by adding random offsets and rotations to the footprint with a given search window before comparing it to historical ones. In some embodiments, a single classifier may be used to determine material, position and shape matching.

Figure 10B:
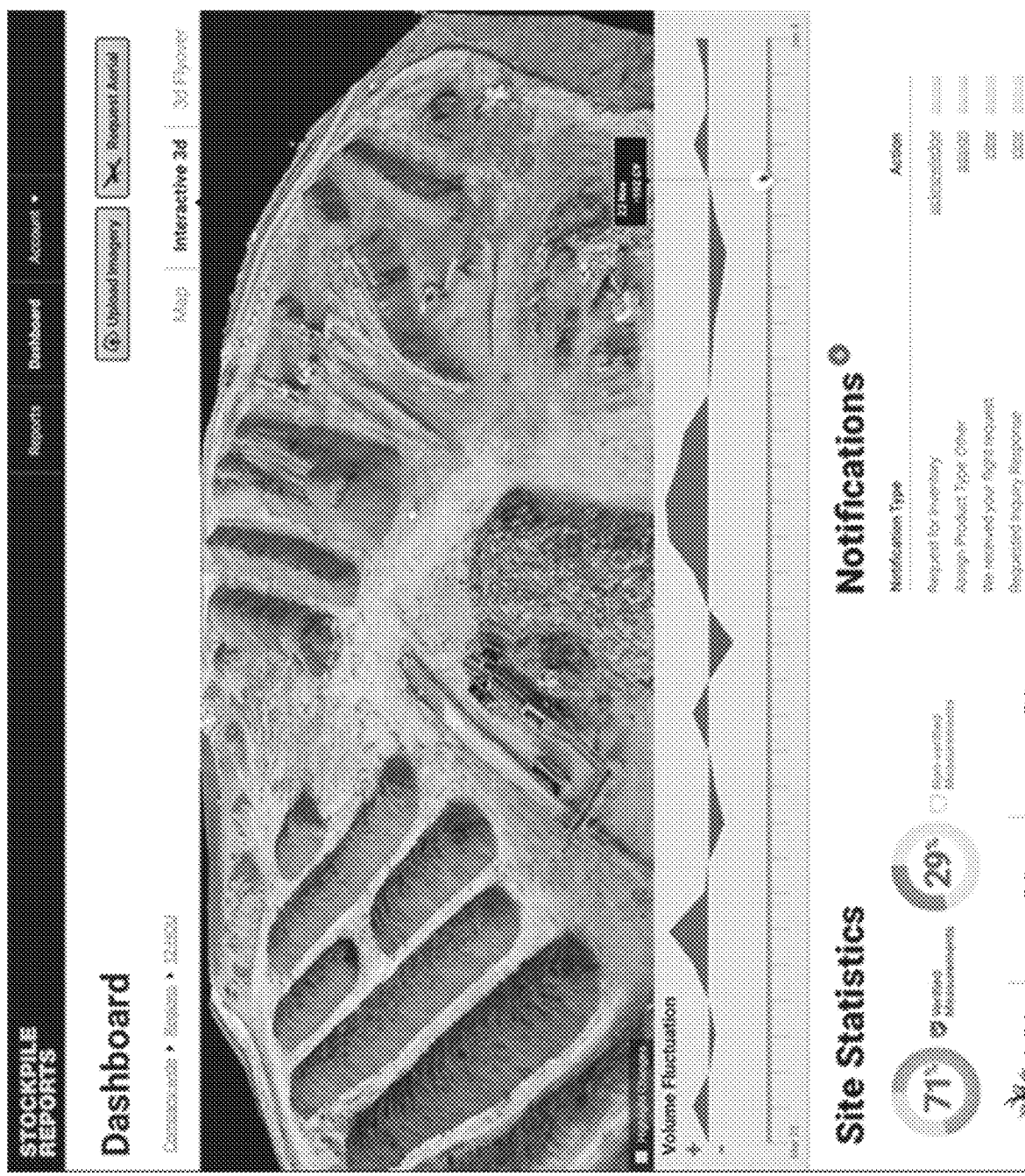
Figure 10C:

Using 3D renderings generated at different points in time, a visual representation may be provided of where the addition and removal of materials took place. For example, FIGS. 10B-10C depict a displayed GUI in which a user adjusts dates using a displayed user-selectable date slider to see 3D renderings changing over time (e.g., using one or more times specified with the slider), such as for information 1100-37 and 1100-40 in FIGS. 10B and 10C respectively, thus providing a progression of changes over time. In addition, the user may use one or more user-selectable controls of such a GUI to specify one or more other types of information to display (e.g., a visual representation of the exterior of one or more objects from one or more computer models that represent the object(s), including in some cases to illustrate types of materials or other appearance features; a visual representation of boundaries of one or more such objects; a visual representation of a change for one or more such objects between two or more times, such as for a change in volume or at least one structural change or another indicated type of change for one or more other object attributes including location, temperature, moisture type of material, etc., and such as for individual object changes and/or an aggregate change for all objects co-located at a site; an animation of one or more such changes over two or more times; etc.), and/or one or more such types of information may be displayed by default or otherwise without user selection in some embodiments and situations. For example, a Volume Fluctuation graph is displayed above the date slider showing the gross total/aggregate volume of change, communicating whether the site's total/aggregate volume has increased or decreased over the given time range.

Figure 10D:

Additionally, the user can choose to toggle a Highlight Changes view in the example GUI, such as by selecting a corresponding displayed user-selectable control, to depict a 'heat map' of specifically where the volumes of material were added or removed from the designated points in time, including to illustrate structural changes within portions of an object (e.g., by using a color, such as green, and/or one or more other effects to visually identify where material is added, and by using another color, such as red, and/or one or more other different visual effects to visually identify where material is removed). FIG. 10D further depicts the user changing to such a heat map view 1100-43 to see specifically where materials volume was added or removed from the given site for a specified time, including changes in structure to particular piles and portions of those piles. Additionally, when viewing a heat map of change on a site, contours of one or more particular piles can be overlaid to more quickly quantify the amount of change that has occurred. However, an annotated color-bar mapping heat map colors to elevation change (or other visual reference) also serves a similar purpose. In addition, when transitioning between consecutive datasets (e.g., by using the slider or otherwise advancing from one time at which images were collected and one or more corresponding pile model(s) created to a next time at which additional images were collected and one or more additional corresponding pile model(s) created), various visual effects can be employed. For instance, one approach is to blend between the imagery or heat maps over a short period as the transition is occurring. Other strategies leverage the 3D data associated with each dataset, enabling the geometry to morph (interpolate) between two datasets, yielding not only animated textures (imagery) but also animated geometry, including to successively animate changes through a series or succession of several computer models and associated times (e.g., all times/models, all times/models between user-specified start and end times, all times/models that satisfy one or more user-specified criteria, etc.). For example, by performing an animated sequence for two or more times and associated computer models, the additions and subtractions in materials may be viewed over time as they change. It will be appreciated that various additional types of user-selectable controls and information may be displayed or otherwise provided in other embodiments.

It will be appreciated that the details discussed with respect to the examples of FIGS. 10A-10D are provided for illustrative purposes, and that the described techniques are not limited to these example details.

In additional, particular additional activities of particular types may be performed in some embodiments, such as is described in the following non-exclusive embodiments provided for illustrative purposes.

As a high-level overview, the techniques in at least some such embodiments include using the visual data in images acquired at a given time and associated acquired image acquisition metadata to generate and use a resulting model of an object for the given time (referred to for purposes of these illustrative embodiments as a 'reconstruction', and discussed with respect to a pile object in this example, with the image acquisition device referred to as a camera).

An example embodiment of the IMDOEM system in this example may perform automated operations to address problems with previous techniques used, such as systems whose analysis of visual data of images is too slow to provide real-time or near-real-time generation of a computer model of an object on a mobile computing device used for an image acquisition session for that object (e.g., during that image acquisition session, such as to instead rely on offline batch processing of images after all images are acquired), systems that rely on external trackers and/or markers, systems whose reliance on motion data introduces problems with long-term drift and/or temporary instabilities and/or trajectory discontinuities, systems whose reliance on visual data causes multiple separate incomplete models, etc. With respect to drift, it can be described as an artifact in which a reconstructed trajectory of motion slowly diverges from the true motion that was performed, with small estimation errors (potentially insignificant in isolation) compounding over time in incremental approaches leading to large differences, and being a common artifact in many SLAM systems. With respect to temporary instability, it can be described as an artifact that appears as camera pose estimates deviate from the actual motion of the device over a short period of time—for example, while the device may be stationary or executing a smooth motion, the estimated pose may wiggle or veer off in a separate direction, such as due to a failure in visual tracking in a vision-based system (e.g., if the camera moves and observes an object that is devoid of any texture or unique visual feature, the system may be unable to use the video stream to determine its spatial position), and with other sensors being insufficient to accurately estimate the full pose of the device. With respect to trajectory discontinuity, it can be described as an artifact that appears as a large jump in position or rotation in an otherwise smooth camera trajectory, which does not correspond to an actual motion that was made by the device, such as when a loop-closure is detected in a vision-based system (e.g., the system has identified that it has returned to a previously-recorded part of the scene, and can estimate its pose based on this previous scene geometry, but the poses estimated from the current and previous scene geometry may disagree, such as due to long-term drift). With respect to creating multiple separate incomplete models, when imagery alone is insufficient to recover a complete reconstruction, the final result may be broken into separate models or may be incomplete, which is a common problem in many SfM systems.

The example embodiment of the IMDOEM system in this example may perform automated operations that include taking the output of a SLAM analysis (e.g., captured imagery, estimated camera poses, and other sensor data), and performing post-processing using an SfM analysis, including performing various additional techniques to further improve the results and accelerate the speed of processing.

The first step in the reconstruction method for the example embodiment of the IMDOEM system is to analyze data provided by the SLAM analysis and prepare it for further processing using the SfM analysis. As part of doing so, the validity of the input SLAM data may be verified, to enable a reconstructed trajectory of the camera (e.g., set of poses that represent the camera's motion) to be used as initial information, such as by identifying large deviations from expected priors on the camera motion (e.g., jumps or discontinuities in the computed trajectory) from the SLAM analysis. Such priors can be learned from previously reconstructed camera poses and could be static or adapt based on the observed scene. Long-term drift or slight fluctuations in the trajectory will be corrected by later stages in the reconstruction pipeline. To identify trajectory discontinuities, the example embodiment of the IMDOEM system can leverage one or more of a variety of techniques. For example, a first strategy to detect discontinuities is to impose fixed limits on the maximum distance or rotation angle that the pose can change between consecutive measurements (e.g., to use a distance threshold if the pose trajectory was reconstructed at a meaningful scale, and otherwise to use a rotational threshold). An additional strategy is to leverage thresholds for the maximum velocity change (both positional and rotational) that can occur between poses, with the positional velocity thresholds being useful even if the trajectory is not reconstructed at a meaningful scale (e.g., due to the velocity of the camera in a standard camera motion changing in a rather smooth manner, enabling detection of large jumps by analyzing the velocity between a pair of measurements relative to neighboring poses in the sequence). Another technique is to compare estimated poses from the SLAM analysis to others that are computed from a small, independent reconstruction of the trajectory based on the imagery, such as by using two or more images from the input sequence (along with 2D feature information) in an SfM reconstruction, and with the SLAM-based pose data treated as being invalid if the corresponding pose data from the SfM analysis differs greatly from those computed by the SLAM analysis. In addition, each of these above techniques can be combined with a machine learning approach (e.g., leveraging the SLAM-based data, images, 2D features, metadata, etc.) in order to achieve a robust solution and avoid fixed thresholds that may not generalize to all applications. Once discontinuities are identified, they can be stored for later reuse, such as to define segments of the SLAM-based trajectory that are obviously invalid and can be corrected by further processing. Additionally, the SLAM-based trajectory can be used in following stages of the reconstruction to accelerate processing, and the identified discontinuities indicate parts of the trajectory that should be ignored for use in the acceleration. For terminology purposes as part of this example, the name "continuous trajectory segment" refers to a sequence of consecutive images free from discontinuities and bounded on either side by a discontinuity or the start/end of the sequence.

After validating the data provided by the SLAM analysis, the next step is to select a group of keyframe images that will be used in the remaining stages of the reconstruction pipeline. The output of the SLAM system may be a video (which consists of a sequence of video frames) or a set of images that were taken at a high frame rate, but this set of imagery can optionally be reduced to a more compact subset to increase the performance of later processing stages. The general operation of this step is that a set of 2D image features (KLT tracks, local descriptors, etc.) are extracted from each image of the input, feature matching is performed on neighboring or nearby images, and a preferred (e.g., optimal) subset of images is selected that preserves a target range of overlap between consecutive images in the sequence. To accelerate the processing of this stage, information from the SLAM analysis can be leveraged, such as by directly using existing 2D feature data or pairwise connectivity information instead of recomputing it.

The next step in processing is to find matching pairs of images within the selected group of keyframe images (or within all of the images if the optional keyframe image selection is not performed). While keyframe image selection (if performed) found correspondences between consecutive or nearby images temporally, this step seeks to find correspondences between pairs of images that view similar scene content, no matter if those images occur at vastly different locations within the input sequence. At a high level, this step operates by identifying pairs of images that may be similar (based on image retrieval, similarity metrics, transitive connectivity, etc.) and then verifying if a valid geometric transformation exists between those pairs (using extracted 2D features and a robust estimation method). As with keyframe selection, information from the SLAM analysis can be used to accelerate processing in this stage, such as to use existing image connectivity or pose data to determine which image pairs already view similar scene content (or have a high chance of doing so).

Once matching image pairs have been identified, the example embodiment of the IMDOEM system then separates the pairs into two types: pairs connecting consecutive sequences of connected images, and pairs that form loop closures. To make this determination, multiple criteria may be used. First, loop closure pairs are determined to be those that connect images from separate parts of the image sequence. To determine this, each image pair $[i,j]$ (with $j>i$) is analyzed to determine if there exists a sequence of other valid image pairs $[i,j-1]$, $[i,j-2]$, $[i,i+2]$, $[i,i+1]$ or $[i+1,j]$, $[i+2,j]$, $[j-2,j]$, $[j-1,j]$. If such a sequence exists (or exists with only a few missing pairs), then the image pair is not considered to be a loop closure, as the images from i to j are strongly connected, and otherwise the pair is considered to be a loop closure. This constraint identifies pairs of images that complete a loop of motion (the camera returning to a part of the scene that it's already seen). An exception to this is image pairs which belong to separate continuous trajectory segments (sequences of images that are divided by trajectory discontinuities), as any pair of images that spans a discontinuity is considered a loop closure pair.

Given the input imagery, feature matches, pairs, loop closure identifications, and SLAM-based poses, the example embodiment of the IMDOEM system then begins the process of 3D reconstruction. The general strategy will be to take the SLAM-based poses as an initialization, and then use the features, pairs, and other data to compute a more refined intermediate trajectory, which will later be further refined to reach a final trajectory. The first step in the process is to convert the input data into a form that can be leveraged by the SfM analysis, such as by initializing each camera in the SfM reconstruction to exist at its provided SLAM-based pose (even if some of the poses are known to be incorrect or exist at discontinuities), and then forming initial feature tracks (a set of linked 2D features across images) by utilizing image pairs that are not loop closures. This creates an intermediate refined trajectory from consecutive measurements, so loop closures (and pairs connecting separate continuous trajectory segments) can be ignored. Using these initial feature tracks, triangulation is performed, but the triangulated 3D points might be inaccurate or noisy if the initial estimated pose data is sufficiently inaccurate. To begin correcting for this issue, a bundle adjustment operation is performed, which involves the simultaneous optimization of multiple parameters (camera poses, 3D point positions, and camera intrinsics) such that the projection error is minimized between the 3D point positions and their original 2D feature locations, and with additional constraints also able to be optimized in a bundle adjustment operation (e.g., to optimize camera poses so that they are near known GPS locations for those cameras, or to constrain camera intrinsics to exist within a predetermined valid range). The example embodiment of the IMDOEM system uses several additional constraints, including that pairs of consecutive images are constrained to have a relative difference in poses that is similar to the relative difference between their corresponding SLAM-based poses (for consecutive pairs that are not separated by a trajectory discontinuity), such as by using a weighted addition of two residual terms (one which measures the difference in translation, and the other that measures the difference in rotation). These constraints (the combination of which is called the SLAM pose prior for the purposes of this example) are incorporated into the bundle adjustment using a tolerant loss function, which incurs a low penalty as long as the camera poses are near the SLAM-based prediction, and an increasing penalty for differences that are outside of an acceptable range. As part of formulating the above constraint in bundle adjustment, a reweighting operation is also added that chooses how strong the SLAM-based pose prior should be enforced, so that the SLAM-based pose prior provides a stronger contribution in cases where the SfM solution is not well defined or poorly constrained (so that SfM does not compute a degenerate solution), and so that the SLAM-based pose prior provides a weaker constraint in cases where SfM is confident in its pose estimate (as the camera poses will be well-constrained). This reweighting can be implemented and achieved in various manners, including to alter the SLAM-based pose prior weighting for a pair based on the number of 3D points that are visible by both images in that pair (such that a higher number of visible points results in a lower weight). Additionally, the 2D and 3D distribution of those points can be analyzed, to detect degenerate point configurations that incur a higher weight for the SLAM-based prior. A machine learning based approach can also be employed, to select the best weight based on information about the pair and surrounding context (e.g., to train a regression model that, given statistics about the number, distribution and relationship of points and connections for the pair, predicts the best weighting that should be applied, such as by leveraging a large database of both successful and failed reconstructions as training). For consecutive pairs of images that are separated by a trajectory discontinuity, no constraint based on the SLAM-based pose prior is used (as the discontinuity causes the SLAM poses to be invalid), but a weak constraint is added enforcing that the consecutive camera poses should have a similar position and orientation (to preserve the natural temporal smoothness of the camera trajectory). This constraint can be formulated as a tolerant loss, where there is a minimal penalty for camera poses that are within a sufficient threshold of each other, but an increasing penalty as the poses move beyond the predetermined threshold. This constraint can also be formulated to leverage the current velocity (both translational and rotational) to avoid issues of a fixed threshold. Finally, more complex interpolation or machine learning techniques can be utilized to determine an appropriate constraint for the consecutive pairs of images. In addition, assuming that the image acquisition device includes data from an accelerometer, the direction of gravity can be isolated as it exhibits a constant pull on the device, and drift in the vertical direction (the camera poses drifting closer to or farther away from the ground) is minimized compared to lateral motion (left to right) due to this constant frame of reference. This behavior can be leveraged by adding a gravity constraint that constrains a camera's pose to have a gravity direction that is similar to the gravity direction from the SLAM system, and this constraint can be reweighted based on the quality of the SfM estimate or other factors.

After performing bundle adjustment using the constraints defined above, a solution for camera poses and 3D points is available that is more refined than it was initially. Because the camera poses have been updated, it can be beneficial to retriangulate the 3D points from the feature tracks—not only may new 3D points be created, but the number of images that can be successfully associated with each 3D point may increase. Once again, after triangulation is performed, a round of bundle adjustment can be utilized to refine the updated solution. In the example embodiment of the IMDOEM system, two rounds of triangulation and bundle adjustment are performed, but the number of rounds could be arbitrary and dependent on the observed increase in quality of the solution over time.

After the initial reconstruction, a refined camera trajectory is generated, but does not consider loop closures and may contain drift. To compensate for drift (and also to join continuous trajectory segments that were separated by discontinuities), a loop closure and refinement operation is performed. To identify loop closures, parts of the reconstruction are identified that correspond to the same physical parts of the scene, such as by leveraging image pairs that were identified as loop closures. For each loop closure pair, its feature matches are analyzed to determine if the feature matches join any separate tracks that each resulted in the triangulation of a 3D point—if such a case is found, then these two 3D points can be assumed to represent the same physical point in space (but were reconstructed separately based on the division of image pairs into loop closure and non-loop closure categories). Once all of the 3D point pairs are found, a robust (e.g. RANSAC) 3D similarity estimation technique is performed that searches for a rigid similarity transform to align a subset of the 3D point pairs (where the similarity is applied to the first point in each pair, and the new position is compared against the second point in the pair)—if a similarity is found, the inlier points are removed from the candidate set, and the process repeats until no valid 3D similarity can be found. By repeating this process, a list of similarity transforms between pairs of points is formed. For each similarity transform, the pairs of images that are involved in the transformation are stored (view the 3D points that were aligned).

Given the computed similarity transforms between the pairs of images, as well as the initial reconstruction, the solution is now further refined to reflect the detected loop closures. To accomplish this, a set of global solvers (solving for the rotation, translation, and scale for all of the cameras in the dataset) may be used, such as to formulate them by providing a set of constraints as input (relative transformations between images), with the solver seeking to find the best globally-consistent solution. The loop closure similarity transforms that were found between images are provided, as well as the existing transforms between images that were computed in the initial reconstruction (where pairs are added if a valid set of feature matches was found between them), and the loop closure similarity transforms are weighted higher in the solvers than the other transforms extracted from the initial reconstruction to encourage the solution to incorporate the loop closure constraints. Once the new poses for each camera are computed, the feature tracks for each 3D point are re-formed. This time, feature matches from all image pairs are incorporated (instead of just those that were not loop closures). As before, an iterative process of triangulation and bundle adjustment can be used until the model has converged to its final solution (e.g., by using two rounds of triangulation and bundle adjustment in the example embodiment of the IMDOEM system).

The reconstruction method of this example embodiment effectively combines many strengths of both SLAM and SfM analyses, while performing further automated operations to compensate for their weaknesses. For SLAM, long-term drift is mitigated by the incorporation of loop closures and global refinement (global solvers and bundle adjustment). Temporary instability is corrected by bundle adjustment, and trajectory discontinuities are removed via loop closures and bundle adjustment. For SfM, broken or incomplete reconstructions are mitigated by leveraging the increased robustness provided by SLAM-based poses and their corresponding sensor data. Other benefits are also provided by the further automated operations, including to greatly accelerate the speed of processing.

In addition, when the example embodiment of the IMDOEM system operates on the image acquisition device performing an image acquisition system, further processing enables real-time or near-real-time computer model generation and determination of corresponding object attributes (referred to as 'instant measurements' for the purpose of this example). In a manner similar to the reconstruction approach in the above section, data from a SLAM analysis (or other augmented reality system) can be used to help constrain the estimated camera geometry between two or more images. These constraints can be applied in a variety of ways. For example, when imagery is actively being recorded and no loop closure has been found yet, a 3D reconstruction of the scene that has been observed so far is built up, by tracking features from frame to frame, and then estimating the camera motion and triangulating the feature tracks into 3D points. To estimate the camera motion, the SLAM-based camera poses are directly used, with the SLAM analysis thus providing a rigid constraint on the relative geometry of the camera poses. Artifacts in the SLAM-based data (e.g., instability, jumps in trajectory, etc.) can be addressed by performing bundle adjustment on the camera poses and triangulated 3D points, with the SLAM-based poses used as an initialization, and the refined poses constrained to be close to the initialization if possible.

Another way that the SLAM-based pose data provides constraints is in the final estimation of the camera poses, such as when attempting to estimate the final refined set of camera poses, using the SLAM-based poses as initialization, and constraining the bundle adjustment using the SLAM-based data. One way that the SLAM-based data is used is to help constrain the scale of the reconstruction, as the scale of the scene can be ambiguous using imagery alone. AR systems often have an estimate of the true scale of the scene by using the accelerometer and other sensors, so the distance between pairs of cameras from the SLAM-based data can be used to constrain the bundle-adjusted reconstruction to attempt to achieve similar distances. This not only helps determine the scale of the overall reconstruction, but it helps to constrain scale drift in the various intermediate parts of the reconstruction, as each camera can be involved in constraints, which helps avoid cases where one part of the model significantly diverges in scale from other parts. Another way that SLAM-based data is used is to help constrain the curvature or other drift in the reconstruction, as many SLAM-based analyses (e.g., by an AR system such as ARKit from Apple Computer and/or ARCore from Google) has access to additional sensors (accelerometer, gyroscope, magnetometer, etc.), which help provide corrections and constraints within the SLAM-based pose estimation routines. By extracting the relative poses between frames from the SLAM-based data, they can be used as constraints within bundle adjustment to help guide the reconstruction to a better result. Additionally, over long sequences, while the rotation of the SLAM-based trajectory may drift slightly, the accelerometer can continue to provide steady estimates of the direction of gravity. Therefore, when analyzing the amount of drift that can occur in a SLAM-based trajectory, the drift in the vertical direction (parallel to gravity) is significantly reduced compared to the drift in the camera's heading (perpendicular to gravity). With this observation, the orientation of the camera with respect to gravity can be used as an absolute constraint on each camera (as opposed to a relative one between pairs of cameras), yielding a reconstruction that minimizes drift in the vertical direction. SLAM-based data can additionally help constrain the estimate of the camera properties, such as for the focal length (field of view) of the camera that is used in the mapping between 2D image coordinates and 3D coordinates in the scene, as the focal length of the camera can be determined by performing a calibration procedure (using images of a checkerboard, etc.) or determined by using a SLAM-based estimate. As a camera is recording the scene, autofocus is typically active, which allows the camera to adjust its lens to achieve a crisp view of the scene no matter what distance the camera is to the scene, but in many cameras, adjusting the focus also subtly adjusts the focal length. A SLAM-based by an AR system may have access to this data, and can provide estimates of the focal length of the lens in real time as it's performing its autofocus operations, with that focal length estimate being leveraged in our reconstruction, such as to use it as an initialization and constraint for the actual focal length of the lens for each point in time. Biases and errors in the SLAM-based focal length can also be corrected by adjusting the focal length during a bundle adjustment procedure.

In addition to providing constraints to the reconstruction, SLAM-based data can be used by the example embodiment of the IMDOEM system to accelerate the processing of the reconstruction. Some of the accelerations use the SLAM-based data as an initialization (similar to how SLAM-based data was used as an initialization and also constraint in the above section), such as by directly using the SLAM-based poses as an initialization and proceeding with triangulation and bundle adjustment (as opposed to having to compute camera poses from scratch, such as via essential matrix estimation, relative pose estimation, etc.). Additionally, for feature tracks that have already been triangulated, the SLAM-based estimated camera pose for a new image can be used to project the expected positions of those features in the new image, reducing the range within the image that we need to search for the updated position of the feature. The SLAM-based data can also accelerate the keyframe selection process. Typically, keyframe selection is performed by analyzing feature tracks in images, and determining when a new image falls below a certain image overlap criteria (e.g. select a sequence of frames such that each image shares approximately 70% of the same features as the previous image). This process can be accelerated by using the camera motion to more quickly identify images that are likely to be too similar or dissimilar—for example, if the camera pose from the AR system has not changed significantly (no major rotation or translation), then as long as the scene is static, the image content will be highly similar and a new keyframe image is not needed. Similarly, if the camera rotation or translation has changed dramatically, then it is more likely that a new keyframe image should be extracted, as large camera rotation is a strong indicator for a new keyframe (as rotating the camera quickly while not changing translation will cause the scene content to dramatically change). Therefore, if a large rotation has happened and image overlap is at or below our desired threshold, an assumption can be made that the frame should be selected as a keyframe.

In addition, the example embodiment of the IMDOEM system can provide real-time feedback as a stockpile is being measured in several different ways. One type of feedback is to overlay the 2D positions of active feature tracks, to show a user what parts of the image are being tracked and used to form the 3D model, and with the 2D positions optionally colored to convey various information (e.g., based on the length of the track, such as the number of keyframe images in which the track has been observed, to give the user a sense on what parts of the image have been stably tracked over a long time and what other parts are newer and should be visible in additional images in order to be successfully reconstructed; based on triangulation angle, or their triangulation status, such as being observed from an increasing range of angles, so as to convey to the user which 2D features have actually been used to reconstruct parts of the scene, as some 2D features may never be used to reconstruct the scene because they correspond to objects that are too far away and can never be reliably triangulated; etc.). Another type of visualization is to display the current 3D reconstructed scene with the live imagery, such that as the feature tracks are triangulated into 3D points, those 3D points can be projected to the image and displayed. Alternatively, the 3D points can be used as input to a meshing algorithm (such as Delaunay triangulation), and the mesh can be displayed. Either of these methods give the user a view of the underlying 3D data that is being produced, which can help guide them toward parts of the scene that have not been reconstructed yet. In addition, the example embodiment of the IMDOEM system can use one or more orange traffic cones placed in the environment of the stockpile of the object (e.g., 2 cones at a known distance) to assist in reconstructing the stockpile at the correct scale, and a visualization can be displayed in the image that shows the triangulated tip of the cone once enough imagery of the cones has been captured so that the user knows that the cones have been successfully detected.

The example embodiment of the IMDOEM system can identify particular piles through a variety of means. For example, piles can be identified via a customer-supplied database (or file, spreadsheet, etc.), where the GPS location, product type, pile name, etc. are provided, with those locations incorporated into the system and used to generate corresponding virtual signage. In addition, piles can be identified via satellite imagery or visual map, with a pile's location recorded to generate a corresponding virtual sign. In addition, piles can be identified from previous measurements (using ground-based mobile imagery, an aerial flyover of the pile, etc.), with the GPS location of the pile recorded and used to generate a virtual sign. Once a pile has been identified and entered into the system, it may be stored using the GPS boundary of the pile, a representative central GPS position within the pile, etc. When a user then visits the pile in person and views it using augmented reality techniques, a virtual sign can be displayed at or near the previous known position for the pile (and optionally highlight its boundary). If the pile is no longer there, or has moved, its position can be updated in the system by taking a new measurement and associating it with the pile. The association can be done automatically (by comparing the old and new boundaries (or positions) of the piles and seeing if they have sufficient overlap (or are near enough to each other), or manually (the customer or other user associates the old and new positions). Additionally, supplemental information can be used such as the product type to help make the correct association. SLAM-based pose data (such as from ARKit and ARCore) is typically not geo-registered (tied to a global, geographic coordinate system), as GPS data may not be immediately available and precise enough to incorporate, so the 3D coordinate system of the SLAM-based data may be associated by the example embodiment of the IMDOEM system with a GPS position on earth in other manners. One way to accomplish this is by recording the GPS position of the device while a user walks around and records data while the SLAM-based processing is active, so the GPS measurements from the walking path are correlated with the SLAM-based camera trajectory (e.g., by estimating a rigid 2D or 3D similarity between the two coordinate systems). To help deal with outliers and noise (which will likely affect the GPS readings), a RANSAC-based method (random sample consensus) followed by non-linear refinement of the inliers can help improve the accuracy of the results. Alternatively, a robust estimator (a non-linear refinement using a cost function that does not overly penalize large outliers) can be used to converge to an alignment. If available, a magnetometer in the device can also provide heading data (magnetic compass direction) which can help compute the orientation of the alignment in cases where the camera trajectory's extent is similar to the amount of noise in the GPS readings (and thus correlating the rotation between the GPS and AR coordinates is difficult). Once a correlation between the AR and GPS coordinates systems has been established, global GPS coordinates for virtual signs can be used to place them in the visualization using augmented reality techniques.

It will be appreciated that the details discussed above with respect to the example non-exclusive embodiments are provided for illustrative purposes, and that the described techniques are not limited to these example details.

Figure 3:
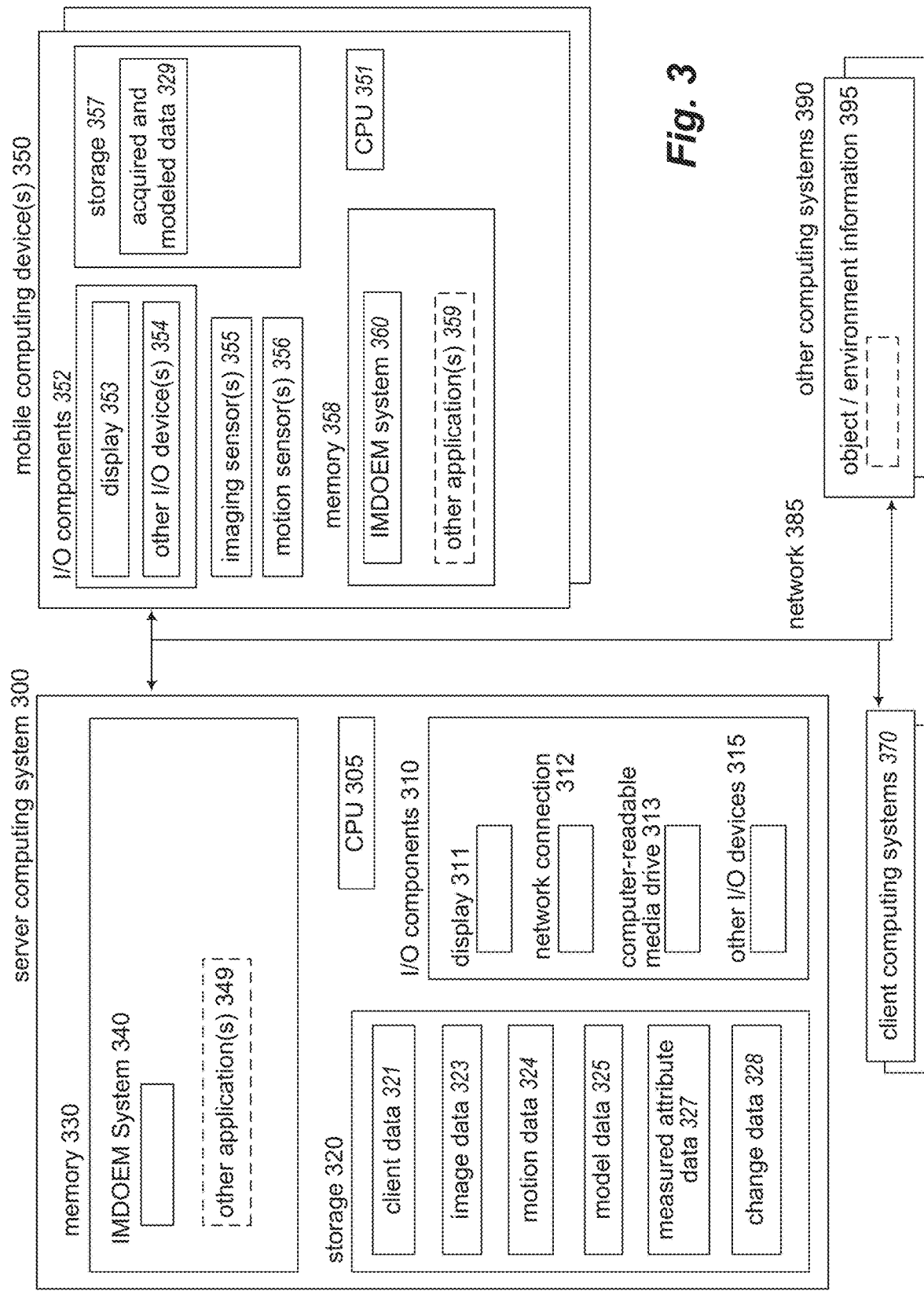
FIG. 3 is a block diagram illustrating computing systems suitable for executing embodiments of a described system for analyzing acquired images with visual data of an object and other associated image acquisition metadata to assess volume and/or other attributes of one or more objects.

FIG. 3 is a block diagram illustrating an embodiment of computing devices (e.g., a server computing system 300 and/or a mobile computing device 350) that are suitable for performing at least some of the described techniques, such as by the server computing system 300 executing an embodiment of an IMDOEM system 340 and/or by the mobile computing device 350 executing an embodiment of an IMDOEM system 360, with the one or more executing IMDOEM systems providing an Image and Motion Data-based Object Exterior Modeling service available to various clients in this example. The example server computing system 300 includes one or more central processing unit ("CPU") hardware processors 305, various input/output ("I/O") components 310, storage 320, and memory 330, although in other embodiments multiple such server computing systems may operate together to execute the system 340 in a distributed manner. Illustrated I/O components in this example embodiment include a display 311, a network connection 312, a computer-readable media drive 313, and other I/O devices 315 (e.g., keyboards, mice or other pointing devices, microphones, speakers, etc.)—such I/O components may enable a variety of types of interaction types, including, for example, voice control, gesture control, etc.

One or more example mobile computing devices 350 are illustrated as including similar components, such as by each similarly having one or more CPU hardware processors 351, one or more I/O components 352 (including a display 353 and other I/O devices 354), storage 357 (e.g., to store acquired and model data 329, such as some or all of the data 321-328 illustrated in storage 320 of server computing system 300), and memory 358 to optionally execute the IMDOEM system 360 and/or one or more other software applications 359—in other embodiments, one or more separate local computing devices may include such computing capabilities and perform corresponding analysis activities after receiving images acquired by one or more other camera devices. In this example embodiment, each mobile computing device 350 further includes one or more imaging sensors 355 to enable it to act as a camera device or other image acquisition device and acquire images, one or more motion sensors 356 (e.g., one or more IMU sensors) to acquire motion data of the mobile computing device, and optionally other sensors and components (not shown), such as an altimeter, light detector, GPS receiver, one or more external lights, etc. The other computing systems 370 and 390 may similarly include some or all of the same types of components as the server computing system 300 and/or devices 350, but such components are not illustrated in this example for the sake of brevity. The server computing system 300 and devices 350, and the IMDOEM systems 340 and 360, may also communicate with each other and/or other computing devices and systems in various manners, including via one or more networks 385 (e.g., the Internet, one or more cellular telephone networks, etc.).

As images and associated image acquisition metadata is acquired by the one or more mobile computing devices, that data is provided to and used by the IMDOEM system 340 is executing in memory 330 of the server computing system 300 and/or by the IMDOEM system 360 executing in memory 358 of the mobile computing device 350—while modules and submodules of the IMDOEM systems 340 and 360 are not illustrated in this example, one or both of the IMDOEM systems 340 and 360 may include such modules and submodules, such as to each have some or all of the modules and submodules illustrated in FIG. 1 with respect to IMDOEM system 160. The systems 340 and/or 360 (and their modules and/or submodules, if any) may in some embodiments include software instructions that, when executed, program or otherwise configure the processor(s) 305 and the server computing system(s) 300, and/or the processor(s) 351 and the device(s) 350, to perform automated operations that implement at least some of the described techniques.

For example, the IMDOEM system 340 may obtain and use various information as part of its automated operations, such as client data 321, image data 323, motion data 324, model data 325, measured attributed data 327 and change data 329 on storage 320 of the server computing system 300 (e.g., in one or more database tables or other data structures)—such data and its use may be similar to that described with respect to data 161-166 of FIG. 1 and/or elsewhere herein, and the data 329 stored on storage 357 of the mobile computing device 350 may similarly include some or all of the same types of data. For example, the IMDOEM system 340 may obtain various types of client-related information from users or other entities that act as clients of the system 340, such as by interacting with corresponding client computing systems 370 (e.g., via a corresponding module that enables clients to register with the system 340 and/or to provide other types of client-specific information), and may store some or all such information in client data 321 on storage 320. While not illustrated here, in other embodiments some or all of the IMDOEM system may execute on behalf of a single client or a single entity (e.g., an organization with multiple employees or other members). In addition, the IMDOEM system may further obtain and use additional types of data in at least some embodiments, such as information about particular objects, object types (e.g., materials) and/or object environments from one or more other computing systems 390. Such other information may be used in various manners when analyzing images, determining object attribute values and/or presenting corresponding information to clients, as discussed elsewhere herein.

It will be appreciated that the illustrated computing systems and devices are merely illustrative and are not intended to limit the scope of the present invention. For example, computing system 300 and/or device(s) 350 may be connected to other devices that are not illustrated, including through one or more networks such as the Internet or via the Web. More generally, a "client" or "server" computing system or device may comprise any combination of hardware that can interact and perform the described types of functionality, such as when programmed or otherwise configured with software, including without limitation desktop computers, laptop computers, slate computers, tablet computers, embedded computers, specialized hardware such as ASICs or other computers, smart phone computing devices and other cell phones, Internet appliances, PDAs and other electronic organizers, database servers, network storage devices and other network devices, wireless phones, pagers, television-based systems (e.g., using set-top boxes and/or personal/digital video recorders and/or game consoles and/or media servers), and various other consumer products that include appropriate inter-communication capabilities. For example, the illustrated system 340 and/or its modules may include executable software instructions and/or data structures in at least some embodiments, which when loaded on and/or executed by particular computing systems or devices may be used to program or otherwise configure those systems or devices, such as to configure processors of those systems or devices. Alternatively, in other embodiments, some or all of the software modules and/or systems may execute in memory on another device and communicate with the illustrated computing system/device via inter-computer communication. In addition, while various items are illustrated as being stored in memory or on storage at various times (e.g., while being used), these items or portions of them can be transferred between memory and storage and/or between storage devices (e.g., at different locations) for purposes of memory management and/or data integrity. Furthermore, the functionality provided by the illustrated system modules may in some embodiments be combined in fewer modules or distributed in additional modules. Similarly, in some embodiments the functionality of some of the illustrated modules may not be provided and/or other additional functionality may be available.

Thus, in at least some embodiments, the illustrated modules and/or systems are software-based modules/systems including software instructions that, when executed by the CPU(s) 305 and/or CPU(s) 351 and/or other processor means, program the processor(s) to automatically perform the described operations for that module/system. Furthermore, in some embodiments, some or all of the modules and/or systems may be implemented or provided in other manners, such as at least partially in firmware and/or hardware means, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the systems, modules or data structures may also be stored as contents (e.g., as software instructions contents or structured data contents) on a non-transitory computer-readable storage medium, such as a hard disk or flash drive or other non-volatile storage device, volatile or non-volatile memory (e.g., RAM), a network storage device, or a portable media article (e.g., a DVD disk, a CD disk, an optical disk, a flash memory device, etc.) to be read by an appropriate drive or via an appropriate connection. The systems, modules and data structures may also in some embodiments be transmitted as generated data signals (e.g., as part of a carrier wave or other analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present invention may be practiced with other computer system configurations.

FIG. 4 is an example flow diagram of an illustrated embodiment of an IMDOEM (Image and Motion Data-based Object Exterior Modeling) System routine 400. The routine may be provided by, for example, execution of an embodiment of the IMDOEM system 160 of FIG. 1, the IMDOEM systems 340 and/or 360 of FIG. 3, and/or the IMDOEM system discussed with respect to FIGS. 2A-2P and 10A-10D and elsewhere herein, such as to perform activities for clients of an IMDOEM service being provided by the IMDOEM system, including to acquire and analyze images via one or more image acquisition devices (e.g., mobile computing devices with imaging sensors and/or fixed-location camera devices) to identify one or more objects represented in a group of acquired images (e.g., with respect to previously modeled objects), to estimate values for one or more attributes of an object included in the images based on a combination of visual data in at least some of the images and associated image acquisition metadata, to display or otherwise present information to users about various types of acquired and determined information, and to optionally determine changes in objects and object attribute values over time and/or perform automated verification of such attribute values in various manners. It will be appreciated that the routine 400 may be performed by one or more configured devices or systems.

The routine begins in block 405, where instructions or information is received. The routine continues to block 410 to determine whether an instruction is received to register a new client of the IMDOEM Service and/or to modify existing information for such a client, and if so continues to block 415 to obtain corresponding client information and to perform a registration for the client. In at least some embodiments, the client information obtained may include information about, for example, notification preferences or other instructions (e.g., for use in providing information to a client about one or more analyzed attributes for an object of interest to the client, such as based on images of the object and associated image acquisition metadata supplied by the client), and/or other types of client preferences and information (e.g., mobile devices that are registered for the client to provide image information, user representatives of the client who are authorized to perform particular activities, etc.). As discussed below with respect to block 485, the routine may in some embodiments display a GUI to present various types of information to a system operator user representative of a client, to an end-user representative of a client, or to another user. While not illustrated in this example routine, the routine may further, in at least some embodiments, provide the same or different user interfaces via which a user may further interact with the IMDOEM system, such as via which the user may perform other activities (e.g., to register a client and/or obtain information about previous activities performed for the client). Such GUI(s) or other user interface(s) may, for example, be provided over the Internet or other network to one or more computing devices of the client's user representative, such as via a Web browser executing on those client devices, and/or may be provided at least in part by an application program of the IMDOEM system that is downloaded to and executed on a mobile device or other configured device of the client's user representative (e.g., a client-side application that includes one or more modules of the IMDOEM system). Additional details are included herein related to example GUI screens that may be used in some embodiments.

After block 415, or if it is instead determined in block 410 that the information or instructions received in block 405 are not to register client information, the routine continues to block 420 to determine whether instructions or information have been received in block 405 related to doing modeling of one or more objects of interest using images of the object(s) and image acquisition metadata, such as on behalf of a client that has just been registered in block 415 or instead for a previously registered client, or instead on behalf of the operator of the IMDOEM system. For example, such a received indication may be based on a human user indicating via a mobile computing device or other configured device to the IMDOEM system that an image acquisition session is about to begin for one or more objects of interest, based on such a mobile device and/or a fixed-location camera device beginning to supply one or more acquired images as part of a new image acquisition session, based on the IMDOEM system providing a reminder or other instructions to a human user and/or to a fixed-location camera device and/or to a device that moves under its own power to begin an image acquisition session (e.g., in accordance with previously defined instructions for a corresponding client), etc. If so, the routine continues to perform blocks 430 and 440 and optionally blocks 450 and/or 455, whether serially or concurrently, and in some cases multiple times (e.g., if one or more partial 3D computer models are generated based on a partial image acquisition session, optionally followed by one or more further partial 3D computer models as additional parts of the image acquisition session are performed, and then followed by a final or completed 3D computer model once the image acquisition session is completed). In this example embodiment, the blocks 430-455 are discussed with respect to modeling a single object at a time (optionally followed immediately by modeling another object at the same site), although in other embodiments multiple objects may simultaneously being modeled in one or more image acquisition sessions using one or more image acquisition devices.

Figure 5A:
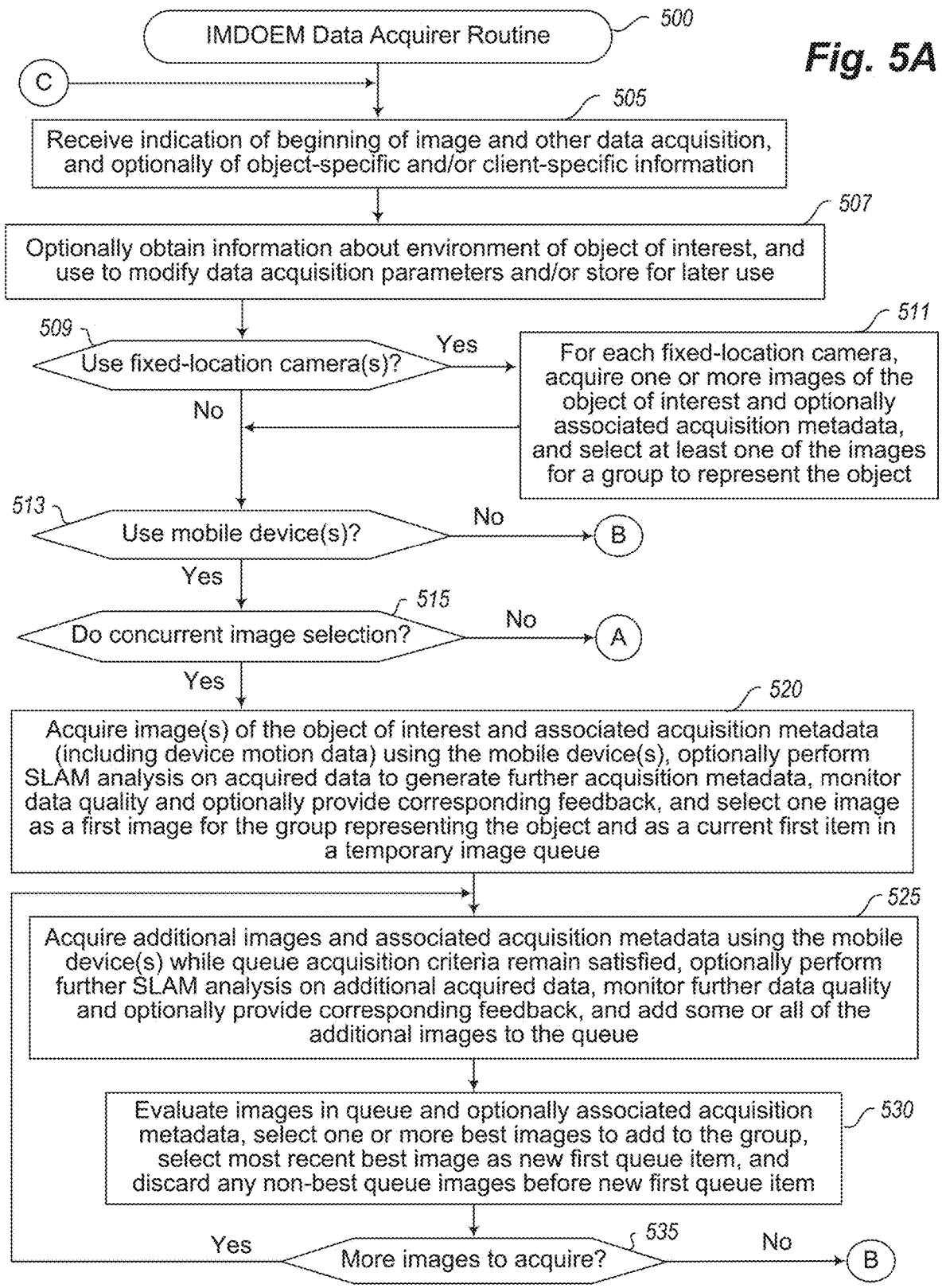
FIGS. 5A-5B are an example flow diagram of an illustrated embodiment of an IMDOEM Data Acquirer routine.
Figure 5B:
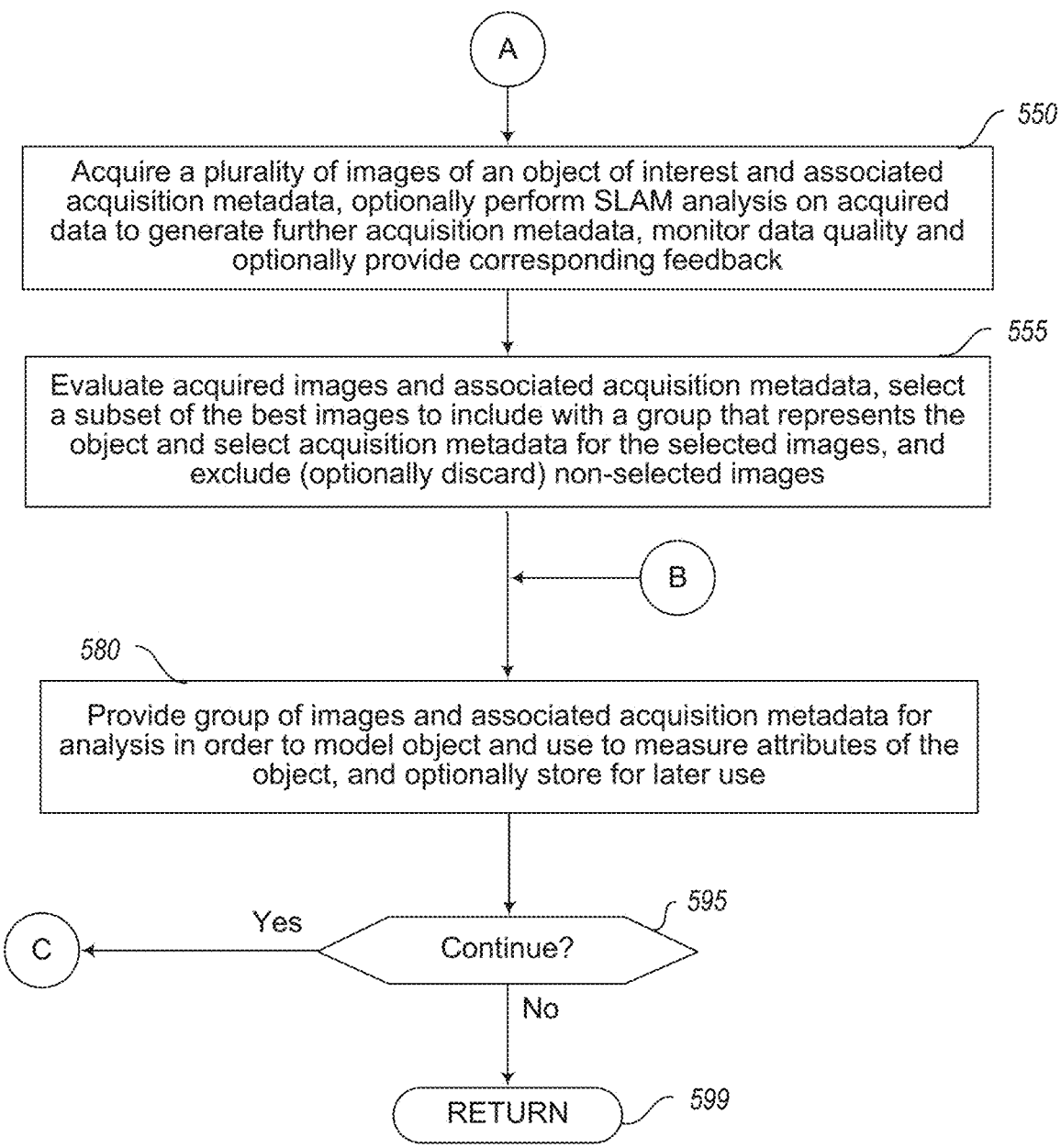

In at least some embodiments, the routine continues after block 420 to block 430 to execute an IMDOEM Image Acquisition routine, such as by executing one or more image acquisition modules of the IMDOEM system, and including to perform part or all of an image acquisition session for an object of interest that includes acquiring images of the object and associated image acquisition metadata—one example of such an IMDOEM Image Acquisition routine is discussed in greater detail with respect to FIGS. 5A-5B. In addition, the routine may continue to perform block 440 (e.g., after performing block 430), including executing one or more object model/attribute determiner modules or submodules of the IMDOEM system to generate one or more 3D computer models (e.g., partial 3D computer models, full completed 3D computer models, etc.) that represent the object of interest (e.g., using images and associated image acquisition metadata just acquired with respect to block 430 or instead at least partially with respect to previously acquired and stored images and associated image acquisition metadata), and to use the model(s) to determine one or more attribute values for the object(s) after the model(s) are completed (and in some cases to determine preliminary attribute values of one or more types using a partial 3D computer model, such as with respect to type of materials, object height and/or width, etc.)—one example of such an IMDOEM Object Model/Attribute Determiner routine is illustrated in greater detail with respect to FIGS. 6A-6B.

In addition to performing blocks 430 and/or 440, the routine may further perform block 450 to identify an object based on a group of acquired images and/or associated image acquisition metadata, such as to use GPS data or other location metadata to identify an object previously at a corresponding location, to attempt to match images of the object or a generated 3D computer model from block 440 to information for one or more previously modeled objects (e.g., to determine if an object represented by a group of acquired images corresponds to a changed object that was previously modeled, or is instead a new object), etc. In some embodiments and situations, such automated object identification may not be performed, such as if the group of acquired images are known to represent a particular object (e.g., if a single object is repeatedly modeled at different times to determine changes in the object, if user input or other information specifies the object(s) for the images without performing automated identification, etc.). Additional details are described elsewhere herein regarding performing such object identification. Furthermore, in addition to performing blocks 430 and/or 440, the routine may further perform block 455 to display or otherwise present information to an IMDOEM system operator user (e.g., a user representative of a client) who is participating in the image acquisition session, such as during the image acquisition session (e.g., based on a partial 3D computer model generated in block 440) and/or upon conclusion of the image acquisition session (e.g., based on a final completed 3D computer model generated in block 440)—the performance of block 455 may include executing an object information visualizer module of the IMDOEM system, with one example of such an IMDOEM Object Information Visualizer routine being illustrated in greater detail with respect to FIG. 9. After performing some or all of blocks 430-455, the routine continues to block 457 to determine whether the image acquisition session and corresponding object modeling of the object is complete, and if not returns to perform another iteration of one or more of blocks 430-455 (e.g., to acquire additional images and associated image acquisition metadata, and to optionally generate a new corresponding 3D computer model based in part on that additional data, and to optionally display information to the IMDOEM system operator user using that new 3D computer model or other newly acquired data in block 430).

After it is determined in block 457 that object modeling is complete, or in block 420 that the instructions or other information received in block 405 are not to do object modeling, the routine continues to block 460, where it determines whether the information or instructions received in block 405 correspond to verifying one or more attribute values and/or the corresponding computer model(s) for one or more objects of interest, such as for a 3D computer model just generated in block 440 and/or for attribute values just determined in block 440, or instead with respect to one or more previously generated 3D computer models and/or previously acquired and stored attribute values. If so, the routine continues to block 465 to perform an IMDOEM Object Model/Attribute Verifier routine, such as by executing one or more corresponding verifier modules of the IMDOEM system—one example of such an IMDOEM Object Model/Attribute Verifier routine is illustrated in greater detail with respect to FIG. 7.

After block 465, or if it is instead determined in block 460 that the instructions or information received in block 405 are not related to performing automated operations to verify a generated 3D computer model and/or attribute values determined from such a computer model, the routine continues to block 470 to determine whether the instructions or information received in block 405 include determining change information over one or more times for one or more objects (and/or for a site or other location that includes one or more objects), whether for generated 3D computer model(s) and/or determined attribute values just performed with respect to block 440 or instead for previously determined object attribute information. If so, the routine continues to block 475 to perform an IMDOEM Object Change Determiner routine, such as by executing one or more corresponding information change determiner modules of the IMDOEM system, with one example of such an IMDOEM Object Change Determiner routine being illustrated in greater detail with respect to FIG. 8.

After block 475, or if it is instead determined in block 470 that the instructions or information received in block 405 are not related to performing automated operations to determine change information for one or more objects, the routine continues to block 480 to determine whether the instructions or information received in block 405 include providing object model information and/or measured attribute information and/or determined change information and/or verified attribute values to a client and/or other source, whether for generated 3D computer models (e.g., a final completed 3d computer model) and/or determined attribute values just performed with respect to block 440, or instead for previously generated computer model(s) and/or previously determined object attribute information, and/or for change information determination just performed with respect to block 475 or instead for previously determined change information, and/or for model/attribute value verification just performed with respect to block 465 or instead for previously determined object model/attribute verification information. If so, the routine continues to block 485 to perform an IMDOEM Object Information Visualizer routine, such as by executing one or more corresponding information visualizer modules of the IMDOEM system, with one example of such an IMDOEM Object Information Visualizer routine being illustrated in greater detail with respect to FIG. 9, corresponding to using a GUI to perform interactions with one or more users. While not illustrated in FIG. 9, in other embodiments such a routine may include generating and providing one or more reports for a client or other user (whether in addition to or instead of performing user interactions via a GUI), such as by retrieving corresponding information of interest, optionally formatting the information in an indicated manner, and providing it to the user—as previously noted, in some embodiments, the providing and/or formatting of information for a client may be performed in manners previously indicated by the client, such as with respect to preferences specified by the client. Such reports are able to be provided to the client in various manners (e.g., an electronic report sent over one or more networks via one or more electronic communications, a paper-based report, etc.).

If it is instead determined in block 480 that the information or instructions received in block 405 are not to provide model object information and/or measured attribute information via a GUI presentation or other display, the routine continues instead to block 490 to perform one or more other indicated operations as appropriate. For example, the operations performed with respect to block 490 may include requesting or otherwise receiving additional information of one or more types about objects and/or their environments, with such additional information optionally being used as part of blocks 430-455. In addition, the operations performed with respect to block 490 may, in at least some embodiments, allow a client to perform a variety of other types of actions with respect to the IMDOEM system, such as to schedule notifications or activities for future times, to retrieve and monitor information about previous activities, etc. While not illustrated here, in some embodiments the routine may perform further interactions with a client or other end user, such as before, during or after providing information to the client in blocks 485 and/or 490, as discussed in greater detail elsewhere herein.

After blocks 485 or 490, the routine continues to block 495 to determine whether to continue, such as until an explicit indication to terminate is received. If it is determined to continue, the routine returns to block 405, and otherwise continues to block 499 and ends.

FIGS. 5A-5B are an example flow diagram of an illustrated embodiment of an IMDOEM Image Acquirer routine 500. The routine may be performed by, for example, the IMDOEM system 160 of FIG. 1 (e.g., part of the image acquisition sub-system 168), the IMDOEM system 340 and/or 360 of FIG. 3, and/or the IMDOEM system discussed with respect to FIGS. 2A-2P and elsewhere herein, such as to perform an image acquisition session that involves acquiring one or more images of one or more objects of interest and associated image acquisition metadata via one or more image acquisition devices (e.g., mobile computing devices with imaging sensors and/or fixed-location camera devices), selecting at least some of the acquired images to be a group that represents the object(s) of interest for additional processing, and optionally providing user feedback to a human user operator of the image acquisition device(s), including based on monitored quality and problem detection with respect to acquired images and/or acquired image acquisition metadata. The routine may be invoked in various manners in various embodiments and situations, including with respect to block 430 of FIG. 4. In the illustrated embodiment, a plurality of images can be acquired in a session (e.g., by a mobile computing device with imaging sensors) with a subset of those images being selected to be the representative group, or a single image can be acquired for a session (e.g., from a fixed-location camera device) and/or used in the group for that session to represent one or more objects of interest, although in other embodiments all acquired images may be selected and used as such a group. In addition, in the illustrated embodiment, the image selection may be performed dynamically and concurrently with the image acquisition or may be performed after all of the images have been acquired, although in other embodiments only one of these two image selection alternatives may be used.

In the illustrated embodiment, the routine 500 begins at block 505, where an indication is received (e.g., for a previously scheduled acquisition activity, from dynamically triggered conditions, from an operator of a mobile device, etc.) of a beginning of an image acquisition session, and other object-specific and/or client-specific information may further be obtained and associated with the acquired images in at least some embodiments. For example, in embodiments in which the IMDOEM system provides services to multiple clients, a current mobile device operator may verbally or otherwise indicate a client identifier or other indication of a current client with which the images are to be associated, although in other embodiments, the later transmission or other providing of the images and associated image acquisition metadata to a remote server for further processing may instead include such client-related information (e.g., based on a mobile computing device and/or fixed-location camera device performing the transmission). In a similar manner, the mobile device operator may include a tag or other information related to one or more objects of interest to be acquired in the images, such as to assist in later identifying those specific objects (e.g., if a variety of objects exists and will each be acquired in successive image acquisition sessions).

After block 505, the routine continues to block 507 to optionally obtain information about the environment of the object, such as light levels, location, elevation, a deviation from level (if any) of a base surface on which the object of interest rests, etc. While not illustrated here, in some embodiments, such information may further be used in various manners, including to automatically adjust parameters or settings to be used for the image acquisition session by the mobile computing device(s) and/or fixed-location camera device(s), as part of later registering the images and a resulting model with respect to location, scale, and/or orientation, etc. The obtained information about the environment in block 507 may further in some embodiments include information about a scale of an object of interest, a distance from the camera device to the object, etc., whether measured by one or more capabilities of the camera device or other equipment at or near the operator, or instead by using artificially introduced objects or information to enable such information to later be determined (e.g., a marker or target or object of known length, height, degree of level, etc., such as one or more traffic cones at specified locations and/or at specified distance from each other, known control points, etc.).

After block 507, the routine continues to block 509, where it determines whether the images are to be acquired from one or more fixed-location camera devices (whether in addition to or instead of other images from one or more other mobile computing devices), and if so continues to block 511 to, for each of the fixed-location camera devices, acquire one or more images of the one or more objects of interest, optionally acquire associated image acquisition metadata if the fixed-location camera device supports such functionality, and select at least one of the acquired images to be used in a group to represent the object(s). The operations in block 511 may further optionally include monitoring quality or other aspects of the acquired images and optionally acquired image acquisition metadata in some embodiments and situations, such as to ensure that they satisfy one or more minimum thresholds or other minimum standards for the images to include in the group (e.g., by determining image aspects such as contrast, sharpness, lighting levels, etc., as well as identifying particular object features for use in later image selection) and/or for image acquisition metadata to be used to determine acquisition poses or other image acquisition metadata, as well as to optionally provide feedback and/or additional instructions to the fixed-location camera devices (and/or a user operator of them) if the initial images and/or image acquisition metadata are not sufficient (to enable reacquisition of additional initial images and optionally associated image acquisition metadata using different settings and/or until satisfactory data is obtained).

After block 511, or if it is instead determined in block 509 that the images are not to be acquired from any fixed-location camera devices, the routine continues instead to block 513, where it determines whether at least some of the images are to be acquired from one or more mobile camera devices, and if so continues to block 515 to determine whether to perform selection of the group of images for the object concurrently with their acquisition, or instead after all of the images have been acquired. If it is determined in block 515 to not perform the image selection concurrently during image acquisition, the routine continues to block 550 where it acquires a plurality of images of the one or more objects of interest and associated image acquisition metadata (e.g., motion data from IMU sensors), optionally generates further acquisition metadata (e.g., by performing a SLAM analysis using the acquired motion data and images), and then proceeds to block 555 where it evaluates all of the acquired images relative to each other and selects some or all of the acquired images as the best images to include as a group that represents the object(s), and optionally discards or otherwise excludes other non-selected images (if any). The evaluation of all of the acquired images relative to each other may be based on one or more determined metrics, such as to assess quality or other aspects of the images (e.g., contrast, relative motion between two or more images, lighting levels, coverage of some or all of the object, overlap with one or more prior selected images of the group, etc.), and in some embodiments and situations may be based at least in part on associated image acquisition metadata for those images. The selection of the best images and/or the determination of when the queue acquisition criteria are satisfied may be performed in various manners in various embodiments, as discussed in greater detail elsewhere herein, including by generating graph information corresponding to overlapping images and doing a least-cost path traversal of the graph, and/or based at least in part on tracking object features across multiple images (e.g., to determine when particular features are no longer present).

If it is instead determined in block 515 to perform the image selection concurrently during image acquisition, the routine continues to block 520, where it acquires one or more initial images for an object of interest along with associated image acquisition metadata (e.g., motion data from IMU sensors), optionally generates further acquisition metadata (e.g., by performing a SLAM analysis using the acquired motion data and images), and selects one of the initial images as a first image in the group (as well as a current first item in an image queue to be used to temporarily store images being acquired until selected images are determined). The operations in block 520 may further include monitoring quality or other aspects of the initial images and/or associated image acquisition metadata in some embodiments and situations, such as to ensure that they satisfy one or more minimum thresholds or other minimum standards for the images to include in the group (e.g., by determining image aspects such as contrast, sharpness, lighting levels, etc., as well as identifying particular object features for use in later image selection) and/or the acquisition metadata to use to determine acquisition poses and/or other further acquisition metadata, as well as to optionally provide feedback to the mobile camera device (and/or a user operator of it) if the initial images and/or image acquisition data are not sufficient (to enable reacquisition of additional initial images until a satisfactory image is obtained). After block 520, the routine continues to blocks 525-535 to repeatedly acquire additional images and associated image acquisition metadata until one or more of those additional images are selected for the group, with other of those additional images that are not selected being discarded or otherwise excluded from further use in at least some embodiments and situations. In particular, in block 525, the routine continues to acquire additional images and associated image acquisition metadata until one or more queue acquisition criteria are reached (e.g., based on a quantity of images, amount of time, amount of distance traveled by the operator, amount of difference between two or more images in the queue, loop closing, etc.). After each of some or all of the additional images are acquired, a quality and/or other aspects of the image and/or of its image acquisition metadata is monitored in this embodiment, such as to enable images that do not satisfy minimum thresholds or minimum satisfaction criteria to be discarded from the queue (or not placed in the queue) and/or to enable user feedback to be provided to the user regarding the problems with the images and/or image acquisition metadata being acquired (e.g., to enable the user to improve the quality of future images and/or image acquisition metadata that are acquired, whether at different locations or to reacquire one or more of the images that were not satisfactory).

After block 525, the images that are currently in the queue are evaluated, such as to enable one or more of the best images to be selected to be added to the group, based on one or more determined metrics used for the evaluation (e.g., contrast, relative motion between two or more images, lighting levels, coverage of some or all of the object, overlap with one or more prior selected images of the group, etc.), and optionally based at least in part on the associated image acquisition metadata for the images. The selection of the best images and/or the determination of when the queue acquisition criteria are satisfied may be performed in various manners in various embodiments, as discussed in greater detail elsewhere herein, including based at least in part on tracking object features across multiple images (e.g., to determine when particular features are no longer present). After one or more such best images are selected, the selected best images are added to the group, and other item images in the queue before the most recent such best image are discarded in the illustrated embodiment, although in other embodiments such other images may be retained but not included in the group. Similarly, the image acquisition data for at least the images in the group are stored for subsequent use, with other image acquisition data (e.g., all image acquisition data) being also stored for subsequent use in some embodiments or instead being discarded or otherwise excluded from further use in other embodiments. After block 530, the routine continues to block 535 to determine whether there are more images to acquire in this session, such as until an entire exterior of one or more objects of interest has been captured, or otherwise until the image acquisition session is determined to be completed. If there are more images to acquire, the routine returns to block 525, and otherwise continues to block 580. Furthermore, after the image acquisition session is completed, various types of housekeeping operations may be performed, such as to delete the temporary queue, to remove some or all of the acquired images from the mobile device (e.g., after they are provided to a remote server in block 580), etc.

After block 555, or if it is determined in block 513 that images are not currently being acquired from one or more mobile camera devices, or in block 535 that there are not more images to acquire during a concurrent image acquisition and selection session, the routine continues to block 580, where the selected group of images from the concurrent or non-concurrent image selection processes is provided as output of the routine, along with the associated image acquisition data for at least those images of the groups (and in some embodiments for all acquired images), for additional analysis in order to measure one or more attributes of the object, with such images and associated image acquisition metadata optionally being stored for later use. As discussed in greater detail elsewhere, in some embodiments, some or all of the image acquisition activity discussed with respect to routine 500 may occur on one or more mobile computing devices that are used to acquire the images, and/or on one or more fixed-location camera devices and optionally their associated local computing devices, such as under control of one or more modules of the IMDOEM system, and if so, the providing operations performed in block 580 may include transmitting or otherwise providing the selected group of images to one or more remote computing devices (e.g., server computing systems), although in other embodiments, all operations of the IMDOEM system may be performed by one or more mobile computing devices and/or by a fixed-location camera device and its optional associated local computing device without such transmittal to a remote computing device.

After block 580, the routine continues to block 595 to determine whether to continue, such as until an explicit indication to terminate is received, or instead based on the completion of the routine after an invocation performed by another routine (e.g., such as in block 430 of FIG. 4). If it is determined to continue, the routine returns to block 505, and otherwise continues to block 599 and returns.

Figure 6A:
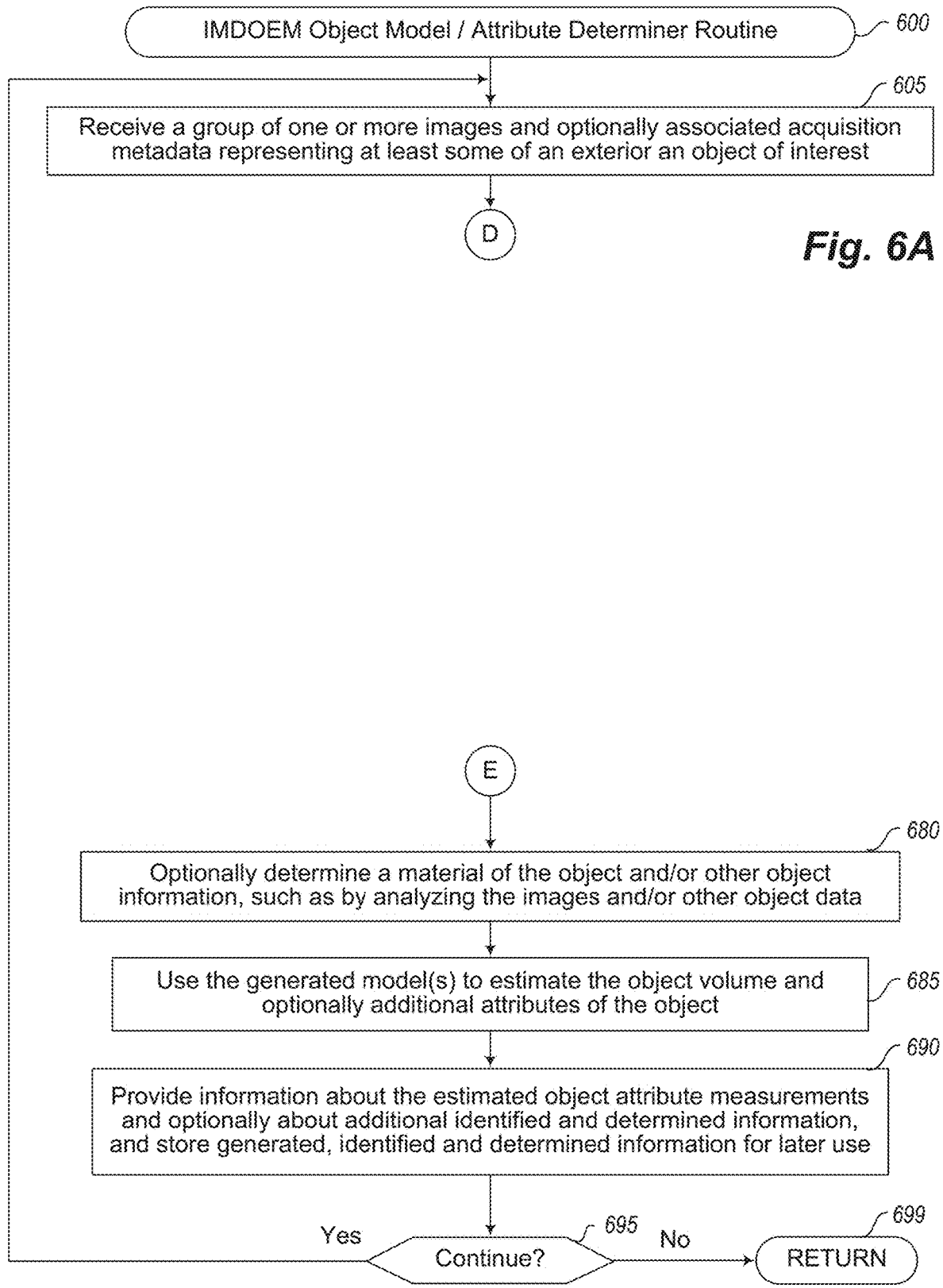

FIGS. 6A-6B are an example flow diagram of an illustrated embodiment of an IMDOEM Object Model/Attribute Determiner routine 600. The routine may be performed by, for example, execution of the IMDOEM system 160 of FIG. 1 (e.g., the Object Model/Attribute Determiner module 174), the IMDOEM system 340 and/or 360 of FIG. 3, and/or the IMDOEM system discussed with respect to FIGS. 2A-2P and elsewhere herein, such as to analyze a selected group of images that represents an object and associated image acquisition metadata in order to determine one or more values for attributes of interest for the object, as well as to provide corresponding information to a client. The routine 600 may be invoked in various manners in various embodiments and situations, including with respect to block 440 of FIG. 4. In addition, while the illustrated embodiment of the routine 600 includes generating a 3D computer model and using that model to measure attributes of interest, the attribute value determination activities may be performed in other manners in other embodiments.

The routine 600 begins at block 605, where an indication is received of a group of selected images and associated image acquisition metadata (if a mobile computing device is used to acquire at least some of the images) that are captured at a given time to represent one or more objects of interest at that given time. The routine continues to block 610 to analyze the images and any associated image acquisition metadata to, for each of the one or more objects, identify portions corresponding to the object and to optionally exclude other non-object portions (e.g., of the ground or other underlying base surface), and to further identify any obstructions between the camera and the object (e.g., temporary obstructions) and any temporary problems for the images. As part of the analysis, the image acquisition metadata may be analyzed to determined acquisition pose information and other related metadata regarding the acquired images, and multiple images captured at the given time may be aligned, as discussed in greater detail elsewhere herein. In addition, the obstruction identification may, for example, include supplying the images to a trained neural network classifier to identify specific types of intervening elements between the camera and the object, or more generally to identify differences in one or more factors between other data for the object and data for the intervening element (e.g., with respect to color, texture, shape, distance, etc.), as discussed in greater detail elsewhere herein. In addition, the identification of other temporary problems may include performing various types of analyses of the visual content of the images (e.g., identifying quality problems) and/or receiving information from a previous analysis of the images that is part of an image selection process during the image acquisition session (e.g., to select a subset of acquired images to use in a group to represent an object), as discussed in greater detail elsewhere herein.

After block 607, the routine continues to block 610, where it determines whether the images analyzed in block 607 are from only one or more fixed-location camera devices that have only a partial view of the object (i.e., with gaps of one or more omitted surfaces, and such as based on previous configuration information supplied with respect to the visual coverage of particular fixed-location camera devices with respect to objects in their visual coverage). If not, the routine continues to block 660, where it generates a model or other representation of the object (optionally based on further analysis of the images and associated image acquisition metadata, including to align multiple images captured at the given time if not previously performed), such as by generating a point cloud model in which portions of the images of the selected group that correspond to the object are separated from other portions of the images that are not part of the object (e.g., part of a base plane or other base service on which the object rests). Such a point cloud may include a mesh of numerous 3D data points representing the surface of the object that are extracted from data of the images, and additional interpolation or other fitting of the object surface between the 3D data points. The generating of the point cloud model may further be based in some embodiments at least in part on tracking particular object features through multiple of the selected images, and using such information from the multiple images to determine relative 3D locations of each feature with respect to one or more other features. In some embodiments, the routine may optionally further generate an additional model or other representation of some or all of the base surface on which the object is situated.

If it is instead determined in block 610 that the images acquired at the given time in the group do have gaps in their visual coverage of an object of interest, the routine continues instead to block 615, where it determines whether to use prior acquired images and/or of a corresponding prior model from an earlier time before the given time to supplement the images and any associated image acquisition metadata captured at the given time—the determination may be based, for example, on whether any such prior information is available, as well as on previously specified configuration information for the one or more fixed-location camera devices used (e.g., to not use prior data for a situation in which multiple fixed-location camera devices in a particular environment provide visual coverage of a particular object above a specified percentage of the surface of the object). If it is determined to use such prior data, the routine continues to block 640, where it retrieves corresponding prior images (e.g., previously acquired by one or more mobile computing devices) and/or a corresponding prior model of the object generated from such prior images, and in block 645 proceeds to determine a common coordinate system for the prior images and the images in the group that were captured at the given time, such as to align the prior and current images. After block 645, the routine continues to block 650, where it generates a model or other representation of the object (e.g., based on further analysis of the images) and any associated image acquisition metadata, such as by generating a point cloud model for a subset of the object that is visible in the images of the selected group (e.g., in a manner similar to that discussed with respect to block 660, and in greater detail elsewhere herein), and using additional visual data from the prior images and/or prior model to estimate shapes for at least some additional surface areas of the object. In addition, one or more omitted surfaces from the images captured at the given time may be further estimated in other manners in other embodiments (e.g., if the prior data does not provide full visual data of that omitted surface), including via use of interpolation, extrapolation, flat or curved regular shape fitting, using estimated slope information, using a fitted type of geometrical shape, etc.

If it is instead determined in block 615 to not use prior data to supplement the images captured at the given time, the routine continues instead to block 620, where it determines whether the gaps in the visual coverage from the images captured at the given time are small enough to use interpolation and/or extrapolation, such as based on an amount of visual data that is available surrounding a particular omitted surface. If so, the routine continues to block 630, where it generates a model or other representation of the object (e.g., based on further analysis of the images), such as by generating a point cloud model for a subset of the object that is visible in the images of the selected group (e.g., in a manner similar to that discussed with respect to block 660, and in greater detail elsewhere herein), and using interpolation and/or extrapolation to estimate shapes of one or more omitted surfaces corresponding to the gaps in visual coverage, such as by using flat or curved regular shape fitting, using estimated slope information, etc.

if it is instead determined in block 620 that the gaps in the visual coverage from the images captured at the given time are not small enough to use interpolation and/or extrapolation, the routine continues instead to block 625, where it generates a model or other representation of the object (e.g., based on further analysis of the images), such as by generating a point cloud model for a subset of the object that is visible in the images of the selected group (e.g., in a manner similar to that discussed with respect to block 660, and in greater detail elsewhere herein), and by selecting and fitting a type of geometrical shape to the object that is used to estimate shapes of one or more omitted surfaces corresponding to the gaps in visual coverage. The type of geometrical shape may be determined, for example, based on previously supplied configuration information for the object (e.g., based on a manner in which the object is created).

While the operations of block 615-660 are illustrated as corresponding to different techniques for estimating shape information for surfaces of an object, it will be appreciated that in other embodiments some or all of the techniques may be used together for a particular object at a given time, such as estimate the shape of one omitted surface using one technique, using another technique to estimate the shape of another omitted surface, etc., by using multiple techniques for an omitted surface and combining the results, etc.

After blocks 625, 630, 650, or 660, the routine continues to block 680 to further optionally analyze the images and/or other object data corresponding to the object or its environment to determine additional information about the object, such as to determine the material of the object. While various blocks of the routine refer to analyzing the images to determine different types of information, it will be appreciated that, in some embodiments, some or all analysis of the images will occur only once or simultaneously to obtain multiple types of information and/or to generate multiple models representing different types of information in the models.

In block 685, the routine then uses the generated model to estimate the object volume, and to optionally determine or otherwise estimate values for other attributes of the object, such as contour lines or other surface area information, weight, radioactivity, etc.—such attribute value estimation may in some situations involve information determined in block 680, such as to use a determined type of material and other information about a unit weight for the material by volume to determine the weight of the overall object based on its estimated volume and determined material type. In some embodiments, the operations performed with respect to one or more of the blocks of the routine may further include manipulating or modifying the generated model in various manners, such as to fit a bare earth model and/or a surface model to the point cloud model. In other embodiments, other types of models may be determined and used, non-exclusive examples of which include occupancy graphs, an octree or volumetric representations based on voxels, etc.

As one specific example, the calculation of volume of an object may be performed based on measuring the amount of space between the surface of the pile and the ground it sits on, referred to generally in this specific example as the top and base surfaces, respectively. For example, even if the object is irregular and/or porous (e.g., a stockpile of construction aggregate materials) or the surfaces are otherwise approximate, the object may be modeled as having a fixed surface. Thus, the top and base surfaces may be treated as meeting along a boundary (e.g., to form a watertight solid that approximates the shape and volume of the pile). The solid may, for example, be represented with a boundary model formed of the two surfaces in polygonal or parametric form, or as a volumetric model such a 2.5D height fields or a 3D voxel grid. The model may contain the pile itself, as well as optionally containing parts of the surrounding environment. Using such a model, the volume computation may start with a step that segments the model into two components, with the first component containing the part of the model that represents the object, and the second component containing the remainder of the model. If the model is volumetric (such that the volume can be computed directly), then the object volume is obtained by computing the volume of the object component. Otherwise, the object component may be further segmented to isolate the top surface, base surface and toe components. In some embodiments, the model may be generated in the form of a 3D point cloud. The points of such a 3D point cloud model may be sampled from the top surface, the toe, and the surfaces of the surrounding environment, while the base surface is not sampled due to it being a contact surface. The point cloud may, for example, be expressed in a Cartesian coordinate system, where the local vertical is aligned with the z up axis (i.e. pointing away from the center of the Earth, for an object resting on the ground). Given an object point cloud, the corresponding volume may be computed first by segmenting the points into top surface, toe and environment components. Then, z-aligned height fields may be fitted to the toe and surface components (e.g., in a smooth and statistically robust manner). Finally, the object volume may be obtained by computing the integral of the difference between the top and toe fields. Alternatively, if a bare earth model of the environment (e.g., of the base surface on which the object sits) is available, then the volume may be obtained by computing the integral of the difference between the top field and a field derived from the bare earth model. If the object rests on complex terrain or man-made structures, then 3D models of these structures may be used to aid segmentation and field fitting. The models may be pre-existing or derived from the same point cloud. Finally, the point cloud may be pre-processed prior to segmentation. Pre-processing may include de-noising, removal of artifacts, simplification, scaling, leveling, geo-referencing, etc. Such artifacts may, for example, represent data that is added to one or more images but does not have a corresponding source in the object or environment, such as for artificially introduced data based on an imaging error or other problem, as described in greater detail elsewhere herein. The point cloud may also, in some embodiments and situations, contain reflectance and/or color information, and/or other meta-data that may be used volume computation. While the volume computation process may be fully automated in some embodiments and situations, in other embodiments and situations some human input may be provided as part of the process.

After block 685, the routine continues to block 690 to provide information about the estimated object attribute values as output of the routine, such as to another routine from which the routine 600 was invoked (e.g., routine 400). The routine optionally includes additional determined object information from block 680 as well in the provided information, and further stores the generated and determined information for later use.

After block 690, the routine continues to block 695 to determine whether to continue, such as until an explicit indication to terminate is received, or instead based on the completion of the routine after an invocation performed by another routine (e.g., such as in block 440 of FIG. 4). If it is determined to continue, the routine returns to block 605, and otherwise continues to block 699 and returns.

FIG. 7 is an example flow diagram of an illustrated embodiment of an IMDOEM Object Model/Attribute Verifier routine 700. The routine may be performed by, for example, execution of the IMDOEM system 160 of FIG. 1 (e.g., the Object Model/Attribute Verifier module 178), the IMDOEM system 340 and/or 360 of FIG. 3, and/or the IMDOEM system discussed with respect to FIGS. 2A-2P and elsewhere herein, such as to perform automated operations to verify object attribute values and/or corresponding generated computer model(s), as well as to provide corresponding information to a client. The routine 700 may be invoked in various manners in various embodiments and situations, including with respect to block 465 of FIG. 4. In addition, while the illustrated embodiment of the routine 700 includes performing attribute value verification in particular manners, the attribute value verification activities may be performed in other manners in other embodiments.

The routine 700 begins at block 705, where an indication is received of a generated computer model for an object of interest at a given time based on images and associated image acquisition metadata acquired at that given time (e.g., from one or more mobile computing devices and/or fixed-location cameras with visual coverage of the object), and optionally of corresponding attribute values from the computer model for which to perform automated verification activities. The routine continues to block 710 to determine whether to perform automated operations related to verifying the toe area of a modeled object (e.g., determining confidence in having sufficient visual data to represent the toe area and/or determining confidence in a boundary between the toe area and the underlying surface), and if so continues to block 715 to perform corresponding activities. In particular, the routine in block 715 identifies a subset of the modeled object to represent the toe area (e.g., a horizontal strip across some or all of the object, such as within a defined distance from the object boundary with the underlying surface and for any such portions of the object for which visual coverage is available in the acquired images used to generate the model of the object), and performs one or more activities to verify the toe area, such as to determine if a percentage or other amount of the width of the toe area for which visual data is available exceeds one or more defined thresholds and/or to determine if a percentage or other amount of the toe area has a sufficiently low slope to indicate that the corresponding boundary is verified, and with a confidence in the verification (or lack thereof) for the toe area being subsequently determined in block 770 based on the determined percentage or other amount. Additional details are included elsewhere herein related to verifying a toe area of the modeled object.

After block 715, or if it is instead determined in block 710 not to perform automated operations related to verifying the toe area, the routine continues to block 725 to determine whether to perform automated operations related to verifying the surface area coverage of the modeled object (e.g., determining confidence in having sufficient visual data to represent the object surface and/or to represent the object volume based on the modeled surface above it), and if so continues to block 730 to perform corresponding activities. In block 730, the routine identifies some or all of the modeled object for which to assess the surface area coverage (e.g., for any portions of the object for which visual coverage is available in the acquired images used to generate the model of the object), and performs one or more activities to verify the toe area, such as to determine if a density of visual data points within the identified subset exceeds one or more defined thresholds and/or to determine if a percentage or other amount of the surface and/or volume of a modeled object is sufficiently covered by image-acquired data, and with a confidence in the verification (or lack thereof) of the surface area coverage being subsequently determined in block 770 based on the determined density and/or percentage or other amount. Additional details are included elsewhere herein related to verifying surface area coverage of the modeled object.

After block 730, or if it is instead determined in block 725 not to perform automated operations related to verifying the surface area coverage, the routine continues to block 740 to determine whether to perform automated operations related to verifying the absence of temporary problems in the visual contents of the images acquired at a given time to use in modeling the object (e.g., determining confidence in the absence of such temporary problems), and if so continues to block 745 to perform corresponding activities. In block 745, the routine reviews information about whether one or more types of temporary problems exist for the acquired images used to generate the model of the object (e.g., by analyzing visual data of the image contents), such as to identify and assess any temporary obstructions that block view of portions of the object, to identify quality problems of one or more types in the acquired images, to identify quality problems of one or more types in the acquired image acquisition metadata, etc., and determines if any such identified temporary problems cause uncertainties in the shape of the modeled object that exceed one or more defined thresholds, with a confidence in the verification (or lack thereof) of the absence of such temporary problems being subsequently determined in block 770 based on the determined information. Additional details are included elsewhere herein related to verifying the absence of temporary problems in the visual contents of the images acquired at a given time to use in modeling the object.

After block 745, or if it is instead determined in block 740 not to perform automated operations related to verifying the absence of temporary problems in the visual data of the contents of the acquired images used to generate the model of the object, the routine continues to block 760 to optionally determine one or more additional verification-related activities to perform (e.g., to verify one or more object attribute values, to verify absence of vegetation obscuring the object, to verify absence of water adjacent to the object, to verify absence of one or more other overlapping objects, etc.), and to perform corresponding verification activities, as discussed in greater detail elsewhere herein. In block 770, the routine then uses the determined information from blocks 715 and/or 730 and/or 745 and/or 760 to determine confidence values in the respective verification activities, optionally after making an overall determination of the generated computer model for the object, such as based on a weighted combination of multiple distinct verification-related values, although in other embodiments multiple distinct verification-related values may instead be separately used without such combination into an overall value, and/or the confidence values may instead be performed at a time of respective verification activities in blocks 715 and/or 730 and/or 745 and/or 760. If the overall value (and/or individual value(s)) are determined in block 775 to exceed a corresponding threshold, the routine continues to block 780 to provide information to a user (e.g., an IMDOEM system operator user) or other recipient about the one or more verifications (and optionally about object attribute values being verified), and otherwise continues to block 785 to provide information to the user or other recipient about the lack of the one or more verifications (and optionally about the lack of the verifications of particular object attribute values). After blocks 780 or 785, the routine continues to block 790 to optionally perform one or more further interactions with one or more users related to the verification-related activities, such as to receive manual input to override or supplement some or all of the verification determinations.

After block 790, the routine continues to block 795 to determine whether to continue, such as until an explicit indication to terminate is received, or instead based on the completion of the routine after an invocation performed by another routine (e.g., such as in block 465 of FIG. 4). If it is determined to continue, the routine returns to block 705, and otherwise continues to block 799 and returns.

FIG. 8 is an example flow diagram of an illustrated embodiment of an IMDOEM Object Change Determiner routine 800. The routine may be performed by, for example, execution of the IMDOEM system 160 of FIG. 1 (e.g., the Object Change Determiner module 176), an IMDOEM system 340 and/or 360 of FIG. 3, and/or the IMDOEM system discussed with respect to FIGS. 2A-2P and 10A-10D and elsewhere herein, such as to analyze two or more generated models for two or more different times for each of one or more objects in order to determine changes over time, as well as to provide corresponding information to a client. The routine 800 may be invoked in various manners in various embodiments and situations, including with respect to block 475 of FIG. 4. In addition, while the illustrated embodiment of the routine 800 includes comparing generated models, the change determination activities may be performed in other manners in other embodiments.

The routine 800 begins at block 805, where an indication is received of one or more attributes of interest for which change information is to be determined for one or more objects, and of two or more generated models for each object that represent the object at different times. The routine continues to block 810 to, for each object, align its models if they are not already aligned (with each other or with respect to a common reference system), including to first optionally determine that the models correspond to the same single object if not previously performed. After block 810, the routine continues to block 815 to, for each object, compare information from its two or more models to determine changes over the two or more times for each of the attributes of interest. The routine then continues to block 820 to further optionally analyze additional images and/or associated image acquisition metadata and/or other object data corresponding to the object or its environment to determine additional change information, such as to determine changes on a site-wide basis with multiple objects (e.g., new objects, objects that have been removed or merged, etc.).

After block 820, the routine continues to block 880 to provide information about the determined changes as output of the routine, such as to another routine from which the routine 800 was invoked (e.g., routine 400). The routine further stores the determined change information for later use. After block 880, the routine continues to block 895 to determine whether to continue, such as until an explicit indication to terminate is received, or instead based on the completion of the routine after an invocation performed by another routine (e.g., such as in block 475 of FIG. 4). If it is determined to continue, the routine returns to block 805, and otherwise continues to block 899 and returns.

Figure 9:
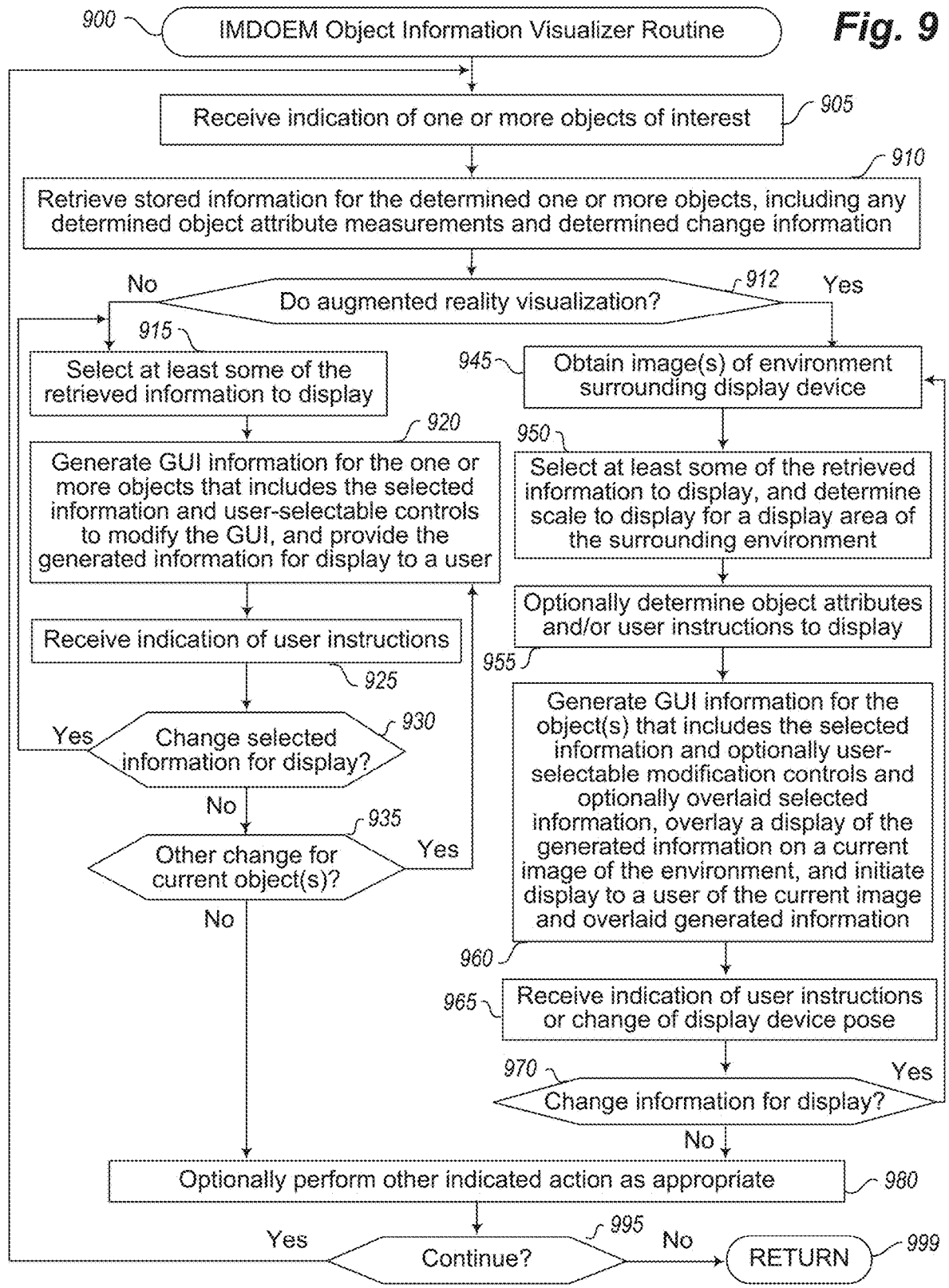
FIG. 9 is an example flow diagram of an illustrated embodiment of an IMDOEM Object Information Visualizer routine.

FIG. 9 is an example flow diagram of an illustrated embodiment of an

IMDOEM Object Information Visualizer routine 900. The routine may be performed by, for example, execution of the IMDOEM system 160 of FIG. 1 (e.g., the Object Information Visualizer module 177), the IMDOEM system 340 and/or 360 of FIG. 3, and/or the IMDOEM system discussed with respect to FIGS. 2A-2P and 10A-10D and elsewhere herein, such as to present information of various types to one or more users via one or more GUI screens (e.g., to present determined change information and/or other determined information for one or more objects). The routine 900 may be invoked in various manners in various embodiments and situations, including for different types of users at different times (e.g., for an IMDOEM system operator user during an image acquisition session to provide information about a partial computer model that is based on partial completion of the image acquisition session, for an end user after a final completed computer model is generated of an object to display that object and/or object attribute information based on that model, etc.), and such as with respect to blocks 455 and 485 of FIG. 4. In addition, while the illustrated embodiment of the routine 900 includes presenting particular types of information, the presentation activities may be performed in other manners in other embodiments, including for other types of information.

The routine 900 begins at block 905, where an indication is received of one or more objects of interest for which to present information, and optionally of one or more types of information of interest (e.g., particular attributes; particular times; particular types of information, such as change information; etc.). The routine continues to block 910 to retrieve stored information for the one or more objects, such as all determined information, or instead particular types of information as specified in block 905. After block 910, the routine continues to block 912 to determine whether to perform a visualization using augmented reality techniques, such as to display computer model information overlaid on one or more images of a current environment of the user and his/her display device (with FIGS. 2N-2P providing non-exclusive examples of such a visualization), or to instead display computer model information in a GUI visualization without such augmented reality techniques (with FIGS. 10A-10D providing non-exclusive examples of such a visualization)—in other embodiments, only one of the two types of object information visualization may be used (whether using augmented reality techniques or not using augmented reality techniques).

If it is determined in block 912 to not use an augmented reality visualization, the routine continues to block 915 to select at least some of the retrieved information for display (e.g., using defaults, user preferences, instructions received in block 905, etc.), and then proceeds to block 920 to generate and provide one or more GUI screens for display to one or more users with the selected information and with additional user-selectable controls to allow the user to modify the display. It will be appreciated that such GUI information may, for example, be displayed on the computer system that performs the routine (e.g., a mobile device of a user), or instead may be performed by one or more server computer systems that are remote from one or more client devices of the user on which the information is displayed, with such generated information being transmitted over one or more computer networks from the server system(s) to the client device(s). After block 920, the routine continues to block 925 to receive user instructions, and to optionally perform one or more loops with respect to blocks 915-935 to modify the information presented in the GUI in accordance with the user instructions and/or based on new data that becomes available while the GUI is displayed (e.g., new determined change information, new attribute values, etc.). After block 925, the routine continues to block 930 to determine whether the user instruction corresponds to changing some or all of the selected information for the current one or more objects of interest (e.g., to change one or more times for which change information is displayed, to change a type of information displayed, etc.), and if so returns to block 915 to select new corresponding information for display in an updated modified GUI. If it is instead determined in block 930 that the user instructions are not to change selected information for the current one or more objects of interest, the routine continues instead to block 935 to determine if the user instructions correspond to other changes or actions to perform for the current objects (e.g., to take an action that does not change the selected information or modify the GUI, to take an action that modifies the GUI without changing the selected types of information, etc.), and if so returns to block 920 to update the GUI display if appropriate, and otherwise to continue to block 925 to wait for an additional user instruction.

If it is instead determined in block 912 to use an augmented reality visualization, the routine continues to block 945 to obtain one or more images of an environment surrounding the display device, and to determine an area of a current image on which to overlay a display of some or all of the computer model. For example, if the display device is at the location of the object (e.g., a mobile computing device being used by an IMDOEM system operator user to acquire images of the object during an image acquisition session), the visual area where the object is located may be selected, so as to display an overlay of the computer model on the respective parts of the object that the computer model represents. Alternatively, if the display device is at another location (e.g., a site with an empty area where a similar pile or other object may be created or where the same pile or other object may be moved; or any other area at which to create the visualization, such as a parking lot, desktop, etc.), the determined area may be some of the current image (e.g., a specified percentage or other area, an area designated by the user, a flat area that is automatically identified, etc.), and the display of an overlay of the computer model is performed over whatever other visual information is present in that determined area of the image. After block 945, the routine continues to block 950 to select at least some of the retrieved information for display (e.g., using defaults, user preferences, instructions received in block 905, etc.), and to determine a scale at which to display the selected information to fit the determined area of the image (e.g., to fit some or all of the computer model over an image of the object, to display some or all of the computer model at a full scale on an area of the current image of that size, to display some or all of the computer at a reduced size to fit an area of the current image of that reduced size, etc.). After block 950, the routine then proceeds to block 955 to optionally determine object attributes and/or user instructions to display (e.g., on one or more virtual signs overlaid on the current image and/or using other overlaid visual indicators, such as to provide textual and/or graphical instructions to an IMOEM system operator user regarding completing a current image acquisition session; to provide information about object volume and/or other object attributes to an end user, whether from the current computer model and/or to indicate changes from one or more previous computer models; to provide information about the image acquisition session and or object that produces the computer model, such as an object identification and/or location and/or time of image acquisition session; etc.). The routine then proceeds to block 960 to generate and provide one or more GUI screens for display to the user that include a current image for the display device that is overlaid with the selected computer model information from block 950 and optionally the determined additional information from block 955, and optionally with additional user-selectable controls to allow the user to modify the display (although in other embodiments the user may modify the display without such explicit user-selectable controls, such as by moving the display device to cause the current image to change, by performing touch gestures on a touch-sensitive screen of the display device, by performing hand gestures or movements in view of the imaging sensors or other sensors of the display device, etc.). It will be appreciated that such GUI information may, for example, be displayed on the computer system that performs the routine (e.g., a mobile display device of a user), or instead may be performed by one or more server computer systems that are remote from one or more client display devices of the user on which the information is displayed, with such generated information being transmitted over one or more computer networks from the server system(s) to the client display device(s). After block 960, the routine continues to block 965 to receive user instructions or an indication of a change in the current image (e.g., a change in the pose of the display device), and if it is determined in block 970 that the instructions or changes indicate to continue the display with changed information, returns to block 945 and perform one or more loops with respect to blocks 945-970 to modify the information presented in the GUI in accordance with the user instructions and/or based on a changed current image and/or based on other new data that becomes available while the GUI is displayed (e.g., new determined change information, new attribute values, etc.).

If it is instead determined in block 935 that the user instructions are not to make changes other than for the current objects, or in block 970 that the user instructions or other changes (e.g., turning off imaging sensors of the display device) are to stop the display of information, the routine continues instead to block 980 to optionally perform one or other indicated operations (e.g., to update stored preference information for the user or other stored information for the user, etc.). After block 980, the routine continues to block 995 to determine whether to continue, such as until an explicit indication to terminate is received, or instead based on the completion of the routine after an invocation performed by another routine (e.g., such as in blocks 455 or 485 of FIG. 4). If it is determined to continue, the routine returns to block 905, and otherwise continues to block 999 and returns.

Aspects of the present disclosure are described herein with reference to flowchart illustrations and/or block diagrams of methods, apparatus (systems), and computer program products according to embodiments of the present disclosure. It will be appreciated that each block of the flowchart illustrations and/or block diagrams, and combinations of blocks in the flowchart illustrations and/or block diagrams, can be implemented by computer readable program instructions. It will be further appreciated that in some implementations the functionality provided by the routines discussed above may be provided in alternative ways, such as being split among more routines or consolidated into fewer routines. Similarly, in some implementations illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, or synchronous or asynchronous) and/or in a particular order, in other implementations the operations may be performed in other orders and in other manners. Any data structures discussed above may also be structured in different manners, such as by having a single data structure split into multiple data structures and/or by having multiple data structures consolidated into a single data structure. Similarly, in some implementations illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by corresponding claims and the elements recited by those claims. In addition, while certain aspects of the invention may be presented in certain claim forms at certain times, the inventors contemplate the various aspects of the invention in any available claim form. For example, while only some aspects of the invention may be recited as being embodied in a computer-readable medium at particular times, other aspects may likewise be so embodied.

What is claimed is:

1. A computer-implemented method comprising:
   capturing, by a mobile computing device that has one or more motion sensors and one or more imaging sensors, and during an image acquisition session for a pile of material that is deposited at a fixed site, a succession of images at multiple positions around an exterior of the pile of material and metadata for the succession of images, wherein the metadata is based at least in part on data acquired from the one or more motion sensors and includes a plurality of estimated pose data points with an estimated pose data point for each image of the succession indicating location and orientation of the mobile computing device during the capturing of that image;
   generating, by the mobile computing device in a real-time manner during the image acquisition session and before additional images are captured for the image acquisition session at multiple additional positions around the exterior of the pile of material, a partial three-dimensional ("3D") computer model representing some of the exterior of the pile of material based on a combination of the metadata and visual data from at least some images of the succession, including:
      determining, by the mobile computing device and based at least in part on estimated pose data points for images of the succession, initial trajectory information that indicates multiple sequences of estimated pose data points of the mobile computing device during the capturing of some of the images of the succession, wherein the multiple sequences are separated by estimated pose data points that are excluded from the initial trajectory information due to not satisfying one or more defined trajectory criteria;
      determining, by the mobile computing device and based at least in part on analysis of visual data from images of the succession, an image sequence having multiple images that are a subset of the images of the succession and such that each image in the image sequence has, for one or more adjacent images in the image sequence, an amount of visual overlap with the one or more adjacent images that satisfies one or more defined visual overlap criteria;
      determining, by the mobile computing device, updated trajectory information for the multiple images of the image sequence that includes pose data points with revised location and orientation values, including:
         identifying multiple pairs of images from the multiple images of the image sequence such that each pair of images has two images with an amount of visual overlap that satisfies the one or more defined visual overlap criteria and connects two of the multiple sequences of estimated pose data points by, for each of the pairs of images, two estimated pose data points for the two images of that pair are in different sequences of the multiple sequences; and
         modifying the estimated pose data points of the initial trajectory information based on triangulations of positions of features each visible in at least two images of the image sequence, including using the triangulations for features that are visible in the identified pairs of images to align visual data across images whose estimated pose data points are in the multiple sequences of estimated pose data points, and including further optimizing the modified estimated pose data points based on one or more specified pose constraints;
      determining, by the mobile computing device and based at least in part on the updated trajectory information, positions of a plurality of 3D points on the exterior of the pile of material, including, for each of multiple 3D points visible in two or more images of the image sequence, adjusting an initial alignment of that 3D point's position across the two or more images to optimize an overall alignment of visual data of the multiple images of the image sequence; and using, by the mobile computing device, the determined positions of the plurality of 3D points to generate the partial 3D computer model representing some of the exterior of the pile of material; and displaying, on the mobile computing device, and during the capturing of the additional images to a user participating in the capturing of the additional images, at least some of the partial generated 3D computer model overlaid on a current image of the pile of material, wherein the displayed at least some partial generated 3D computer model includes at least one of a 3D surface corresponding to the at least some of the generated 3D computer model or some or all of the plurality of 3D points.

2. The computer-implemented method of claim 1 further comprising:

generating, by one or more computing devices and after completion of the capturing of the additional images for the image acquisition session, a completed 3D computer model representing the exterior of the pile of material;

determining, by the one or more computing devices, attribute information about one or more attributes of the pile of material using the completed 3D computer model;

determining, by the one or more computing devices, one or more locations associated with the pile of material at which to overlay one or more virtual signs showing the determined attribute information; and transmitting, by the one or more computing devices and to a client device that is at a second location separate from a location of the pile of material, information about the completed 3D computer model and the determined attribute information and the determined one or more locations, to cause display on the client device of the generated 3D computer model overlaid on a current image of an environment of the client device, and to cause further display of the one or more virtual signs overlaid on the displayed generated 3D computer model at the determined one or more locations and showing the determined attribute information.

3. The computer-implemented method of claim 2 wherein the one or more computing devices include at least one server computing device that is at a third location separate from the location of the pile of material, and wherein the method further comprises:

transmitting, by the mobile computing device and to the at least one server computing device, additional information that includes at least some images captured during the image acquisition session and at least some of the metadata and the determined updated trajectory information and the determined positions of the plurality of 3D points; and performing, by the at least one server computing device and using the transmitted additional information, the generating of the completed 3D computer model.

4. A computer-implemented method comprising:

obtaining, by one or more computing devices, information about a succession of images captured at multiple positions around an exterior of a pile of material that is deposited at a fixed site and about metadata from capturing of the succession of images, wherein the metadata is based at least in part on data from one or more motion sensors of at least one device involved in the capturing of the succession of images and includes a plurality of estimated pose data points with an estimated pose data point for each image of the succession indicating location and orientation of the at least one device during the capturing of that image;

generating, by the one or more computing devices, and based on a combination of the metadata and of visual data from at least some images of the succession, a three-dimensional ("3D") computer model representing at least some of the exterior of the pile of material, including:

determining, by the one or more computing devices and based at least in part on estimated pose data points for images of the succession, initial trajectory information that indicates at least one sequence of estimated pose data points of the at least one device during the capturing of some of the images of the succession, including excluding from the initial trajectory information one or more estimated pose data points that do not satisfy one or more defined trajectory criteria;

determining, by the one or more computing devices and based at least in part on analysis of visual data from images of the succession, an image sequence having multiple images that are a subset of the images of the succession and such that each image in the image sequence has, for one or more adjacent images in the image sequence, an amount of visual overlap with the one or more adjacent images that satisfies one or more defined visual overlap criteria;

determining, by the one or more computing devices, updated trajectory information for the multiple images of the image sequence that includes pose data points with revised location and orientation values, including modifying the estimated pose data points of the initial trajectory information based on triangulations across images of the image sequence of positions of features that are each visible in at least two images of the image sequence, and including further optimizing the modified estimated pose data points based on one or more specified pose constraints;

determining, by the one or more computing devices and based at least in part on the updated trajectory information, positions of a plurality of 3D points on the exterior of the pile of material, including, for each of multiple 3D points that are visible in two or more images of the image sequence, adjusting an initial alignment of that 3D point's position across the two or more images to optimize an overall alignment of visual data of the multiple images of the image sequence; and using, by the one or more computing devices, the determined positions of the plurality of 3D points to generate the 3D computer model representing the at least some of the exterior of the pile of material at a time of the capturing; and providing, by the one or more computing devices, information about the generated 3D computer model.

5. The computer-implemented method of claim 4 wherein the generating of the 3D computer model is performed after the succession of images is captured and incorporates all of the exterior of the pile of material that is visible in the images of the succession.

6. The computer-implemented method of claim 5 wherein the determining of the image sequence having multiple images that are a subset of the images of the succession includes:
   identifying, by the one or more computing devices, two-dimensional ("2D") features in visual data of the images of the succession;
   tracking, by the one or more computing devices, positions of the 2D features across the images of the succession; and
   selecting, by the one or more computing devices, keyframe images to use as at least some of the multiple images for the image sequence based at least in part on the tracked positions of the 2D features, wherein the one or more defined visual overlap criteria is based at least in part on a defined amount of visual overlap of the tracked positions of the 2D features between consecutive images of the multiple images,
   and wherein the triangulations across the images of the image sequence of the positions of the features that are each visible in at least two images of the image sequence is based at least in part on the tracked positions of the 2D features.

7. The computer-implemented method of claim 6 wherein the determining of the image sequence having multiple images that are a subset of the images of the succession further includes identifying, by the one or more computing devices, one or more pairs of images from the multiple images of the image sequence that have an amount of visual overlap that satisfies the one or more defined visual overlap criteria and that are not adjacent images in the image sequence, and verifying, by the one or more computing devices and for each of the one or more pairs of images, that a valid geometric transformation exists between the images of the pair using the identified 2D features in the visual data of the images of the pair.

8. The computer-implemented method of claim 7 wherein the initial trajectory information includes multiple sequences of estimated pose data points that are separated by the excluded one or more estimated data points;
   wherein the determining of the image sequence having multiple images that are a subset of the images of the succession further includes identifying, by the one or more computing devices, at least one image pair of the one or more pairs of images that connects two of the multiple sequences of estimated pose data points by having one image of that at least one image pair whose estimated pose data point is part of one of the two sequences of estimated pose data points and by having another image of that at least one image pair whose estimated pose data point is part of another of the two sequences of estimated pose data points; and
   wherein the determining of the updated trajectory information includes using the identified at least one image pair to align visual data of images whose estimated pose data points are in different of the multiple sequences of estimated pose data points.

9. The computer-implemented method of claim 8 wherein the determining of the positions of the plurality of 3D points further includes performing the adjusting of the initially aligned 3D points' positions using the aligned visual data of the images whose estimated pose data points are in different of the multiple sequences of estimated pose data points.

10. The computer-implemented method of claim 9 wherein the determining of the updated trajectory information includes identifying the plurality of 3D points using the optimized modified estimated pose data points of the updated trajectory information and includes generating the initial alignment of positions of the multiple 3D points based on that updated trajectory information, and wherein the determining of the updated trajectory information and the adjusting of the initial alignment of the position of each of the multiple 3D points to optimize an overall alignment of visual data of the multiple images of the image sequence is performed multiple times in an iterative manner.

11. The computer-implemented method of claim 5 wherein the optimizing of the modified estimated pose data points based on the one or more specified pose constraints includes:
   adjusting, by the one or more computing devices, the estimated pose data points from the obtained metadata for consecutive images of the multiple images using a tolerant loss function that limits an amount of the adjusting according to a determined threshold difference, wherein the one or more specified pose constraints for the modified estimated pose data points determine the threshold difference between the locations and orientations of the modified estimated pose data points of consecutive images of the multiple images based on a difference in the estimated pose data points of those consecutive images from the obtained metadata; and/or
   adjusting, by the one or more computing devices, the estimated pose data points from the obtained metadata for each of one or more pairs of images of the multiple images using a determined first limit on an amount of the adjusting that is based on a quantity of the 3D points visible in the images of that pair, wherein the one or more specified pose constraints for the modified estimated pose data points use the first limit for a pair of images that is determined relative to the quantity of the 3D points that are visible in the images of that pair; and/or
   adjusting, by the one or more computing devices, the estimated pose data points from the obtained metadata using a defined second limit on an amount of the adjusting for a change in orientation of an estimated pose data point in a direction of gravity, wherein the one or more specified pose constraints for the modified estimated pose data points include the defined second limit on the amount of the adjusting for a change in orientation of an estimated pose data point in the direction of gravity.

12. The computer-implemented method of claim 11 wherein the modifying of the estimated pose data points of the initial trajectory information and the further optimizing of the modified estimated pose data points is performed multiple times in an iterative manner.

13. The computer-implemented method of claim 11 wherein the optimizing of the modified estimated pose data points based on the one or more specified pose constraints further includes identifying information to use with at least one of the specified pose constraints by:
   providing, to a neural network trained to identify the information to use with the at least one specified pose constraint, the obtained information and information about the multiple images of the image sequence; and
   receiving, from the trained neural network, determined weighting information to use with the at least one specified pose constraint, and a determination at least one of the determined threshold difference, or the determined first limit, or the defined second limit, and wherein the optimizing of the modified estimated pose data points based on one or more specified pose constraints further includes using, during the optimizing of the modified estimated pose data, the determined weighting information with the at least one specified pose constraint and the determined at least one of the determined threshold difference, or the determined first limit, or the defined second limit.

14. The computer-implemented method of claim 5 wherein the determining of the initial trajectory information includes:
  excluding, by the one or more computing devices and from the initial trajectory information, two or more estimated pose data points for two or more images of the succession that do not satisfy the one or more defined trajectory criteria; and
  generating multiple sequences of estimated pose data points of the at least one device during the capturing of at least some of the images of the succession, wherein the multiple sequences are each separated by one or more of the excluded two or more estimated pose data points and do not include any of the excluded two or more estimated pose data points,
  and wherein the determining of the image sequence having the multiple images includes selecting at least one of the two or more images to enable analysis of visual data of the selected at least one image to supplement the excluded two or more estimated pose data points.

15. The computer-implemented method of claim 5 wherein the excluded one or more estimated pose data points are for one or more images of the succession, and wherein the excluding of the one or more estimated pose data points includes:
  identifying, by the one or more computing devices, each of at least one of the one or more estimated pose data points based at least in part on an amount of change in the location for that estimated pose data point from the location for a preceding estimated pose data point, and wherein the one or more defined trajectory criteria include a defined maximum distance between the locations of the estimated pose data points of two consecutive images of the succession; and/or
  identifying, by the one or more computing devices, each of at least one of the one or more estimated pose data points based at least in part on an amount of change in the orientation for that estimated pose data point from the orientation for a preceding estimated pose data point, and wherein the one or more defined trajectory criteria include a defined maximum orientation change between the orientations of the estimated pose data points of two consecutive images of the succession; and/or
  identifying, by the one or more computing devices, each of at least one of the one or more estimated pose data points based at least in part on an amount of change in velocity of the location and orientation for that estimated pose data point from the location and orientation for a preceding estimated pose data point, and wherein the one or more defined trajectory criteria include a defined maximum velocity change between the locations and orientations of the estimated pose data points of two consecutive images of the succession; and/or
  identifying, by the one or more computing devices, each of at least one of the one or more estimated pose data points based at least in part on an amount of difference in the location and orientation for that estimated pose data point from other location and orientation information generated for that estimated pose data point based on an analysis of visual data from at least some images of the succession, and wherein the one or more defined trajectory criteria include a defined maximum difference between a first location and orientation for an estimated pose data point that are determined using the data acquired from the one or more motion sensors, and a second location and orientation for that estimated pose data point that are determined using an analysis of visual data from captured images; and/or
  identifying, by the one or more computing devices, each of at least one of the one or more estimated pose data points based at least in part on an amount of difference in the location and orientation for that estimated pose data point from other location and orientation information generated from a previous generation of an earlier 3D computer model for the exterior of the pile of material, and wherein the one or more defined trajectory criteria include a defined maximum difference between a third location and orientation for an estimated pose data point that are determined using the obtained information for the succession of images, and a fourth location and orientation for one or more pose data points at one or more locations within a defined distance of the third location used for the previous generation of the earlier 3D computer model.

16. The computer-implemented method of claim 5 wherein the determining of the initial trajectory information includes excluding, by the one or more computing devices and from the initial trajectory information, two or more estimated pose data points for two or more images of the images of the succession that do not satisfy the one or more defined trajectory criteria, including identifying the two or more estimated pose data points by providing at least some of the obtained information to a neural network trained to determine pose data points that do not satisfy the one or more defined trajectory criteria, and by receiving an identification of the two or more estimated pose data points from the trained neural network.

17. The computer-implemented method of claim 4 wherein the generating of the 3D computer model representing the at least some of the exterior of the pile of material is performed during an image acquisition session that includes the capturing of the succession of images, and wherein at least one of the one or more computing devices is a mobile computing device that includes the one or more motion sensors and includes one or more imaging sensors and is used for the capturing of at least some of the images of the succession.

18. The computer-implemented method of claim 17 wherein the image acquisition session further includes capturing of additional images at additional positions around the exterior of the pile of material, wherein the generating of the 3D computer model is performed before the capturing of the additional images and includes creating the generated 3D computer model as a partial model of the exterior of the pile of material that is based on the succession of images and is not based on the additional images, and wherein the determining of the image sequence includes selecting the multiple images based at least in part on an amount of change in the estimated pose data points for the multiple images from the estimated pose data points of preceding images of the succession.

19. The computer-implemented method of claim 17 wherein the generating of the 3D computer model further includes at least one of:
  determining, by the one or more computing devices, and based at least in part on the metadata from the capturing of the succession of images, an estimated scale of at least some of the exterior of the pile of material based at least in part on locations indicated in the estimated pose data points for the images of the succession, and using the determined estimated scale during at least one of the further optimizing of the modified estimated pose data points or optimizing of the overall alignment of the visual data of the multiple images; or
  determining, by the one or more computing devices, and based at least in part on the estimated pose data points from the obtained metadata, changes in location and orientation between estimated pose data points for images of the succession, and using the determined changes in location and orientation during at least one of the further optimizing of the modified estimated pose data points or the optimizing of the overall alignment of the visual data of the multiple images; or
  determining, by the one or more computing devices, and based at least in part on the metadata from the capturing of the succession of images, a direction of gravity for each of multiple estimated pose data points for images of the succession, and using information about the determined directions of gravity during at least one of the further optimizing of the modified estimated pose data points or the optimizing of the overall alignment of the visual data of the multiple images; or
  determining, by the one or more computing devices, and based at least in part on the metadata from the capturing of the succession of images, an estimated focal length of the one or more imaging sensors of the mobile computing device for each of multiple estimated pose data points for images of the succession, and using information about the determined estimated focal lengths during at least one of the further optimizing of the modified estimated pose data points or the optimizing of the overall alignment of the visual data of the multiple images; or
  determining, by the one or more computing devices, and based at least in part on the estimated pose data points from the obtained metadata, estimated positions in one of the images of the succession of features visible in the one image based at least in part on tracked positions of the features in other images and in the estimated pose data point for the one image, and using information about the determined estimated positions during at least one of the further optimizing of the modified estimated pose data points or the optimizing of the overall alignment of the visual data of the multiple images.

20. The computer-implemented method of claim 4 wherein the generating of the 3D computer model representing the at least some of the exterior of the pile of material is performed during an image acquisition session that includes the capturing of the succession of images and capturing of additional images at multiple additional positions around the exterior of the pile of material and occurs before the additional images are captured;
  wherein the generated 3D computer model is a partial model of the exterior of the pile of material that is based on the succession of images and is not based on the additional images;
  wherein at least one of the one or more computing devices is a mobile computing device that includes the one or more motion sensors and includes one or more imaging sensors and is used for the capturing of at least some of the images of the succession; and
  wherein the providing of the information about the generated 3D computer model includes displaying, on the mobile computing device and during the capturing of the additional images, to a user participating in the capturing of the additional images, at least some of the generated 3D computer model overlaid on a current image of the pile of material, wherein the displayed at least some generated 3D computer model includes at least one of a 3D surface corresponding to the at least some of the generated 3D computer model, or some or all of the plurality of 3D points.

21. The computer-implemented method of claim 20 wherein the displaying of the generated 3D computer model overlaid on the current image of the pile of material includes:
  determining, by the one or more computing devices, one or more locations associated with the pile of material at which to overlay one or more virtual displays to provide instructions to the user; and
  displaying, on the mobile computing device and during the capturing of the additional images, the one or more virtual displays to the user at the determined one or more locations.

22. The computer-implemented method of claim 20 further comprising:
  determining, by the one or more computing devices, information about one or more attributes of the pile of material using a completed 3D computer model of the pile of material; and
  displaying, on the mobile computing device and to the user, a virtual sign overlaid on a current image of the pile of material that includes the determined information.

23. The computer-implemented method of claim 4 wherein the generating of the 3D computer model representing the at least some of the exterior of the pile of material is performed after completion of an image acquisition session that includes the capturing of the succession of images, wherein the generated 3D computer model is a completed 3D computer model of the exterior of the pile of material, and wherein the method further comprises:
  determining, by the one or more computing devices, attribute information about one or more attributes of the pile of material using the completed 3D computer model of the pile of material; and
  determining, by the one or more computing devices, one or more locations associated with the pile of material at which to overlay one or more virtual displays of the determined attribute information,
  and wherein the providing of the information about the generated 3D computer model includes transmitting, by the one or more computing devices and to one or more client devices, information about the completed 3D computer model and the determined attribute information and the determined one or more locations, to cause presentation on the one or more client devices of the generated 3D computer model and of the one or more virtual displays overlaid on the generated 3D computer model at the determined one or more locations and showing the determined attribute information.

24. The computer-implemented method of claim 23 further comprising determining, by the one or more computing devices, an identification of the pile of material based at least in part on location data acquired by the at least one device, and wherein the providing of the information about the generated 3D computer model further includes initiating, by the one or more computing devices, display on the one or more client devices of the determined identification of the pile of material and information about one or more prior generations of one or more other 3D computer models of the pile of material.

25. The computer-implemented method of claim 4 further comprising using, by the one or more computing devices, the generated 3D computer model to estimate a volume of the pile of material at a time of the capturing, and wherein the providing of the information includes initiating, via one or more electronic communications sent over one or more computer networks to one or more client devices, presentation on the one or more client devices of the generated 3D computer model and of information about the estimated volume.

26. A non-transitory computer-readable medium having stored contents that cause one or more computing devices to perform automated operations including at least:
    obtaining, by the one or more computing devices, information about a plurality of images captured during an image acquisition session at multiple positions around an exterior of a pile of material that is deposited at a fixed site and about metadata from capturing of the plurality of images, wherein the one or more computing devices include a mobile computing device that includes one or more motion sensors and includes one or more imaging sensors and is used for the capturing of the plurality of images, wherein the metadata is based at least in part on data acquired from the one or more motion sensors and includes an estimated pose data point for each image of the plurality that indicates location and orientation of the mobile computing device during the capturing of that image;
    generating, by the one or more computing devices and during the image acquisition session before additional images are captured for the image acquisition session at multiple additional positions around the exterior of the pile of material, and based on a combination of the metadata and of visual data from at least some images of the plurality, a partial three-dimensional ("3D") computer model representing some of the exterior of the pile of material, including:
        determining, by the one or more computing devices and using estimated pose data points for images of the plurality, initial trajectory information that indicates at least one sequence of estimated pose data points of the mobile computing device during the capturing of some images of the plurality;
        determining, by the one or more computing devices and based at least in part on analysis of visual data from images of the plurality, an image sequence having multiple images that are a subset of the plurality of images and such that each image in the image sequence has, for one or more adjacent images in the image sequence, an amount of visual overlap with the one or more adjacent images that satisfies one or more defined visual overlap criteria;
        determining, by the one or more computing devices, updated trajectory information for the multiple images of the image sequence that includes pose data points with revised location and orientation values, including modifying the estimated pose data points of the initial trajectory information based on triangulations across images of the image sequence of positions of features that are each visible in at least two images of the image sequence;
        determining, by the one or more computing devices and based at least in part on the updated trajectory information, positions of a plurality of 3D points on the exterior of the pile of material, including, for each of multiple 3D points that are visible in two or more images of the image sequence, aligning that 3D point's position across the two or more images; and
        using, by the one or more computing devices, the determined positions of the plurality of 3D points to generate the partial 3D computer model representing some of the exterior of the pile of material; and
    displaying, on the mobile computing device, and during the capturing of the additional images to a user participating in the capturing of the additional images, at least some of the partial generated 3D computer model overlaid on a current image of the pile of material, wherein the displayed at least some partial generated 3D computer model includes at least one of a 3D surface corresponding to the at least some of the generated 3D computer model or some or all of the plurality of 3D points.

27. The non-transitory computer-readable medium of claim 26 wherein the displaying of the partial generated 3D computer model overlaid on the current image of the pile of material includes:
    determining, by the one or more computing devices, one or more locations associated with the pile of material at which to overlay one or more virtual displays to provide instructions to the user; and
    displaying, on the mobile computing device and during the capturing of the additional images, the one or more virtual displays to the user at the determined one or more locations.

28. The non-transitory computer-readable medium of claim 26 wherein the stored contents include software instructions that, when executed by the one or more computing devices, cause the one or more computing devices to perform further automated operations including at least:
    determining, by the one or more computing devices, information about one or more attributes of the pile of material using a completed 3D computer model of the pile of material; and
    displaying, on the mobile computing device and to the user, a virtual sign overlaid on a current image of the pile of material that includes the determined information.

29. A system comprising:
one or more hardware processors of one or more computing devices; and
one or more memories with stored instructions that, when executed by at least one of the one or more hardware processors, cause the one or more computing devices to perform automated operations including at least:
    obtaining information about a plurality of images captured during an image acquisition session at multiple positions around an exterior of a pile of material that is deposited at a fixed site and about metadata from capturing of the plurality of images, wherein the metadata is based at least in part on data from one or more motion sensors of at least one device involved in the capturing of the succession of images and includes a plurality of estimated pose data points with an estimated pose data point for each image of the succession indicating location and orientation of the at least one device during the capturing of that image;

generating, based on a combination of the metadata and of visual data from at least some images of the plurality, a completed three-dimensional ("3D") computer model representing the exterior of the pile of material, including:

determining, using estimated pose data points for images of the plurality, initial trajectory information that indicates at least one sequence of estimated pose data points of the at least one device during the capturing of at least some images of the plurality;

determining, based at least in part on analysis of visual data from images of the plurality, an image sequence having multiple images that are a subset of the plurality of images and such that each image in the image sequence has, for one or more adjacent images in the image sequence, an amount of visual overlap with the one or more adjacent images that satisfies one or more defined visual overlap criteria;

determining updated trajectory information for the multiple images of the image sequence that includes pose data points with revised location and orientation values, including modifying the estimated pose data points of the initial trajectory information based on triangulations across images of the image sequence of positions of features that are each visible in at least two images of the image sequence;

determining, based at least in part on the updated trajectory information, positions of a plurality of 3D points on the exterior of the pile of material, including, for each of multiple 3D points that are visible in two or more images of the image sequence, aligning that 3D point's position across the two or more images; and using the determined positions of the plurality of 3D points to generate the completed 3D computer model representing the exterior of the pile of material; and transmitting, to one or more client devices, at least some of the completed generated 3D computer model, to enable each of the one or more client devices to display the at least some completed generated 3D computer model overlaid on a current image of an environment of that client device, wherein the displayed at least some completed generated 3D computer model includes at least one of a 3D surface corresponding to the at least some of the completed generated 3D computer model or some or all of the plurality of 3D points.

30. The system of claim 29 wherein the system further comprises one of the one or more client devices that is at a second location separate from a location of the pile of material, and wherein the stored instructions further cause the one client device to perform further automated operations including at least:

receiving the transmitted at least some of the completed generated 3D computer model;

capturing the current image of the environment of the one client device that is at the second location separate from the location of the pile of material; and displaying the current image on the one client device, and displaying an overlay of the at least some completed generated 3D computer model on the displayed current image.

31. The system of claim 29 wherein the stored instructions include software instructions and cause the one or more computing devices to perform further automated operations including at least:

determining information about one or more attributes of the pile of material from the completed generated 3D computer model of the pile of material;

determining one or more locations on the pile of material at which to overlay one or more virtual signs to provide the determined information to the user; and initiating the display, on one of the one or more client devices and overlaid on the display on the one client device of the at least some completed generated 3D computer model overlaid on the current image of the environment of that one client device, of the one or more virtual signs at the determined one or more locations and showing the determined information.

* * * * *